(12) United States Patent
Suzuki et al.

(10) Patent No.: US 10,133,050 B2
(45) Date of Patent: *Nov. 20, 2018

(54) SAMPLE OBSERVATION DEVICE AND SAMPLE OBSERVATION METHOD

(71) Applicant: OLYMPUS CORPORATION, Tokyo (JP)

(72) Inventors: Yoshimasa Suzuki, Kawasaki (JP); Kazuo Kajitani, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 428 days.

This patent is subject to a terminal disclaimer.

(21) Appl. No.: 14/926,517

(22) Filed: Oct. 29, 2015

(65) Prior Publication Data

US 2016/0048011 A1    Feb. 18, 2016

Related U.S. Application Data

(63) Continuation of application No. PCT/JP2014/061111, filed on Apr. 14, 2014.

(30) Foreign Application Priority Data

Apr. 30, 2013 (JP) .................................. 2013-095339
Jun. 18, 2013 (JP) .................................. 2013-127972
Dec. 4, 2013 (JP) .................................. 2013-251539

(51) Int. Cl.
*G02B 21/12* (2006.01)
*G02B 21/02* (2006.01)
(Continued)

(52) U.S. Cl.
CPC .............. *G02B 21/12* (2013.01); *G02B 5/005* (2013.01); *G02B 13/22* (2013.01); *G02B 21/02* (2013.01); *G02B 21/086* (2013.01); *G02B 21/14* (2013.01); *G02B 21/367* (2013.01)

(58) Field of Classification Search
CPC .... G02B 21/06; G02B 21/086; G02B 21/082; G02B 21/16; G02B 21/22; G02B 21/365;
(Continued)

(56) References Cited

U.S. PATENT DOCUMENTS

| 4,200,354 A | 4/1980 | Hoffman |
| 7,505,200 B2 | 3/2009 | Krueger |

(Continued)

FOREIGN PATENT DOCUMENTS

| JP | S51-029149 A | 3/1976 |
| JP | H09-218357 A | 8/1997 |

(Continued)

OTHER PUBLICATIONS

International Search Report dated Jun. 24, 2014 issued in PCT/JP2014/061111.

(Continued)

*Primary Examiner* — Anand S Rao
*Assistant Examiner* — Samuel D Fereja
(74) *Attorney, Agent, or Firm* — Scully, Scott, Murphy & Presser, P.C.

(57) ABSTRACT

A sample observation device includes an illumination optical system and an observation optical system, and the illumination optical system includes a light source, a condenser lens and an aperture member, and the observation optical system includes an objective lens and an imaging lens, and the aperture member has a light-shielding part or a darkening part and a transmission part, and the aperture member is disposed so that the light-shielding part or the darkening part includes an optical axis of the illumination optical system, and an image of an inner edge of the transmission part is formed inside of an outer edge of the pupil of the objective lens, and an image of an outer edge of the transmission part is formed outside of the outer edge of the pupil of the objective lens.

49 Claims, 37 Drawing Sheets

(51) Int. Cl.
*G02B 5/00* (2006.01)
*G02B 21/08* (2006.01)
*G02B 21/14* (2006.01)
*G02B 21/36* (2006.01)
*G02B 13/22* (2006.01)

(58) Field of Classification Search
CPC .. G02B 21/10; G02B 21/361; G02B 17/0808; G02B 21/084; G02B 21/14; G02B 21/0088; G02B 21/025; G02B 21/02; G02B 21/04; G02B 15/14; G02B 21/0032; G02B 21/0076; G02B 21/24; G02B 21/244; G02B 5/005; G02B 17/0856; G02B 21/0016; G02B 21/12; G02B 21/245; G02B 13/22; G02B 2027/0178; G02B 21/0012; G02B 21/006; G02B 21/008; G02B 21/08; G02B 21/088; G02B 21/241
See application file for complete search history.

(56) References Cited

U.S. PATENT DOCUMENTS

| | | | |
|---|---|---|---|
| 2002/0191281 A1* | 12/2002 | Osa | G02B 21/06 359/385 |
| 2004/0120029 A1 | 6/2004 | Krueger | |
| 2012/0099172 A1 | 4/2012 | Ohki | |
| 2012/0236137 A1 | 9/2012 | Kawashima | |
| 2012/0262562 A1 | 10/2012 | Fukutake et al. | |
| 2013/0314776 A1* | 11/2013 | Mizuta | G02B 21/025 359/374 |
| 2014/0210983 A1* | 7/2014 | Shimura | G02B 21/0016 348/80 |

FOREIGN PATENT DOCUMENTS

| | | |
|---|---|---|
| JP | 2004-126590 A | 4/2004 |
| JP | 2012-088530 A | 5/2012 |
| JP | 2012-194503 A | 10/2012 |
| JP | 2012-222672 A | 11/2012 |

OTHER PUBLICATIONS

English translation of International Preliminary Report on Patentability dated Nov. 12, 2015 together with the Written Opinion received in related International Application No. PCT/JP2014/061111.

* cited by examiner

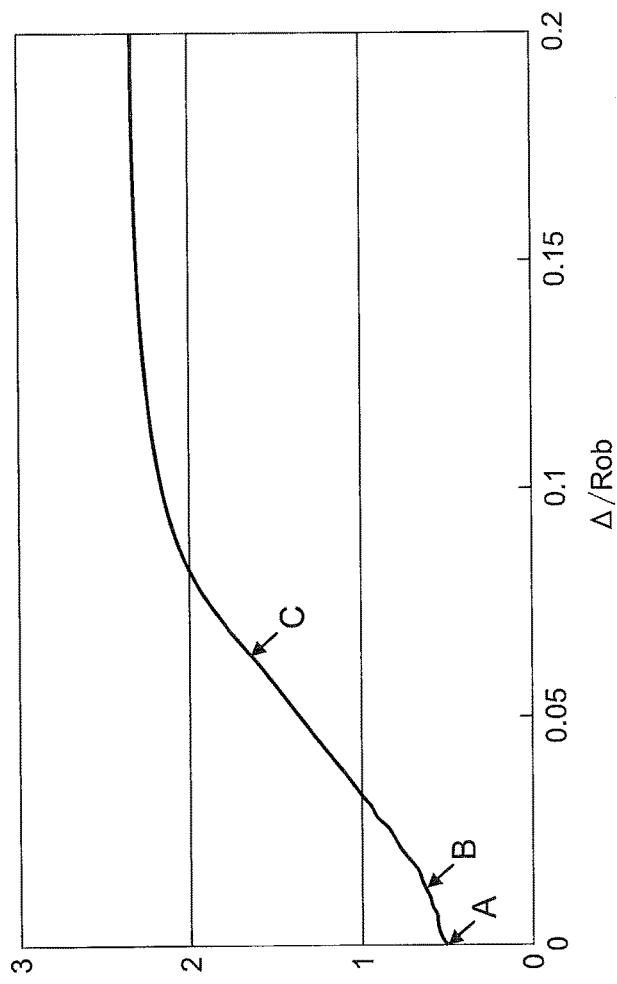
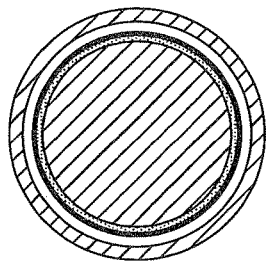
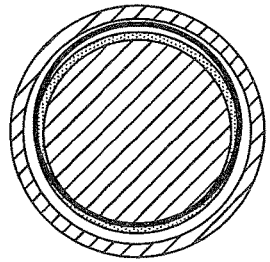
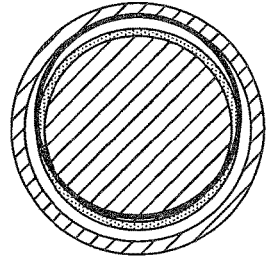

SAMPLE OBSERVATION DEVICE AND SAMPLE OBSERVATION METHOD

CROSS-REFERENCE TO RELATED APPLICATION

The present application is a continuation of PCT/JP2014/061111, filed on Apr. 14, 2014 which is based upon and claims the benefit of priority from Japanese Patent Application Nos. 2013-095339 filed on Apr. 30, 2013, 2013-127972 filed on Jun. 18, 2013 and 2013-251539 filed on Dec. 4, 2013; the entire contents of which are incorporated herein by reference.

BACKGROUND OF THE INVENTION

Field of the Invention

The present invention relates to a sample observation device and a sample observation method.

Description of the Related Art

As a method for observing a colorless and transparent sample, modulation contrast method is available. In an observation device using the modulation contrast method, an aperture plate is disposed at the illumination optical system, and a modulator is disposed at the observation optical system. Here, the aperture plate is conjugate to the modulator. Moreover, at the aperture plate, a rectangular transmission part is formed at a position away from the optical axis (the center of the aperture plate). Meanwhile, at the modulator, a plurality of regions having mutually different transmittance are formed. These regions are formed to be adjacent to each other. These regions each have a dimension (width) capable of including an image of the transmission part.

As stated above, the transmission part is formed at a position away from the optical axis. Therefore, illumination light passing through the transmission part is emitted from a condenser lens so as to illuminate a sample from an oblique direction. The illumination light emitted from the condenser lens passes through the sample and reaches the modulator. Here, three regions of region A (transmittance 100%), region B (transmittance 20%) and region C (transmittance 0%) are formed at the modulator, for example.

In the case where a surface of the sample is flat, a light flux passing through the sample reaches the region B of the modulator. As a result, a sample image having brightness corresponding to the transmittance of the region B is formed. When the sample surface is an inclined face that is an upward-slope to the right, the light flux is refracted to the right at the time of passing through the sample. In this case, the light flux passing through the sample reaches the region C of the modulator. As a result, a sample image having brightness corresponding to the transmittance of the region C is formed. When the sample surface is an inclined face that is an upward-slope to the left, the light flux is refracted to the left at the time of passing through the sample. In this case, the light flux passing through the sample reaches the region A of the modulator. As a result, a sample image having brightness corresponding to the transmittance of the region A is formed. As just described, when the sample is colorless and transparent, and has a flat face and an inclined face, then the flat face part in the sample image appears gray, and the inclined face part appears black or white.

As just described, in the modulation contrast method, it is possible to observe a colorless and transparent sample as well as an image that has a shadow (contrast) and gives a three-dimensional appearance. As observation devices using the modulation contrast method, observation devices described in Japanese Patent Application Laid-Open No. Sho 51-29149 and Japanese Patent Application Laid-Open No. 2004-126590 are available.

SUMMARY OF THE INVENTION

A sample observation device according to the present invention includes:
an illumination optical system and an observation optical system, wherein
the illumination optical system includes a light source, a condenser lens and an aperture member,
the observation optical system includes an objective lens and an imaging lens,
the aperture member has a light-shielding part or a darkening part, and a transmission part,
the aperture member is disposed so that the light-shielding part or the darkening part includes an optical axis of the illumination optical system,
the transmission part is located outside of an outer edge of the light-shielding part or the darkening part,
an image of an inner edge of the transmission part is formed inside of an outer edge of the pupil of the objective lens, and
an image of an outer edge of the transmission part is formed outside of the outer edge of the pupil of the objective lens.

Another sample observation device according to the present invention includes:
an illumination optical system and an observation optical system, wherein
the illumination optical system includes a light source and a condenser lens,
the observation optical system includes an objective lens, an aperture member and an imaging lens,
the aperture member includes a light-shielding part or a darkening part, and a transmission part,
the aperture member is disposed so that the light-shielding part or the darkening part includes an optical axis of the observation optical system,
the transmission part is located outside of an outer edge of the light-shielding part or the darkening part, and
an image of an outer edge of a pupil of the condenser lens is formed between an inner edge of the transmission part and an outer edge of the transmission part.

BRIEF DESCRIPTION OF THE DRAWINGS

FIG. 2A is a diagram showing the aperture member made of an opaque member, and FIG. 2B is a diagram showing the aperture member made of a transparent member.

FIG. 3A is a diagram showing the state of refraction of light at the sample position, FIG. 3B is a diagram showing the relationship between the pupil of the objective lens and an image of the aperture member, and FIG. 3C is a diagram showing the state of a light flux passing through the pupil of the objective lens.

FIG. 4A is a diagram showing the state of refraction of light at the sample position, FIG. 4B is a diagram showing the relationship between the pupil of the objective lens and an image of the aperture member, and FIG. 4C is a diagram showing the state of a light flux passing through the pupil of the objective lens.

FIG. 6A is a diagram showing the relationship among the length from the optical axis to the inner edge of the transmission part, the length from the optical axis to the outer edge of the transmission part and the radius of the pupil of the objective lens, and FIG. 6B is a diagram showing the displacement of an image of the aperture member with reference to the pupil of the objective lens.

FIG. 7B shows the case where no displacement occurs, FIG. 7C shows the case where small displacement occurs, and FIG. 7D shows the case where large displacement occurs.

FIG. 8A is a diagram showing the case where no sample is present, and FIG. 8B is a diagram showing the case where a sample is present.

FIG. 9A is a graph showing the relationship between the displacement amount of an image of the aperture member with reference to the pupil of the objective lens, and the amount of a light flux passing through the pupil of the objective lens, and FIG. 9B, FIG. 9C and FIG. 9D are diagrams showing the displacement of an image of the aperture member with reference to the pupil of the objective lens, where FIG. 9B shows the case where no displacement occurs, FIG. 9C shows the case where small displacement occurs, and FIG. 9D shows the case where large displacement occurs.

FIG. 10A is a diagram showing the aperture member having a transmission part whose transmittance changes continuously, and FIG. 10B is a diagram showing the aperture member having a transmission part whose transmittance changes in a stepwise manner.

FIG. 13C, FIG. 13D, FIG. 13E and FIG. 13F are diagrams showing models for the sample.

FIG. 14A is a top view, FIG. 14B is a cross-sectional view showing the state where the light-shielding part is formed on one face only, and FIG. 14C is a cross-sectional view showing the state where the light-shielding part is formed on both faces.

FIG. 15A is a cross-sectional view showing the aperture member made up of two transparent members, and FIG. 15B is a top view showing the aperture member made up of two opaque members.

FIG. 16A is a diagram showing a moving mechanism made up of one rotating plate, FIG. 16B is a diagram showing a moving mechanism made up of two rotating plates, and FIG. 16C is a diagram showing another moving mechanism made up of two rotating plates.

FIG. 17A is a top view, FIG. 17B is an enlarged view of the transmission part when the diameters of the minute apertures are made to be same, and FIG. 17C is an enlarged view of the transmission part when the diameters of the minute apertures are made to be different.

FIG. 18A is a diagram showing an aperture member including a darkening part disposed at a transparent member, FIG. 18B is a diagram showing an aperture member in which an aperture part is provided at a darkening filter, and FIG. 18C is a diagram showing an aperture member in which minute apertures are provided at an opaque member.

FIG. 23A is an electronic image of a sample at a first position, FIG. 23B is an electronic image of the sample at a second position, and FIG. 23C is an image obtained by adding two electronic images.

FIG. 24A is an electronic image of a sample at a first position, FIG. 24B is an electronic image of the sample at a second position, and FIG. 24C is an image obtained by subtracting two electronic images.

FIG. 25A is an electronic image of a sample obtained by a sample observation method of the present embodiment, FIG. 25B is an electronic image of a sample obtained by a phase-contrast observation method, and FIG. 25C is an image obtained by adding two electronic images.

FIG. 27A is a diagram showing an aperture member disposed in the illumination optical system, and FIG. 27B is a diagram showing an aperture member disposed in the observation optical system.

FIG. 28A is a diagram showing the state of refraction of light at the sample position, and FIG. 28B is a diagram showing the relationship between an image of the pupil of the condenser lens and the aperture member.

FIG. 29A is a diagram showing the state of refraction of light at the sample position, and FIG. 29B is a diagram showing the relationship between an image of the pupil of the condenser lens and the aperture member.

FIG. 31A is a diagram showing the illumination-side aperture member and FIG. 31B is a diagram showing the observation-side aperture member.

FIG. 34A is an original image, and FIG. 34B is an image after applying an edge detection filter.

FIG. 35A is an image after performing a binarization processing, and FIG. 35B is an image after performing a morphology processing.

FIG. 36A is an original image, and FIG. 36B is an image after applying an edge detection filter.

FIG. 37A is a diagram of an axicon prism, FIG. 37B is a diagram showing an example of the arrangement of the axicon prism, and FIG. 37C is a diagram showing the light-collecting state of the illumination light.

DETAILED DESCRIPTION OF THE INVENTION

Action and effect of embodiments according to certain aspects of the present invention will be described below. An action and effect of the present embodiment will be described specifically by describing concrete examples. However, the aspects exemplified thereof are some of the aspects included in the present invention, and there is a large number of variations in these aspects. Therefore, the present invention is not restricted to the aspects that are exemplified.

A sample observation method of an embodiment and a sample observation device of an embodiment are described below. The sample observation device and the sample observation method in the following each embodiment is used in a state of bright-field observation. In the bright-field observation of the present embodiment, a fluorescent mirror unit including an excitation filter, a dichroic mirror, and an absorption filter is not used as with fluorescent observation. Therefore, in the state of bright-field observation, when a sample is colorless and transparent, the wavelength band of light forming a sample image (hereinafter, referred to as the "imaging light" as appropriate) agrees with a part of the wavelength band of light illuminating the sample (hereinafter, referred to as the "illumination light" as appropriate), or the wavelength band of the imaging light agrees with the wavelength band of the illumination light.

Moreover, in the bright-field observation of the sample observation device and the sample observation method of the present embodiment, a phase film in phase-contrast observation or a differential interference prism in differential interference observation is not used. Moreover, in the bright-field observation of the present embodiment, a modulator in the modulation contrast observation is not used.

A sample observation device of the present embodiment includes an illumination optical system and an observation optical system, and the illumination optical system includes a light source, a condenser lens and an aperture member, and the observation optical system includes an objective lens and an imaging lens, and the aperture member has a light-shielding part and a transmission part, and the aperture member is disposed so that the light-shielding part includes an optical axis of the illumination optical system, and the transmission part is located outside of an outer edge of the light-shielding part, and an image of an inner edge of the transmission part is formed inside of an outer edge of the pupil of the objective lens, and an image of an outer edge of the transmission part is formed outside of the outer edge of the pupil of the objective lens.

Figure 1:
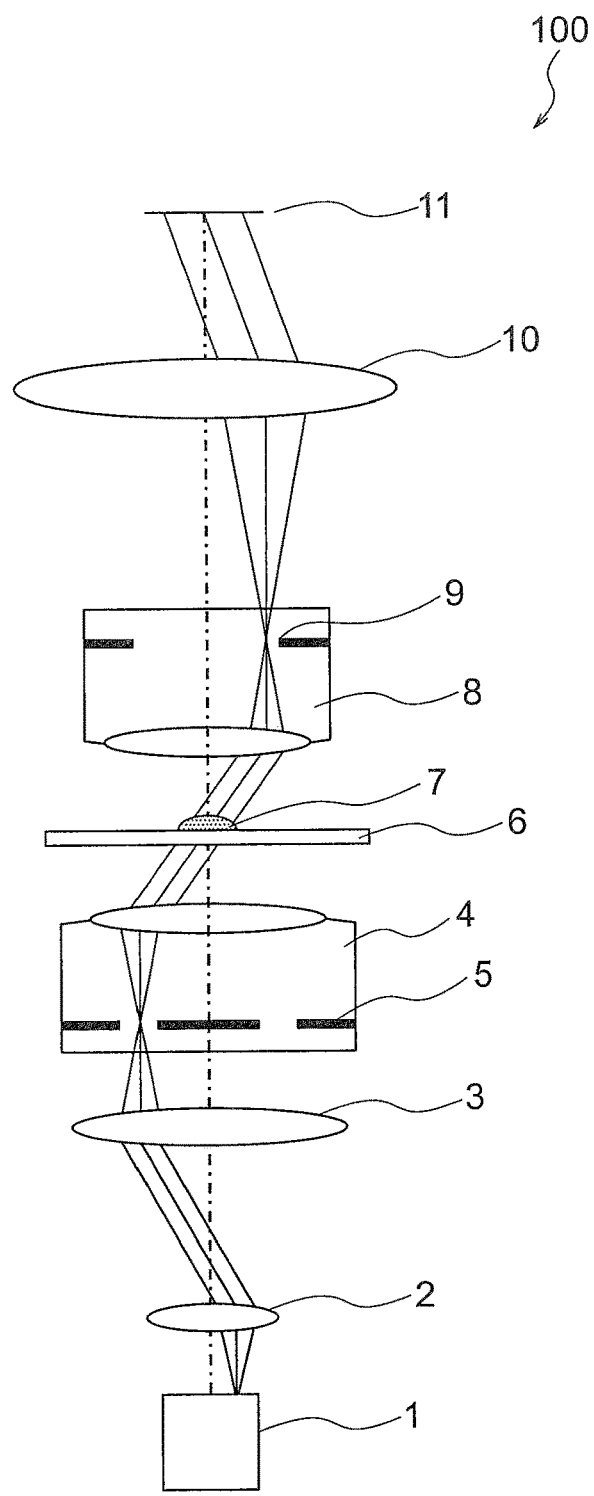
FIG. 1 is a diagram showing the configuration of a sample observation device of an embodiment.

Referring to FIG. 1, the sample observation device of the present embodiment is described below. FIG. 1 is a diagram showing the configuration of the sample observation device of the present embodiment.

A sample observation device 100 is an upright microscope, for example, which includes an illumination optical system and an observation optical system. The illumination optical system includes a light source 1, a condenser lens 4 and an aperture member 5. The illumination optical system includes a lens 2 and a lens 3 as needed. Meanwhile, the observation optical system includes an objective lens 8 and an imaging lens 10.

Light emitted from the light source 1 passes through the lens 2 and the lens 3, and reaches the condenser lens 4. At the condenser lens 4, the aperture member 5 is provided. Herein, the condenser lens 4 and the aperture member 5 are integrally configured. However, the aperture member 5 and the condenser lens 4 may be configured as separate bodies.

Figure 2A:
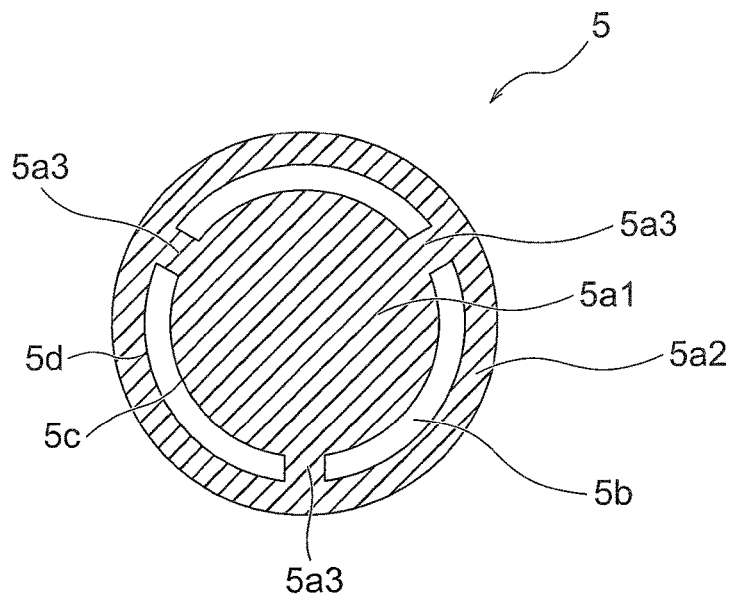
FIG. 2A and FIG. 2B are diagrams showing the configuration of an aperture member, where
Figure 2B:
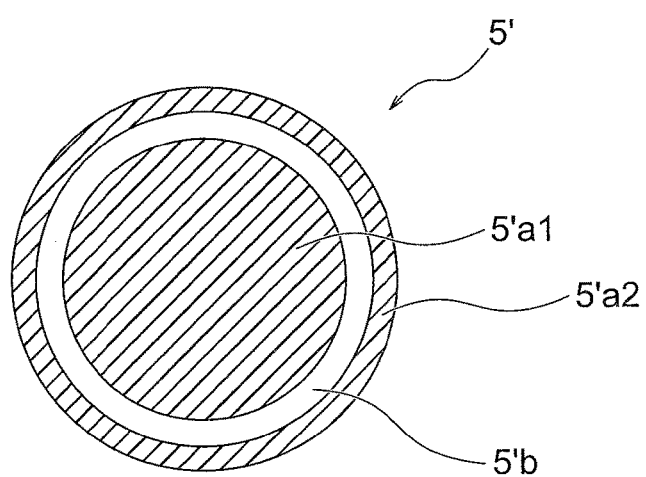

The aperture member 5 is described below. The configuration of the aperture member is shown in FIG. 2A and FIG. 2B. FIG. 2A shows the aperture member made of an opaque member, and FIG. 2B shows the aperture member made of a transparent member.

As shown in FIG. 2A, the aperture member 5 includes a light-shielding part 5a1 and a transmission part 5b. Further, the aperture member 5 includes a light-shielding part 5a2. The light-shielding parts 5a1 and 5a2 are made of an opaque member, such as a metal plate. The transmission part 5b is a gap (hole) bored at the metal plate.

At the aperture member 5, three connecting parts 5a3 are formed between the light-shielding part 5a1 and the light-shielding part 5a2 to hold the light-shielding part 5a1. Therefore, the transmission part 5b is divided three parts. The shape of each transmission part 5b is a substantially fan-like shape (discrete ring-band shape). The number of the connecting parts 5a3 is not limited to three.

The aperture member 5 is disposed so that the light-shielding part 5*a*1 includes the optical axis of the illumination optical system. The light-shielding part 5*a*1 has an outer edge 5*c* that is at a position away from the optical axis of the illumination optical system by predetermined distance. Therefore, the illumination light incident on the aperture member 5 is shielded at the center of the light flux by the light-shielding part 5*a*1. Here, the boundary between the light-shielding part 5*a*1 and the transmission part 5*b* corresponds to the outer edge 5*c* of the light-shielding part 5*a*1.

The light-shielding part 5*a*2 is located outside (direction moving away from the optical axis) of the light-shielding part 5*a*1 and the transmission part 5*b*. Here, the boundary between the transmission part 5*b* and the light-shielding part 5*a*2 corresponds to an inner edge 5*d* of the light-shielding part 5*a*2.

The transmission part 5*b* is located outside of the outer edge 5*c* of the light-shielding part 5*a*1. Here, the boundary between the light-shielding part 5*a*1 and the transmission part 5*b* corresponds to the inner edge of the transmission part 5*b*. Moreover, the boundary between the transmission part 5*b* and the light-shielding part 5*a*2 corresponds to the outer edge of the transmission part 5*b*. Therefore, 5*c* represents the outer edge of the light-shielding part 5*a*1 and the inner edge of the transmission part 5*b*, and 5*d* represents the inner edge of the light-shielding part 5*a*2 and the outer edge of the transmission part 5*b*.

Moreover, as shown in FIG. 2B, an aperture member 5' includes a light-shielding part 5'*a*1 and a transmission part 5'*b*. Further, the aperture member 5' includes a light-shielding part 5'*a*2. The light-shielding parts 5'*a*1 and 5'*a*2, and the transmission part 5'*b* are made of a transparent member, such as a glass plate or a resin plate. The light-shielding parts 5'*a*1 and 5'*a*2 are formed by applying light-shielding paint on a glass plate. On the other hand, nothing is applied to the transmission part 5'*b*. Therefore, the transmission part 5'*b* is a glass plate as it is.

At the aperture member 5', a shape of the transmission part 5'*b* is an annulus. This is because there is no need to hold the light-shielding part 5'*a*2. Therefore, at the aperture member 5', a connecting part does not formed between the light-shielding part 5'*a*1 and the light-shielding part 5'*a*2.

A major difference between the aperture member 5' and the aperture member 5 are the material, and the presence or not of the connecting part. Therefore, the detailed descriptions of the light-shielding part 5'*a*1 and 5'*a*2, and the transmission part 5'*b* are omitted.

The light-shielding part 5*a*2 and the connecting parts 5*a*3 of the aperture member 5, and the light-shielding part 5'*a*2 of the aperture member 5' are not always required. For instance, the size (diameter) of a light flux of the illumination light may correspond to the outer edge of the transmission part 5*b* or the outer edge of the transmission part 5'*b*.

As described above, the aperture member 5, 5' includes the light-shielding part 5*a*1, 5'*a*1 and the transmission part 5*b*, 5'*b*. Therefore, an illumination light having a substantially annular shape or an annular shape (hereinafter, referred to as "annular shape" as appropriate) emanates form the aperture member 5, 5'.

Referring back to FIG. 1, the description is continued. The aperture member 5 is conjugate to the light source 1. Therefore, the illumination light emitted from the light source 1 is collected at the position of the aperture member 5. That is, an image of the light source 1 is formed at the position of the aperture member 5.

Illumination light emitted from the aperture member 5 enters the condenser lens 4. Here, the position of the aperture member 5 coincides with the focal position of the condenser lens 4 (or the pupil position of the condenser lens 4). Therefore, the illumination light emitted from the condenser lens 4 becomes parallel light. Moreover, since a shape of the transmission part is an annular shape, a shape of the illumination light also is an annular shape. Therefore, the illumination light emitted from the condenser lens 4 is emitted so as to intersect with the optical axis of the observation optical system (the optical axis of the illumination optical system).

The illumination light emitted from the condenser lens 4 reaches a sample 7. The sample 7 is placed on a holding member 6. The sample 7 is a cell, for example, which is colorless and transparent.

The light passing through the sample 7, i.e., imaging light enters a microscope objective lens 8 (hereinafter, referred to as an "objective lens" as appropriate). This objective lens 8 is a microscope objective lens for bright-field observation, for example. Therefore, only a lens is present in the optical path of the objective lens 8, and no optical member to change the intensity or the phase of light, such as a phase plate or a modulation plate, is not present in the optical path.

The imaging light emitted from the objective lens 8 enters the imaging lens 10. Then, an image of the sample 7 is formed at an image position 11 by the imaging light emitted from the imaging lens 10.

As shown in FIG. 1, parallel light passing through the sample 7 is collected at a pupil 9 of the objective lens. As just described, the pupil 9 of the objective lens is conjugate to the aperture member 5. Therefore, an image of the aperture member 5 is formed at the position of the pupil 9 of the objective lens.

The relationship between the pupil 9 of the objective lens and an image of the aperture member 5 are described below. Let that, in the following description, the aperture member 5' shown in FIG. 2B is used as the aperture member.

Figure 3A:
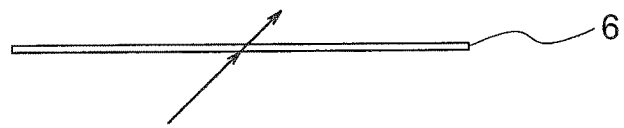
FIG. 3A, FIG. 3B and FIG. 3C are diagrams showing the relationship between the pupil of the objective lens and an image of the aperture member when no sample is present, where
Figure 3B:
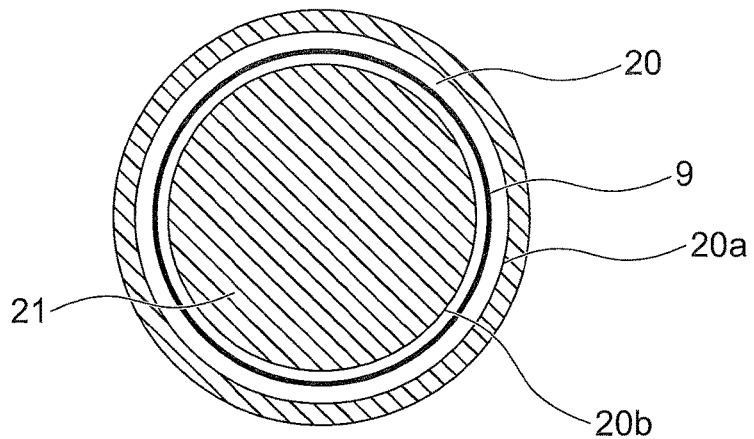
Figure 3C:
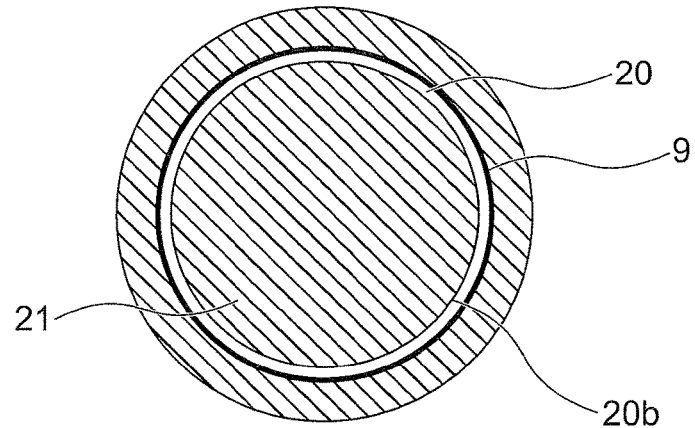

FIG. 3A, FIG. 3B and FIG. 3C are diagrams showing the relationship between the pupil of the objective lens and an image of the aperture member when no sample is present. FIG. 3A is a diagram showing the state of refraction of light at the sample position, FIG. 3B is a diagram showing the relationship between the pupil of the objective lens and an image of the aperture member, and FIG. 3C is a diagram showing the state of a light flux passing through the pupil of the objective lens. The case where a sample is present but its surface is flat, is included in the case where no sample is present.

Figure 4A:
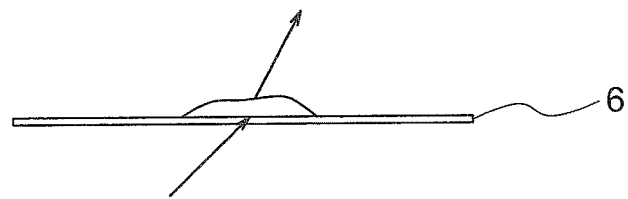
FIG. 4A, FIG. 4B and FIG. 4C are diagrams showing the relationship between the pupil of the objective lens and an image of the aperture member when a sample is present, where
Figure 4B:
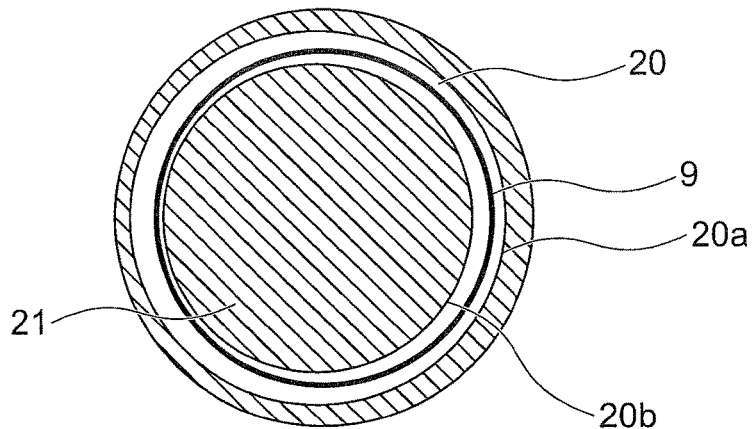
Figure 4C:
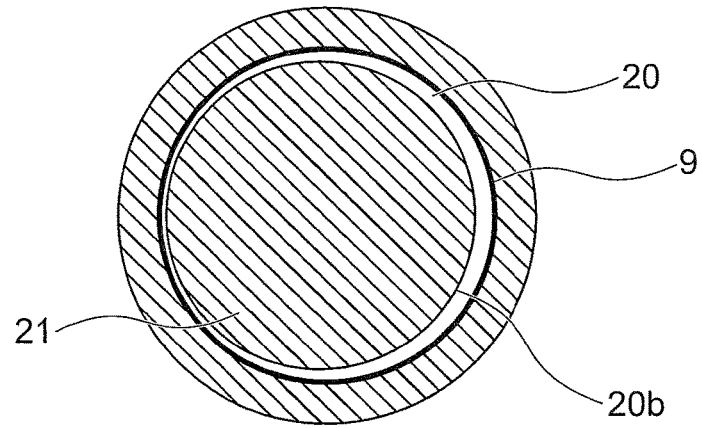

Moreover, FIG. 4A, FIG. 4B and FIG. 4C are diagrams showing the relationship between the pupil of the objective lens and an image of the aperture member when a sample is present. FIG. 4A is a diagram showing the state of refraction of light at the sample position, FIG. 4B is a diagram showing the relationship between the pupil of the objective lens and an image of the aperture member, and FIG. 4C is a diagram showing the state of a light flux passing through the pupil of the objective lens. The case where a sample is present refers to the case where the surface of the sample is inclined (not-flat). Therefore, the case where a sample is present but its surface is flat, is not included in the case where a sample is present.

In the case where no sample is present, as shown in FIG. 3A, the direction of the light becomes same between light incident on the holding member 6 and light emitted from the holding member 6. As a result, an image of the aperture member formed at the pupil position of the objective lens becomes as shown in FIG. 3B. The circle (circumference) indicated with numeral 9 is the outer edge of the pupil of the objective lens, and the inside of the circle (circumference) is the pupil of the objective lens.

As shown in FIG. 3B, a shape of an image 20 of the transmission part is an annulus, a shape of an image 21 of the light-shielding part is a circle, and a shape of the pupil 9 of the objective lens is a circle. Then, the image 20 of the transmission part, the image 21 of the light-shielding part, and the pupil 9 of the objective lens are concentric. Moreover, the center of the image 20 of the transmission part, the center of the image 21 of the light-shielding part, and the center of the pupil 9 of the objective lens coincide with each other. The image 21 of the light-shielding part is an image of the light-shielding part 5$a$1 or 5'$a$1 in FIG. 2A or FIG. 2B, for example.

Here, the center of the image 20 of the transmission part refers to the center of a circle defining an image 20$a$ of the outer edge of the transmission part (since the image 20 of the transmission part is annulus, the center of the image 20 of the transmission part is the center of the circle defining an image 20$b$ of the inner edge of the transmission part as well).

Then, the image 20$b$ of the inner edge of the transmission part is located inside (the direction approaching the optical axis) of the outer edge of the pupil 9 of the objective lens. Moreover, the image 20$a$ of the outer edge of the transmission part is located outside (the direction moving away from the optical axis) of the outer edge of the pupil 9 of the objective lens. As just described, in the sample observation device of the present embodiment, the image 20$b$ of the inner edge of the transmission part is formed inside of the outer edge of the pupil 9 of the objective lens, and the image 20$a$ of the outer edge of the transmission part is formed outside of the outer edge of the pupil 9 of the objective lens.

Here, light outside of the outer edge of the pupil 9 of the objective lens does not pass through the pupil 9 of the objective lens (is not emitted from the objective lens 8). Therefore, as shown in FIG. 3C, the region of a light flux passing through the pupil 9 of the objective lens is the region between the image 20$b$ of the inner edge of the transmission part and the outer edge of the pupil 9 of the objective lens. Then, the area of this region as a whole corresponds to the brightness of the sample image.

On the other hand, in the case where a sample is present, as shown in FIG. 4A, the direction of the light becomes different between light incident on the holding member 6 and light emitted from the sample. As a result, an image of the aperture member formed at the pupil position of the objective lens becomes as shown in FIG. 4B. In FIG. 4B also, the circle (circumference) indicated with numeral 9 is the outer edge of the pupil of the objective lens, and the inside of the circle (circumference) is the pupil of the objective lens.

As shown in FIG. 4B, a shape of an image 20 of the transmission part is an annulus, a shape of an image 21 of the light-shielding part is a circle, and a shape of the pupil 9 of the objective lens is a circle. However, the image 20 of the transmission part and the image 21 of the light-shielding part, and the pupil 9 of the objective lens are not concentric. Moreover, the center of the image 20 of the transmission part and the center of the image 21 of the light-shielding part, and the center of the pupil 9 of the objective lens do not coincide with each other. That is, the center of the image 20 of the transmission part and the center of the image 21 of the light-shielding part shift to the left on the sheet with reference to the center of the pupil 9 of the objective lens.

Moreover, as shown in FIG. 4C, the region where a light flux passes through the pupil 9 of the objective lens is the region between the image 20$b$ of the inner edge of the transmission part and the outer edge of the pupil 9 of the objective lens. Then, the area of this region as a whole corresponds to the brightness of the sample image.

Here, in FIG. 4B, the image 20$b$ of the inner edge of the transmission part is located inside of the outer edge of the pupil 9 of the objective lens. In other words, in FIG. 4B, the image 21 of the light-shielding part is located inside of the outer edge of the pupil 9 of the objective lens. This is because the inclination of the surface of the sample is small. On the other hand, in the case where no sample is present as well, the image 21 of the light-shielding part is located inside of the outer edge of the pupil 9 of the objective lens. Therefore, even in the case where a sample is present, if the inclination of the surface of the sample is small, brightness of the sample image will be the same as in the case where no sample is present.

Figure 7B:
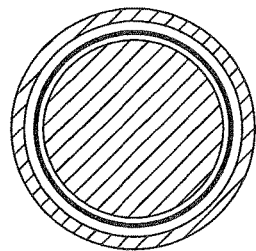
FIG. 7B, FIG. 7C and FIG. 7D are diagrams showing the displacement of an image of the aperture member with reference to the pupil of the objective lens, where
Figure 7C:
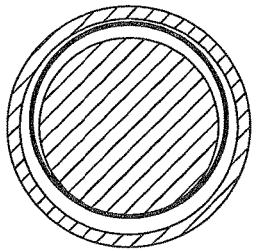
Figure 7D:
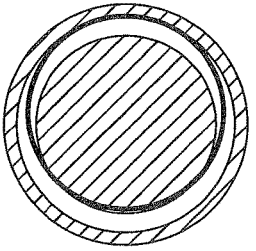

However, when the inclination of the sample surface becomes larger, displacement of the center of the image 20 of the transmission part with reference to the center of the pupil 9 of the objective lens (hereinafter, referred to as "displacement of an image of the transmission part" as appropriate) becomes larger. In this case, as described later, a part of the image 20$b$ of the inner edge of the transmission part will be located outside of the outer edge of the pupil 9 of the objective lens (as shown in FIG. 7C and FIG. 7D). Moreover, a part of the image 20$a$ of the outer edge of the transmission part will be located inside of the outer edge of the pupil 9 of the objective lens. In other words, a part of the image 21 of the light-shielding part is located outside of the outer edge of the pupil 9 of the objective lens. As a result, the region of a light flux passing through the pupil 9 of the objective lens changes greatly. That is, the brightness of the sample image is different from that in the case where no sample is present.

As just described, in the sample observation device of the present embodiment, a sample observation method, in which a sample is irradiated with a light flux having a predetermined width so that the light flux intersect with the optical axis of the objective lens, and innermost-side light of the light flux having a predetermine width passes through the inside of the outer edge of the pupil of the objective lens, and outermost-side light of the light flux having a predetermine width passes through the outside of the outer edge of the pupil of the objective lens, is used.

With this method, in the sample observation device of the present embodiment, a change in shape at the sample (change in inclination) is converted into a change in displacement of the image of the transmission part. Then, the change in displacement of the image of the transmission part causes a change in the amount of a light flux passing through the pupil of the objective lens. That is, the change in shape at the sample can be detected as a change in brightness. As a result, even when the sample is colorless and transparent, it is possible to obtain a sample image with shadow.

Further, in the sample observation device of the present embodiment, there is no need to use a modulator as in the modulation contrast method. Therefore, there is no need to perform positioning of the aperture member with reference to a modulator. As a result, the positioning of the aperture member can be simplified. Further, since no modulator is used, an objective lens for bright-field observation method can be used as the objective lens. Therefore, various observation methods (e.g., bright-field observation, fluorescent observation and polarization observation) can be performed easily with one objective lens.

Moreover, although the generated direction of shadow depends on the direction of displacement of the image 20 of the transmission part with reference to the pupil 9 of the objective lens, the direction of displacement of the image of the transmission part is not limited. Therefore, in the sample observation device of the present embodiment, the generated direction of shadow is not limited.

Moreover, the aperture member for sample observation device including an objective lens of the present embodiment is disposed at the illumination optical system of the sample observation device, and includes the light-shielding part and the transmission part, and the transmission part is located outside of the outer edge of the light-shielding part, and the transmission part is configured so that an image of the inner edge of the transmission part is formed inside of the outer edge of the pupil of the objective lens and an image of the outer edge of the transmission part is formed outside of the outer edge of the pupil of the objective lens.

When such an aperture member for sample observation device including an objective lens is used in a sample observation device, it is possible to irradiate the objective lens with ring-shaped illumination light which is suitable for the objective lens. Moreover, since an image of the inner edge of the transmission part is formed inside of the outer edge of the pupil of the objective lens and an image of the outer edge of the transmission part is formed outside of the outer edge of the pupil of the objective lens, it is possible to detect a change in shape at the sample as a change in brightness.

Figure 5:
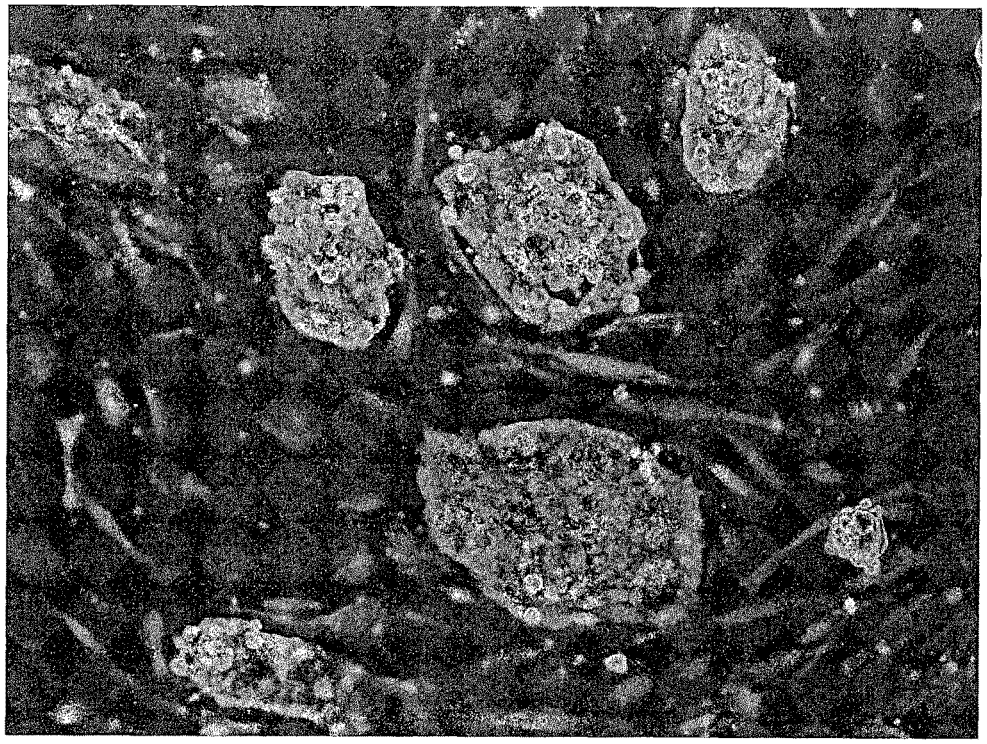
FIG. 5 is an electronic image of a sample obtained by the sample observation device of the present embodiment.

FIG. 5 shows an example of the observation result in the sample observation device of the present embodiment. FIG. 5 is an electronic image of a cell. As shown in FIG. 5, according to the sample observation device of the present embodiment, it is possible to observe the outline of a colorless and transparent cell or its internal structure clearly.

Moreover, in the sample observation device of the present embodiment, it is preferable that an area of the image of the light-shielding part at the pupil position of the objective lens is 50% or more of an area of the pupil of the objective lens.

With this configuration, it is possible to detect a change in shape at the sample as a change in brightness. As a result, even when the sample is colorless and transparent, it is possible to obtain a sample image with shadow.

If the 50% range of the pupil of the objective lens cannot be shielded, the interval from the image 20b of the inner edge of the transmission part to the outer edge of the pupil 9 of the objective lens becomes too wide. In this case, it becomes difficult to make a difference in the amount of a light flux passing through the pupil 9 of the objective lens between the case where displacement of the image 20 of the transmission part is present and the case where it is not present. Therefore, it becomes difficult to detect a change in shape at the sample as a change in brightness. As a result, it becomes difficult to obtain a sample image with shadow. Alternatively, the contrast of a sample image deteriorates.

It is preferable that the area of the image of the light-shielding part at the pupil position of the objective lens is 70% or more of an area of the pupil of the objective lens. Further, it is more preferable that the area of the image of the light-shielding part at the pupil position of the objective lens is 85% or more of an area of the pupil of the objective lens Moreover, in the sample observation device of the present embodiment, it is preferable that the following condition expression (1) is satisfied:

$$R_0 \times \beta < R_{ob} < R_1 \times \beta \quad (1),$$

where $R_0$ denotes a length from the optical axis of the observation optical system to the inner edge of the transmission part, $R_1$ denotes a length from the optical axis of the observation optical system to the outer edge of the transmission part, $R_{ob}$ denotes a radius of the pupil of the objective lens, and $\beta$ denotes a value obtained by dividing the focal length of the objective lens by the focal length of the condenser lens.

By satisfying the condition expression (1), it is possible to detect a change in shape at the sample as a change in brightness. As a result, even when the sample is colorless and transparent, it is possible to obtain a sample image with shadow.

Figure 6A:
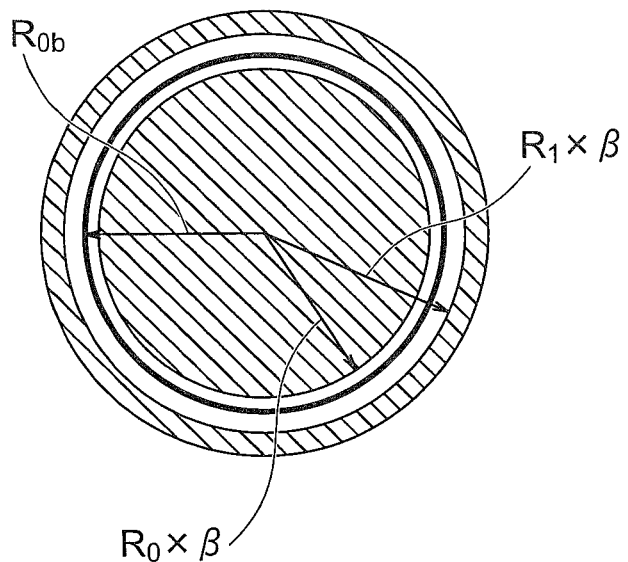
FIG. 6A and FIG. 6B are diagrams showing the relationship between the pupil of the objective lens and an image of the aperture member, where
Figure 6B:
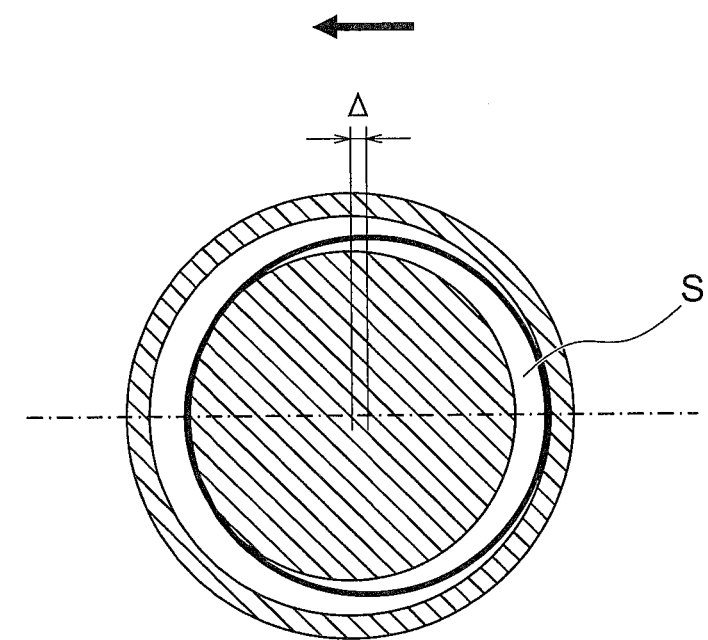

FIG. 6A and FIG. 6B are diagrams showing the relationship between the pupil of the objective lens and an image of the aperture member. Here, FIG. 6A shows the relationship among the length $R_0$ from the optical axis to the inner edge of the transmission part, the length $R_1$ from the optical axis to the outer edge of the transmission part, and the radius $R_{ob}$ of the pupil of the objective lens.

As shown in FIG. 6A, the relationship among $R_0$, $R_1$ and $R_{ob}$ is $R_0 \times \beta < R_{ob}$, $R_{ob} < R_1 \times \beta$. By satisfying $R_0 \times \beta < R_{ob}$, an image of the inner edge of the transmission part is formed inside of the outer edge of the pupil of the objective lens. By satisfying $R_{ob} < R_1 \times \beta$, an image of the outer edge of the transmission part is formed outside of the outer edge of the pupil of the objective lens. As a result, it is possible to detect a change in shape at the sample as a change in brightness.

It is preferable that the shape of the aperture member is an axisymmetrical shape. With this configuration, the generated direction of shadow is not limited.

As the axis symmetrical shape, a circle and a polygon are available, for example. When the shape of the light-shielding part is made to be a circle and the shape of the transmission part is made to be an annulus, then $R_0$ denotes the radius of the inner edge of the annulus, and $R_1$ denotes the radius of the outer edge of the annulus. When the shape of the light-shielding part is made to be a polygon and the shape of the transmission part is made to be an annular polygon, then $R_0$ denotes the radius of a circle inscribed in the polygon inside of the transmission part, and $R_1$ denotes the radius of a circle circumscribed in the polygon outside of the transmission part.

Moreover, in the sample observation device of the present embodiment, at the pupil position of the objective lens, a center of the image of the transmission part preferably coincides with a center of the pupil of the objective lens.

With this configuration, the generated direction of shadow is not limited.

Moreover, in the sample observation device of the present embodiment, it is preferable that the following condition expression (2) is satisfied:

$$(R_{ob} - R_0 \times \beta)/(R_1 \times \beta - R_{ob}) < 1 \quad (2)$$

where $R_0$ denotes the length from the optical axis of the observation optical system to the inner edge of the transmission part, $R_1$ denotes the length from the optical axis of the observation optical system to the outer edge of the transmission part, $R_{ob}$ denotes the radius of the pupil of the objective lens, and $\beta$ denotes the value obtained by dividing the focal length of the objective lens by the focal length of the condenser lens.

By satisfying the condition expression (2), it is possible to detect a change in shape at the sample as a change in brightness. As a result, even when the sample is colorless and transparent, it is possible to obtain a sample image with shadow.

FIG. 6B is a diagram showing the displacement of an image of the aperture member with reference to the pupil of the objective lens. In FIG. 6B, the center of the image of the aperture member is displaced from the center of the pupil of the objective lens. In the drawing, Δ denotes the amount of the displacement, and S denotes the region (area) of a light flux passing through the pupil of the objective lens. In FIG. 6B, a shape of the image of the light-shielding part (e.g., the image 21 of the light-shielding part in FIG. 3B) is a circle and a shape of the image of the transmission part is an annulus, and they are concentric. In this case, the displacement of the image of the transmission part is equal to the displacement of the center of the image of the aperture member with reference to the center of the pupil of the objective lens. Therefore, the displacement amount Δ in FIG. 6B also is the displacement amount of the image of the transmission part.

Figure 7A:
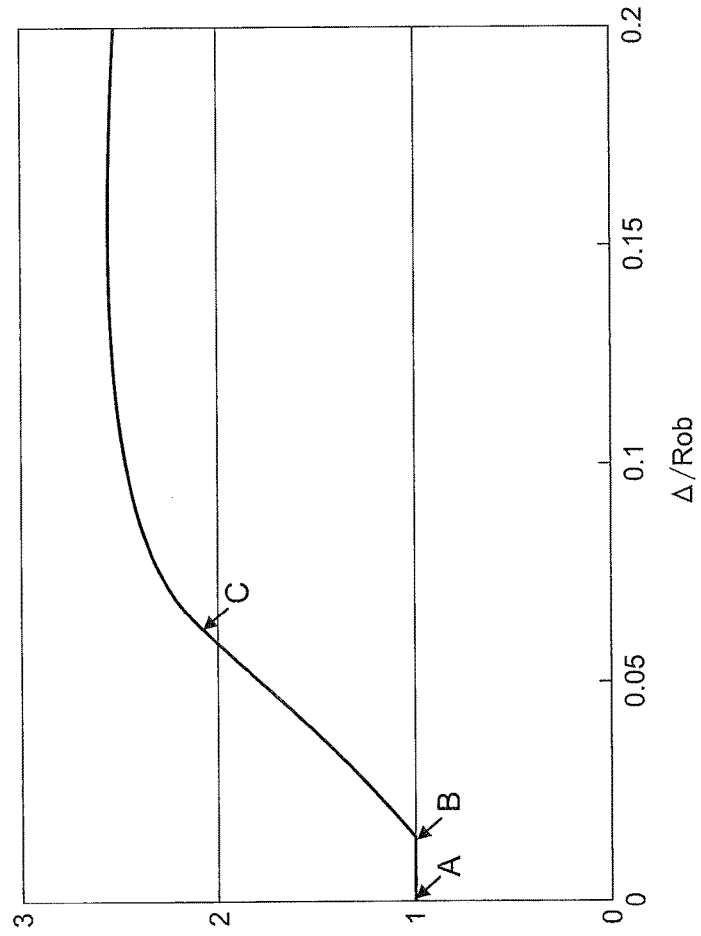
FIG. 7A is a graph showing the relationship between the displacement amount of an image of the aperture member with reference to the pupil of the objective lens, and the amount of a light flux passing through the pupil of the objective lens.

In FIG. 6B, when the displacement amount Δ is changed, the area S also changes. Then, the result of calculating the area S while changing the displacement amount Δ is shown in FIG. 7A, FIG. 7B, FIG. 7C and FIG. 7D. FIG. 7A is a graph showing the relationship between the displacement amount of an image of the aperture member with reference to the pupil of the objective lens, and the amount of a light flux passing through the pupil of the objective lens, and FIG. 7B, FIG. 7C and FIG. 7D are diagrams showing the displacement of an image of the aperture member with reference to the pupil of the objective lens. Here, FIG. 7B shows the case where no displacement occurs, FIG. 7C shows the case where small displacement occurs, and FIG. 7D shows the case where large displacement occurs.

In the graph of FIG. 7A, calculation is performed based on $R_0 \times \beta = 0.97 \times R_{ob}$, $R_1 \times \beta = 1.15 \times R_{ob}$. The transmittance of the transmission part is 100%. Moreover, in FIG. 7A, the numerical values on the horizontal axis represent the displacement amount Δ that is normalized with the radius $R_{ob}$ of the pupil of the objective lens. The numerical values on the vertical axis are obtained by normalizing with the area ($\pi(R_{ob}^2 - (R_0 \times \beta)^2)$) when the displacement amount Δ is 0.

The area S indicates the area of a light flux passing through the pupil of the objective lens. Therefore, the area S can be replaced with the amount I of the light flux. Then, in FIG. 7A, I is used as a variable of the vertical axis.

In the case where no sample is present (alternatively, the surface of the sample is flat), the displacement amount Δ is 0. In this case, the relationship between the pupil of the objective lens and an image of the aperture member becomes as in A (FIG. 7B). Therefore, the amount I of the light flux becomes 1 as shown in arrow A.

Next, in the case where a sample is present, the displacement amount Δ is not 0. Here, when the inclination of the sample surface is small, the relationship between the pupil of the objective lens and an image of the aperture member becomes as in B (FIG. 7C). However, although A and B differ in the position of the image of the light-shielding part in the pupil of the objective lens, the image of the light-shielding part is located inside of the outer edge of the pupil of the objective lens in both cases. Accordingly, the amount I of the light flux becomes 1 as shown in arrow B.

On the other hand, when the inclination of the sample surface is large, the relationship between the pupil of the objective lens and an image of the aperture member becomes as in C. In this case, a part of the image of the light-shielding part is located outside of the pupil of the objective lens (FIG. 7D). Therefore, the amount I of the light flux becomes more than 1 as shown in arrow C.

As just described, in the sample observation device of the present embodiment, the amount I of a light flux changes with a change in the displacement amount Δ between arrow B and arrow C. Therefore, according to the sample observation device of the present embodiment, it is possible to detect a change in shape at the sample as a change in brightness. As a result, even when the sample is colorless and transparent, it is possible to obtain a sample image with shadow.

In the present embodiment, "the image of the inner edge of the transmission part is formed inside of the outer edge of the pupil of the objective lens" includes not only the case where the entire image of the inner edge of the transmission part is included inside of the outer edge of the pupil of the objective lens as shown in FIG. 7B, but also the case where a part of the image of the inner edge of the transmission part is included as shown in FIG. 7C.

If ($R_{ob} - R_0 \times \beta$) is too large, the condition expression (2) is not satisfied. In this case, the size of the image of the light-shielding part becomes too small. Therefore, the interval between arrow A and arrow B becomes long. In this case, it becomes difficult to detect a fine change in shape at the sample (change in inclination) as a change in brightness.

Moreover, if ($R_1 \times \beta - R_{ob}$) is too small, the condition expression (2) is not satisfied. In this case, the interval from the image of the outer edge of the transmission part to the outer edge of the pupil of the objective lens is too narrow. When the displacement amount Δ becomes larger, then the annular light-shielding part (the light-shielding part 5'a2 shown in FIG. 2B, for example) is located inside of the outer edge of the pupil of the objective lens. Therefore, the light flux passing through the pupil of the objective lens becomes less. As a result, the sample image becomes dark.

Moreover, in the sample observation device of the present embodiment, it is preferable that the following condition expressions (3) and (4) are satisfied:

$$0.7 \leq (R_0 \times \beta)/R_{ob} < 1 \tag{3), and}$$

$$1 < (R_1 \times \beta)/R_{ob} \leq 2 \tag{4}$$

where $R_0$ denotes the length from the optical axis of the observation optical system to the inner edge of the transmission part, $R_1$ denotes the length from the optical axis of the observation optical system to the outer edge of the transmission part, $R_{ob}$ denotes the radius of the pupil of the objective lens, and β denotes the value obtained by dividing the focal length of the objective lens by the focal length of the condenser lens.

When falling below the lower limit value of the condition expression (3), the interval from the image of the inner edge of the transmission part to the outer edge of the pupil of the objective lens becomes too wide. In this case, it becomes difficult to make a difference in the amount of a light flux passing through the pupil of the objective lens between the case where the displacement amount Δ is 0 and the case where it is not 0. Therefore, it becomes difficult to detect a change in shape at the sample as a change in brightness. As a result, it becomes difficult to obtain a sample image with shadow. Alternatively, the contrast of a sample image deteriorates.

When exceeding the upper limit value of the condition expression (3), the image of the transmission part will be always located outside of the pupil of the objective lens. Accordingly, it is not possible to detect a change in shape at the sample as a change in brightness. Therefore, exceeding the upper limit value of the condition expression (3) does not occur.

When falling below the lower limit value of the condition expression (4), the image of the transmission part will be located inside of the pupil of the objective lens. Accordingly, it becomes difficult to detect a change in shape at the sample as a change in brightness. Therefore, falling below the lower limit value of the condition expression (4) does not occur.

By making so as not to exceed the upper limit value of the condition expression (4), a light flux passing through a part outside of the effective aperture of the objective lens can be decreased. Therefore, the generation of flare and the generation of ghost can be prevented.

It is preferable that the following condition expression (3') is satisfied instead of condition expression (3):

$$0.8 \leq (R_0 \times \beta)/R_{ob} < 1 \quad (3').$$

Further, it is more preferable that the following condition expression (3") is satisfied instead of condition expression (3):

$$0.9 \leq (R_0 \times \beta)/R_{ob} < 1 \quad (3").$$

It is preferable that the following condition expression (4') is satisfied instead of condition expression (4):

$$1 < (R_1 \times \beta)/R_{ob} \leq 1.5 \quad (4').$$

Further, it is more preferable that the following condition expression (4") is satisfied instead of condition expression (4):

$$1 < (R_1 \times \beta)/R_{ob} \leq 1.3 \quad (4").$$

Moreover, in the condition expressions (3), (3') and (3"), it is preferable that the upper limit value is set at 0.99, more preferably at 0.98. Moreover, in the condition expressions (4), (4') and (4"), it is preferable that the lower limit value is set at 1.01 or 1.05, more preferably at 1.10.

Moreover, in the sample observation device of the present embodiment, it is preferable that the transmittance at the transmission part varies from place to place. Moreover, it is preferable that the following condition expression (5) is satisfied:

$$T_{in} < T_{out} \quad (5),$$

where $T_{in}$ denotes a transmittance in a vicinity of the inner edge of the transmission part, and $T_{out}$ denotes a transmittance in a vicinity of the outside of the transmission part.

As stated above, when the transmittance is the same at the transmission part as a whole, the state where the amount I of a light flux does not change even when the displacement amount Δ changes (between arrow A and arrow B shown in FIG. 7A) occurs. Then, it is preferable that the transmittance at the transmission part varies from place to place. Moreover, at this time, it is preferable that the following condition expression (5) is satisfied:

$$T_{in} < T_{out} \quad (5),$$

where $T_{in}$ denotes the transmittance in a vicinity of the inner edge of the transmission part, and $T_{out}$ denotes the transmittance in a vicinity of the outside of the transmission part.

By satisfying the condition expression (5), it is possible to decrease the state where the amount I of a light flux does not change with a change in the displacement amount Δ. As a result, it is possible to detect a finer change in shape at the sample (change in inclination) as a change in brightness.

Figure 8A:
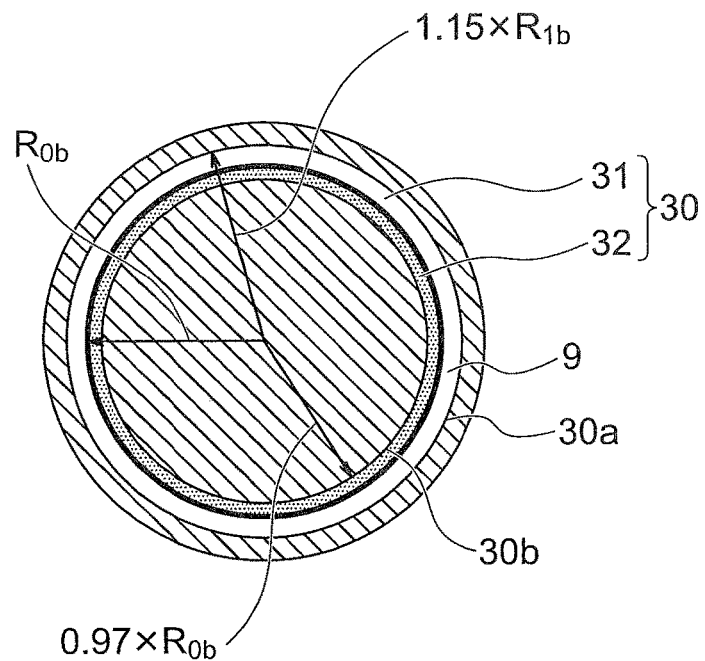
FIG. 8A and FIG. 8B are diagrams showing the relationship between the pupil of the objective lens and the image of the aperture member, where
Figure 8B:
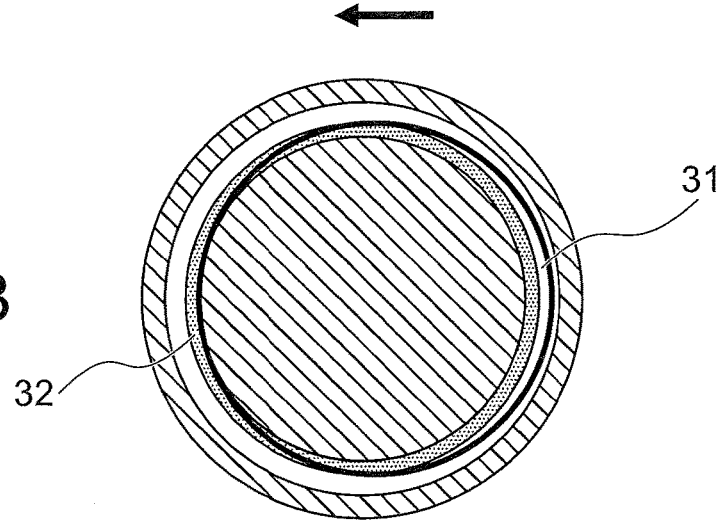

FIG. 8A and FIG. 8B are diagrams showing the relationship between the pupil of the objective lens and the image of the aperture member, where FIG. 8A shows the case where no sample is present, and FIG. 8B shows the case where a sample is present. Although not shown in FIG. 8A and FIG. 8B, the aperture member includes a transmission part whose transmittance varies from place to place.

In the case where no sample is present, as shown in FIG. 8A, a shape of an image 30 of the transmission part is an annulus, and a shape of the pupil 9 of the objective lens is a circle. Then, the image 30 of the transmission part and the pupil 9 of the objective lens are concentric. Moreover, the center of the image 30 of the transmission part and the center of the pupil 9 of the objective lens coincide with each other.

The image 30 of the transmission part includes a region 31 and a region 32. The region 31 is a region from the outer edge of the pupil 9 of the objective lens to an image 30a of the outer edge of the transmission part. The region 32 is a region from an image 30b of the inner edge of the transmission part to the outer edge of the pupil 9 of the objective lens. Then the transmittance at the transmission part of the aperture member 5 defining the region 31 is higher than the transmittance of the transmission part of the aperture member 5 defining the region 32.

In the case where no sample is present, the region 32 only is located inside of the outer edge of the pupil 9 of the objective lens. Therefore, the area of this region as a whole corresponds to the brightness of the sample image.

On the other hand, in the case where a sample is present, as shown in FIG. 8B, the image 30 of the transmission part and the pupil 9 of the objective lens are not concentric. Moreover, the center of the image 30 at the transmission part and the center of the pupil 9 of the objective lens do not coincide with each other. That is, the center of the image 30 of the transmission part is shifted to the left on the sheet with reference to the center of the pupil 9 of the objective lens.

In this case, a part of the region 32 is located outside of the outer edge of the pupil 9 of the objective lens. On the other hand, a part of the region 31 is located inside of the outer edge of the pupil 9 of the objective lens. As a result, the region 31 and the region 32 are located inside of the outer edge of the pupil 9 of the objective lens. Therefore, the area of this region as a whole corresponds to the brightness of the sample image.

As stated above, in the case where no sample is present, the region 32 only is located inside of the outer edge of the pupil 9 of the objective lens. On the other hand, in the case where a sample is present, the region 31 and the region 32 are located inside of the outer edge of the pupil 9 of the objective lens. Therefore, the brightness of a sample image differs between the case where no sample is present and the case where a sample is present.

In the case where a sample is present, the ratio occupied by the region 31 increases inside of the outer edge of the pupil 9 of the objective lens, and the ratio occupied by the region 32 decreases. Therefore, the brightness of a sample image is brighter in the case where a sample is present than in the case where no sample is present.

Moreover, in both of the cases where no sample is present and a sample is present, an image of the light-shielding part is located inside of the outer edge of the pupil 9 of the objective lens. Nevertheless, as stated above, the brightness of a sample image differs between the case where no sample is present and the case where a sample is present.

The result of calculating the area S while changing the displacement amount Δ is shown in FIG. 9A, FIG. 9B, FIG. 9C and FIG. 9D. FIG. 9A is a graph showing the relationship between the displacement amount of an image of the aperture member with reference to the pupil of the objective lens, and the amount of a light flux passing through the pupil of the objective lens, and FIG. 9B, FIG. 9C and FIG. 9D are diagrams showing the displacement of an image of the aperture member with reference to the pupil of the objective lens. Here, FIG. 9B shows the case where no displacement occurs, FIG. 9C shows the case where small displacement occurs, and FIG. 9D shows the case where large displacement occurs.

In the graph of FIG. 9A, calculation is performed based on $R_0 \times \beta = 0.97 \times R_{ob}$, $R_1 \times \beta = 1.15 \times R_{ob}$. Moreover, the transmission part is divided into two regions, and the inner region (the region 32 having low transmittance in FIG. 8A) has the transmittance of 50%, and the outer region (the region 31 having high transmittance in FIG. 8A) has the transmittance of 100%. In FIG. 9A, the numerical values on the horizontal axis and the vertical axis are normalized.

Moreover, in FIG. 9 also, drawings showing the relationship between the pupil of the objective lens and the image of the aperture member is shown in A (FIG. 9B), B (FIG. 9C) and C (FIG. 9D). Since these drawings correspond to the drawings (A, B and C) showing the relationship between the pupil of the objective lens and the image of the aperture member in FIG. 7B, FIG. 7C and FIG. 7D, their detailed descriptions are omitted.

As is found from a comparison between FIG. 7A and FIG. 9A, at the aperture member whose transmittance varies from place to place at the transmission part, the amount I of a light flux changes with a change in the displacement amount Δ between arrow A and arrow B as well. Therefore, according to the observation device of the present embodiment, it is possible to detect a fine change in shape at the sample (change in inclination) as a change in brightness.

In the case where no sample is present, the transmittance of the transmission part located inside of the pupil 9 of the objective lens (the region 32 having low transmittance in FIG. 8A) is 50% in FIG. 9B, FIG. 9C and FIG. 9D, and 100% in FIG. 7B, FIG. 7C and FIG. 7D. As just described, the transmittance with no displacement is smaller in FIG. 9B than in FIG. 7B. Therefore, the brightness of the sample image becomes darker in FIG. 9B than in FIG. 7B.

Figure 10A:
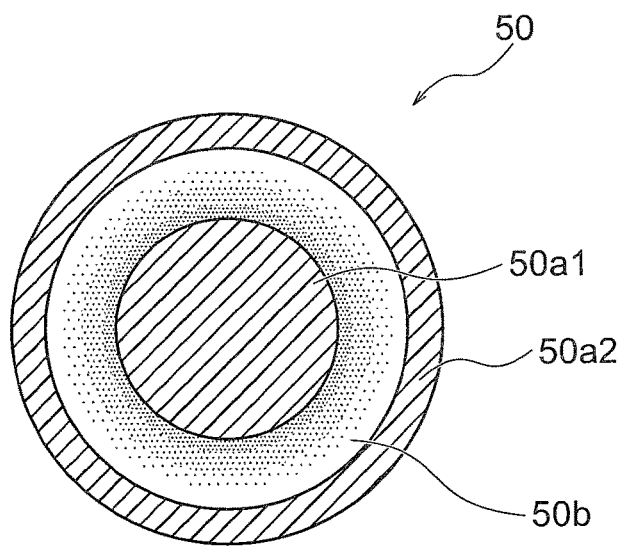
FIG. 10A and FIG. 10B are diagrams relating to the aperture member, where
Figure 10B:
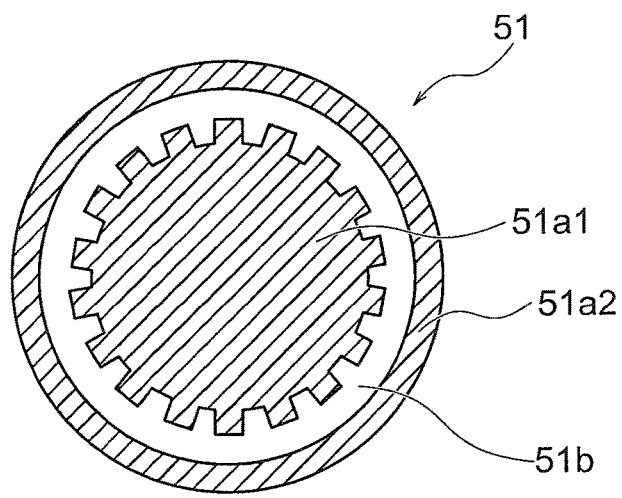

Another example of the aperture member having a transmission part whose transmittance varies from place to place is shown. FIG. 10A and FIG. 10B are diagrams showing the configuration of the aperture member, where FIG. 10A shows the aperture member having a transmission part whose transmittance changes continuously, and FIG. 10B shows the aperture member having a transmission part whose transmittance changes in a stepwise manner.

As shown in FIG. 10A, an aperture member 50 includes a light-shielding part 50a1 and a transmission part 50b. Further, the aperture member 50 includes a light-shielding part 50a2. The light-shielding parts 50a1 and 50a2, and the transmission part 50b are made of a transparent member, such as a glass plate. The light-shielding parts 50a1 and 50a2 are formed by applying light-shielding paint on a glass plate, for example.

Meanwhile, in the transmission part 50b, the transmittance changes continuously. To this end, a reflective film (absorption film) whose transmittance changes continuously is formed on the transmission part 50b, for example. Here, the direction where the transmittance changes is the direction from the center toward the periphery (from the side of the light-shielding part 50a1 to the side of the light-shielding part 50a2). Moreover, the transmittance changes so as to increase gradually from the center toward the periphery.

Moreover, as shown in FIG. 10B, an aperture member 51 includes a light-shielding part 51a1 and a transmission part 51b. Further, the aperture member 51 includes a light-shielding part 51a2. The light-shielding parts 51a1 and 51a2, and the transmission part 51b are made of a transparent member, such as a glass plate. The light-shielding parts 51a1 and 51a2 are formed by applying light-shielding paint on a glass plate, for example.

Meanwhile, in the transmission part 51b, a region where the transmittance changes in a stepwise manner and a region where the transmittance is constant are included. Here, the region where the transmittance changes in a stepwise manner is located on the side of the light-shielding part 51a1 and the region where the transmittance is constant is located on the side of the light-shielding part 51a2. In the region where the transmittance changes in a stepwise manner, a region with the transmittance of 100% and a region with the transmittance of 0% are alternately formed along the circumference of the circle having the axis at the center of the light-shielding part 51a1. Moreover, in the region where the transmittance is constant, the transmittance is 100%. Although the boundary between the region with the transmittance of 100% and a region with the transmittance of 0% is a rectangular shape, which may be a sow-tooth shape or a sinusoidal shape. The transmittance of each region is not limited to the above-mentioned values.

At the aperture member 50 and the aperture member 51, the transmittance at the transmission part varies from place to place. Therefore, according to the observation device of the present embodiment including such aperture members, it is possible to detect a fine change in shape at the sample (change in inclination) as a change in brightness.

Moreover, in the sample observation device of the present embodiment, it is preferable that the sample observation device includes a plurality of light sources, and the plurality of light sources are disposed at the transmission part. In this case, it is possible to omit the light source 1 and the lenses 2 and 3 in FIG. 1.

Figure 11:
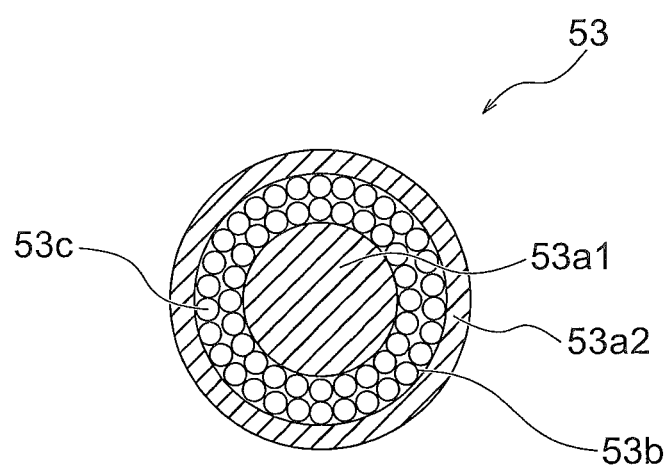
FIG. 11 is a diagram showing the configuration of the aperture member, showing the case where plurality of light sources are disposed at the transmission part.

FIG. 11 is a diagram showing the configuration of the aperture member, showing the case where a plurality of light sources are disposed at the transmission part. As shown in FIG. 11, an aperture member 53 includes a light-shielding part 53a1 and a transmission part 53b. Further, the aperture member 53 includes a light-shielding part 53a2. The light-shielding parts 53a1 and 53a2, and the transmission part 53b are made of a transparent member, such as a glass plate. The light-shielding parts 53a1 and 53a2 are formed by applying light-shielding paint on a glass plate, for example.

Meanwhile, at the transmission part 53b, a plurality of light sources, such as LEDs 53c, are disposed. In FIG. 11, the plurality of LEDs 53c are disposed to form two lines of an annular shape. With this configuration, by changing the number of the lines which emit light, it is possible to change the size (width) of the transmission part. Further, by changing the brightness of the LEDs 53c, it is possible to make the transmittance at the transmission part different from place to place.

In other words, the sample observation device of the present embodiment includes an illumination optical system and an observation optical system, and the illumination optical system includes a plurality of light sources and a condenser lens, and the observation optical system includes an objective lens and an imaging lens, and an image of the inner edge of the plurality of light sources is formed inside of the outer edge of the pupil of the objective lens, and an image of the outer edge of the plurality of light sources is formed outside of the outer edge of the pupil of the objective lens.

Moreover, the LEDs 53c may be disposed at the light-shielding part 53a1 as well. By making the LEDs 53c disposed at the light-shielding part 53a1 to be turned off or on, illumination in accordance with the observation method can be performed.

In the sample observation device of the present embodiment, it is preferable that the sample observation device includes another aperture member that is different from the aperture member, and includes a moving mechanism to move the aperture member and the other aperture member.

With this configuration, it is possible to change the size or the position of an image of the transmission part. That is, by replacing the aperture member with a different aperture member, it is possible to change the length $R_0$ from the optical axis to the inner edge of the transmission part and the length $R_1$ from the optical axis to the outer edge of the transmission part freely. Therefore, it is possible to create an illumination state which generates the best shadow in accordance with the sample.

Further, when a phase-contrast objective lens is used, the following advantageous effect can be obtained. Phase-contrast observation can be performed by using a ring slit for phase-contrast observation as the illumination aperture, and observation by the sample observation device of the present embodiment can be performed by using the aperture member shown in FIG. 2A and FIG. 2B. That is, the observation by the sample observation device of the present embodiment and the phase-contrast observation can be performed without changing the objective lens. For other methods such as differential interference observation and Hoffmann modulation contrast observation as well, an observation by these methods and the observation by the sample observation device of the present embodiment can be performed similarly without changing the objective lens.

In the sample observation device of the present embodiment, it is preferable that the observation optical system includes an aperture member, and the aperture member is disposed at a pupil position of the objective lens, or at a position that is conjugate to the pupil position of the objective lens.

With this configuration, it is possible to change the size of the pupil of the objective lens with reference to the image of the transmission part. Therefore, it is possible to generate shadow most effectively in accordance with the sample.

Moreover, if vignetting occurs, the size of a light flux differs between the light flux emitted from the center of the sample and reaching the center of the sample image (hereinafter, referred to as "axial light flux" as appropriate) and the light flux emitted from the periphery of the sample and reaching the periphery of the sample image (hereinafter, referred to as "off-axis light flux" as appropriate). Typically if vignetting occurs, a shape of the off-axis light flux becomes a substantially an ellipse while a shape of the axial light flux is a circle.

Therefore, in the off-axis light flux, a state where the image of the transmission part is formed inside of the outer edge of the pupil of the objective lens occurs. Then, the relationship between the displacement amount Δ and the amount I of light flux differs between the center and the periphery of the sample image.

Then, by disposing an aperture member at the observation optical system, it is possible to make the vignetting small. With this configuration, it is possible to make the shape of the off-axis light flux to be a circle. Therefore, in the off-axis light flux as well, an image of the inner edge of the transmission part is formed inside of the outer edge of the pupil of the objective lens, and an image of the outer edge of the transmission part is formed outside of the outer edge of the pupil of the objective lens. As a result, the relationship between the displacement amount Δ and the amount I of light flux is the same between the periphery of the sample image and the center thereof. Therefore, a sample image free from unevenness of brightness can be obtained from the center to the periphery.

A similar effect will be obtained by using an objective lens having small vignetting. For an objective lens having small vignetting, a lens having a larger outer diameter is used than for an objective lens having large vignetting. In this case, a difference in diameter between the off-axis light flux and the axial light flux decreases. As a result, a sample image free from unevenness of brightness can be obtained from the center to the periphery. From this, it is preferable to use an objective lens having small vignetting.

In the sample observation device of the present embodiment, it is preferable that the light source is a monochromatic light source or the illumination optical system includes wavelength selection means.

Since the wavelength band of the illumination light can be narrowed, it is possible to suppress generation of chromatic aberration of the pupil. Therefore, it is possible to improve the contrast of a sample image.

In the sample observation device of the present embodiment as stated above and in the sample observation device of the present embodiment described below, it is preferable that the sample observation device includes an image processing device.

An image with better contrast can be obtained. Moreover, when an image of the sample is obtained by monochrome, the image of the sample can be converted to have a color suitable for the observation.

Figure 12:
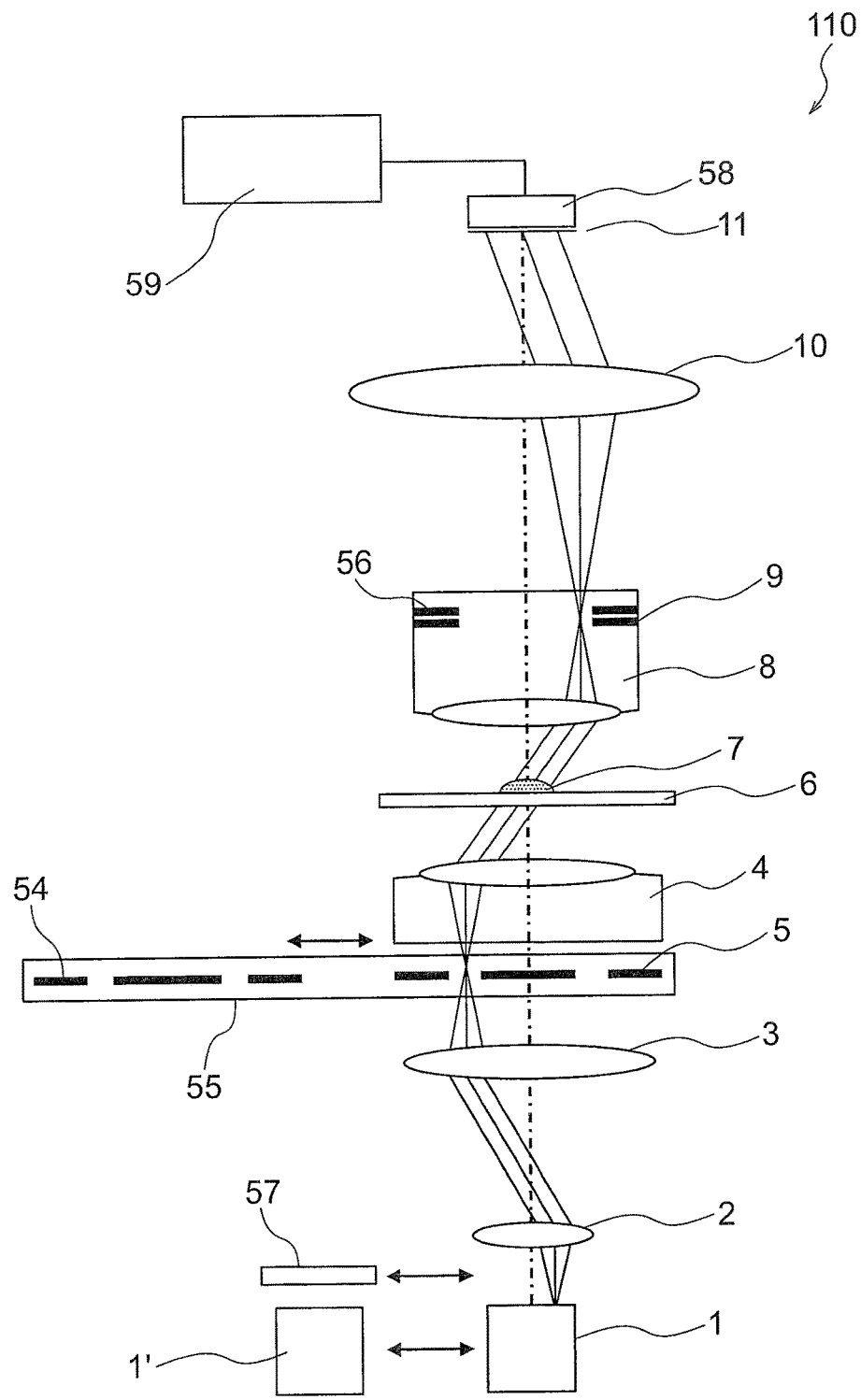
FIG. 12 is a diagram showing the configuration of another sample observation device of an embodiment.

FIG. 12 is a diagram showing the configuration of another sample observation device of the present embodiment. The same reference numerals are assigned to the same configurations as those in FIG. 1, and their detailed descriptions are omitted.

A sample observation device 110 includes an aperture member 5 and an aperture member 54. The aperture member 5 and the aperture member 54 are held at a moving mechanism 55. A slider or a turret is available as the moving mechanism 55, for example. When the moving mechanism 55 is a slider, the aperture member 5 and the aperture member 54 move in the direction orthogonal to the optical axis of the observation optical system. When the moving mechanism 55 is a turret, the aperture member 5 and the aperture member 54 rotate around an axis parallel to the optical axis of the observation optical system.

As just described, it is preferable that the aperture member for sample observation including the objective lens of the present embodiment is disposed at the illumination optical system of the sample observation device, and includes a first aperture member and a second aperture member, and the first aperture member and the second aperture member are different apertures. Then a transmission part of the first aperture member is preferably configured so that an image of an inner edge of the transmission part is formed inside of an outer edge of a pupil of a first objective lens, and an image of an outer edge of the transmission part of the first aperture member is formed outside of the outer edge of the pupil of the first objective lens. The first aperture member and the second aperture member are different, it means that the position or the size of the transmission part differs between the first aperture member and the second aperture member.

Moreover, the second aperture member may have a transmission part corresponding to a second objective lens having different magnification from that of the first objective lens which corresponds to the first aperture member. That is, the transmission part of the second aperture member is preferably configured so that an image of an inner edge of the transmission part is formed inside of an outer edge of a pupil of the second objective lens, and an image of an outer edge of the transmission part of the second aperture member is formed outside of the outer edge of the pupil of the second objective lens.

Moreover, when bright-field observation is performed by the second aperture member, the second aperture member may be configured to include the transmission part at a center. Moreover, when phase-contrast observation is performed using the first objective lens by the second aperture member, the second aperture member may be configured to include the transmission part whose diameter is smaller than the diameter of the transmission part of the first aperture member.

Moreover, it is preferable that the aperture member for sample observation including the objective lens of the present embodiment may further include a third aperture member, and the second aperture member may include a transmission part for phase-contrast observation, and the third aperture member may include a transmission part for bright-field observation.

As just described, according to the aperture member for sample observation including the objective lens of the present embodiment, it is possible to irradiate the objective lens with light in accordance with various observation methods. Thereby, when observation is performed using the first aperture member, and the sample includes an interested region, it is possible to perform phase-contrast observation or bright-field observation for the interested region by changing the aperture member.

The aperture member may include a transmission region variable part that can change the transmission region of the transmission part. The transmission region variable part may be configured by a liquid-crystal shutter, for example. With this configuration, it is possible to implement the aperture member 5 and the aperture member 54 with one aperture member. In this case, the moving mechanism is not required.

Moreover, in the sample observation device 110, an aperture member 56 is disposed at the position of the pupil 9 of the objective lens. In FIG. 12, for ease in viewing, the position of the pupil 9 of the objective lens and the position of the aperture member 56 are depicted so that they are apart from each other.

Moreover, in the sample observation device 110, a wavelength selection device 57 may be disposed removably in the optical path of the illumination optical system, e.g., between the light source 1 and the lens 2. When the light source 1 is white light, light having a wide wavelength range is emitted from the light source 1. Then, by inserting the wavelength selection element 57 into the optical path, it is possible to select light having a narrower wavelength range than white light as the illumination light. The light source 1 may be a monochromatic light source 1'.

Moreover, the sample observation device 110 may include an image-pickup element 58 and an image processing device 59. The image-pickup element 58 may be a CCD or a CMOS, for example. The image-pickup element 58 is disposed at an image position 11. A sample image picked up by the image-pickup element 58 is sent to the image processing device 59. In the image processing device 59, it is configured to be able to perform processing, such as contrast enhancement, noise removal or color conversion.

By the way, the microscope objective lens is a telecentric optical system. Therefore, the condenser lens also is a telecentric optical system. Accordingly, the pupil position of the condenser lens is a front focal position of the condenser lens. Here, as stated above, in the sample observation device of the present embodiment, the aperture member is disposed at the focal position (front focal position) of the condenser lens 4. With this configuration, a center part of the illumination light is shielded at the pupil position of the condenser lens. However, there is no need to set the position of shielding a center part of the illumination light exactly at the pupil position of the condenser lens, and the position may be in the vicinity of the pupil position of the condenser lens.

Here, as displacement (displacement in the optical axis direction) between the aperture member and the pupil position of the condenser lens increases, an image of the transmission part also is displaced from the pupil of the objective lens. For instance, when the aperture member coincides with the pupil position of the condenser lens, a light beam (hereinafter, referred to as "beam $L_{in}$" as appropriate) passing through the innermost part of the transmission part reaches the inside of the pupil of the objective lens. However, as the aperture member is displaced from the pupil position of the condenser lens, the beam $L_{in}$ heads for from the inside to the outside of the pupil of the objective lens. That is, an image of the transmission part is displaced from the pupil of the objective lens.

Moreover, when the objective lens is changed, the observation area changes. When the observation area changes, the angle of the beam $L_{in}$ with reference to the optical axis also changes. When this angle changes, the position of the beam $L_{in}$ reaching the pupil of the objective lens changes. That is, an image of the transmission part is displaced from the pupil of the objective lens. As a result, generation of shadow will change.

Then, the allowable range of displacement between the aperture member and the pupil position of the condenser lens is set while considering a change in the observation area. In the sample observation device of the present embodiment, the range (allowable range) in the vicinity of the pupil position is desirably within 20% of the focal length of the condenser lens. As long as within this range, it is possible to decrease a difference in the generated direction of shadow and the amount of generation between the center and the periphery of the sample. The range in the vicinity of the pupil position is more preferably within 10% of the focal length of the condenser lens.

Figure 13A:
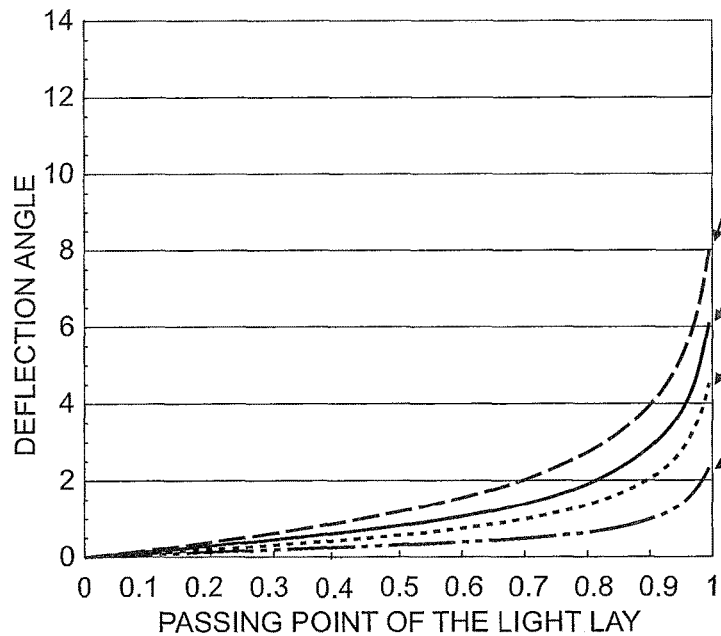
FIG. 13A is a graph showing the relationship between the inclination of a sample surface and the direction of light emitted from the sample.
Figure 13B:
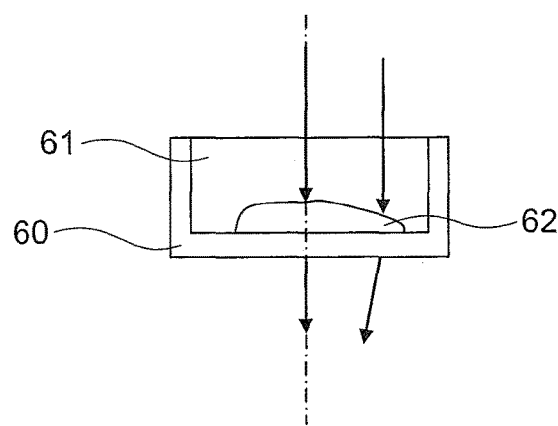
FIG. 13B is a diagram showing a model used for calculation.

As stated above, in the sample observation device of the present embodiment, the direction of light emitted from a sample changes in accordance with the inclination of the sample surface. This state is shown in FIG. 13A, FIG. 13B, FIG. 13C, FIG. 13D, FIG. 13E and FIG. 13F. FIG. 13A is a graph showing the relationship between the inclination of a sample surface and the direction of light emitted from the sample, FIG. 13B is a diagram showing a model used for calculation, and FIG. 13C, FIG. 13D, FIG. 13E and FIG. 13F are diagrams showing models for the sample.

As shown in FIG. 13B, calculation is performed in the state where a sample 62 is held inside of a glass vessel 60 filled with water 61. In this state, a light beam is allowed to enter in the direction parallel to the optical axis. Incidence of the light beam starts on the optical axis, and the incident position of the light beam is moved gradually in the direction away from the optical axis. The position that is furthest from the optical axis corresponds to the end of the sample.

Moreover, the number of models for sample shape is four in total, including a flat shape and a hemispherical shape. Let that "a" denotes the height of a sample and "b" denotes the width, the model shown in FIG. 13C has b/a=1 (hemispherical), the model shown in FIG. 13D has b/a=1.41, the model shown in FIG. 13E has b/a=2, and the model shown in FIG. 13F has b/a=4.

Moreover, in the graph of FIG. 13A, the horizontal axis represents the incident position of the light beam. 0 represents the position on the optical axis (center of the sample), and 1 represents the position furthest from the optical axis (end of the sample). The vertical axis represents deflection angle, which is an angle formed by the light beam emitted from the glass vessel 60 and the optical axis.

As shown in FIG. 13A, the inclination of a surface increases toward the peripheral part of the sample in any model. Therefore, the deflection angle also increases toward the peripheral part of the sample. Moreover, as the shape of the sample becomes closer to a hemispherical shape, the inclination of surface increases. Therefore, as the shape of the sample becomes closer to a hemispherical shape, the deflection angle also increases.

Moreover, in the sample observation device of the present embodiment, it is preferable that the aperture member is made of one transparent member, a light-shielding part is formed on one of the faces of the transparent member, an outside light-shielding part is formed on the one face or on the other face, and the outside light-shielding part is located outside of the light-shielding part.

Figure 14A:
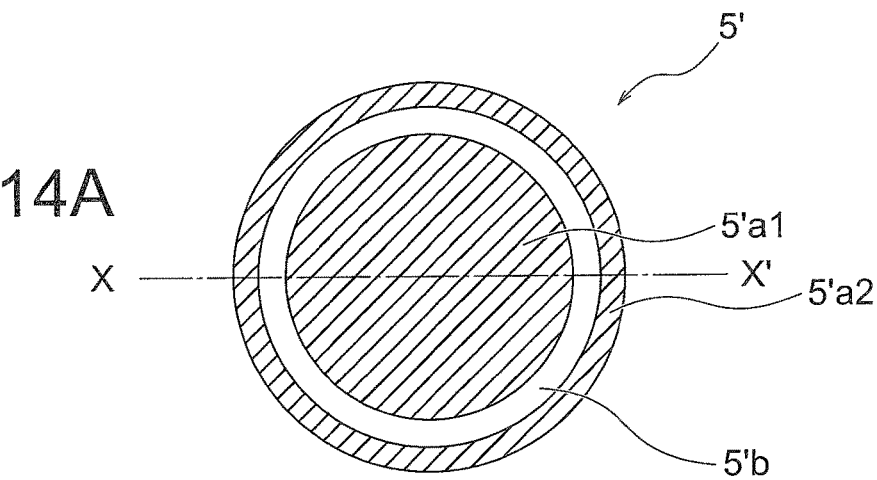
FIG. 14A, FIG. 14B and FIG. 14C are diagrams showing the configuration of the aperture member, where
Figure 14B:
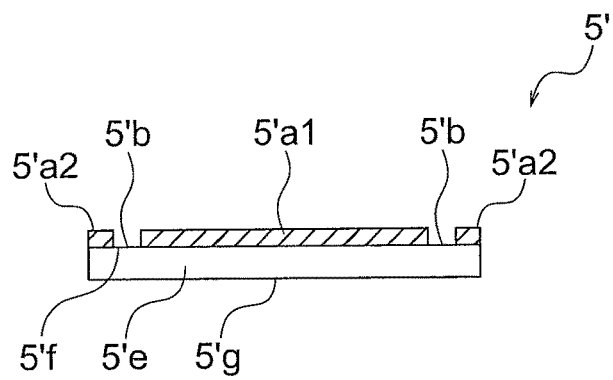
Figure 14C:
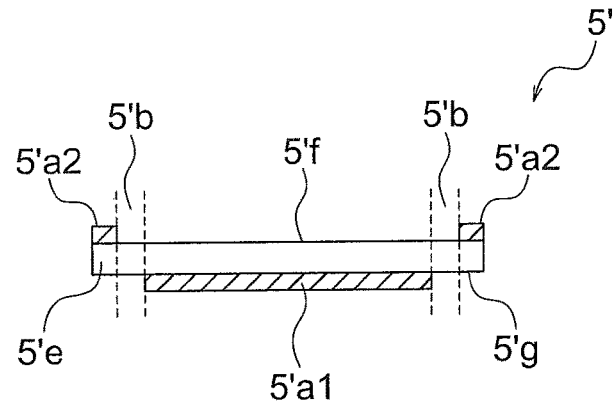

FIG. 14A, FIG. 14B and FIG. 14C are diagrams showing the configuration of the aperture member, where FIG. 14A is a top view, FIG. 14B is a cross-sectional view showing the state where the light-shielding part is formed on one face only, and FIG. 14C is a cross-sectional view showing the state where the light-shielding part is formed on both faces. Since the top view of the aperture member of FIG. 14A is the same as the top view of the aperture member of FIG. 2B, the description on the configuration is omitted.

FIG. 14B is a cross-sectional view taken along XX' of FIG. 14A. Here, in FIG. 14B, the light-shielding part is formed on one face only of the aperture member 5'. A transparent member 5'e is a glass plate or a resin plate, for example. In this aperture member 5', a light-shielding part 5'a1 and a light-shielding part 5'a2 are formed on the upper face 5'f only of the transparent member 5'e. On the other hand, nothing is formed on a lower face 5'g of the transparent member 5'e. A transmission part 5'b is formed between the light-shielding part 5'a1 and the light-shielding part 5'a2.

FIG. 14C also is a cross-sectional view taken along XX' of FIG. 14A. Here, in FIG. 14C, the light-shielding part is formed on both faces of the aperture member 5'. At the aperture member 5' as shown in FIG. 14C, a light-shielding part 5'a2 only is formed on an upper face 5'f of the transparent member 5'e. On the other hand, a light-shielding part 5'a1 only is formed on a lower face 5'g of the transparent member 5'e. A transmission part 5'b is formed between the light-shielding part 5'a2 on the upper face 5'f and the light-shielding part 5'a1 on the lower face 5'g.

In both of FIG. 14B and FIG. 14C, the light-shielding part 5'a1 is disposed so as to include the optical axis of the illumination optical system. On the other hand, the light-shielding part 5'a2 is an outside light-shielding part that is located outside of the light-shielding part 5'a1.

Moreover, in the sample observation device of the present embodiment, it is preferable that the aperture member is made up of a plurality of transparent members, a light-shielding part is formed on one of the plurality of transparent members, an outside light-shielding part is formed on another transparent member, and the outside light-shielding part is located outside of the light-shielding part.

Figure 15A:
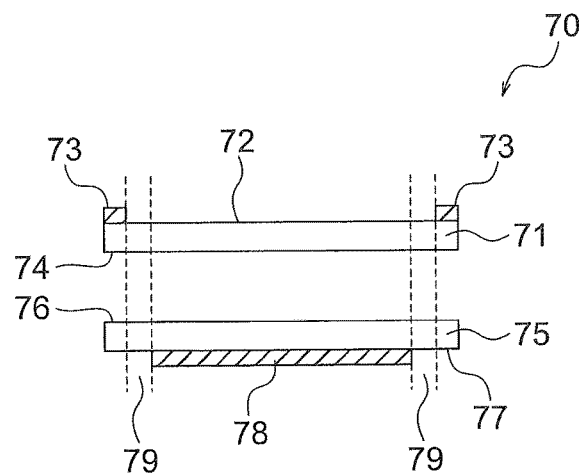
FIG. 15A and FIG. 15B are diagrams showing the configuration of the aperture member, where
Figure 15B:
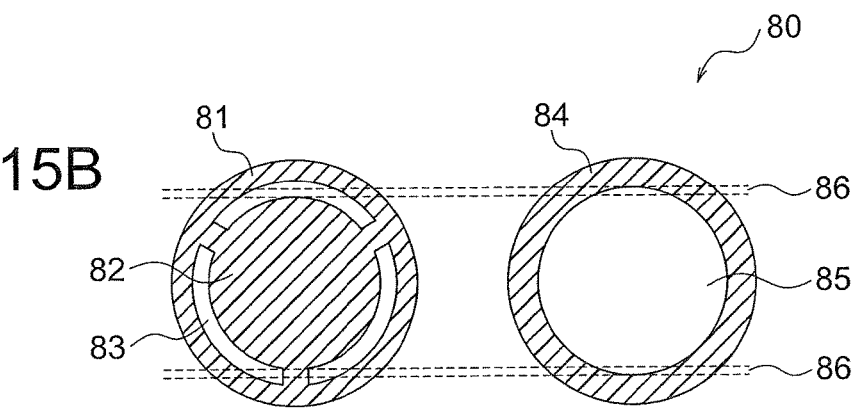

FIG. 15A and FIG. 15B are diagrams showing the configuration of the aperture member, where FIG. 15A is a cross-sectional view showing the aperture member made up of two transparent members, and FIG. 15B is a top view showing the aperture member made up of two opaque members.

In FIG. 15A, an aperture member 70 includes a first transparent member 71 and a second transparent member 75. In the first transparent member 71, a light-shielding part 73 only is formed on an upper face 72, and nothing is formed on a lower face 74. In the second transparent member 75, nothing is formed on an upper face 76, and a light-shielding part 78 only is formed on a lower face 77. A transmission part 79 is formed between the light-shielding part 73 on the upper face 72 and the light-shielding part 78 on the lower face 77.

The light-shielding part 78 is disposed so as to include the optical axis of the illumination optical system. On the other hand, the light-shielding part 73 is an outside light-shielding part, which is located outside of the light-shielding part 78. The light-shielding part 73 of the first transparent member 71 may be formed only on the upper face 72 or only on the lower face 74. Moreover, the light-shielding part 78 of the second transparent member 75 may be formed only on the upper face 76 or only on the lower face 77.

Moreover, in the sample observation device of the present embodiment, it is preferable that the aperture member is made up of a plurality of opaque members, one of the plurality of opaque members includes a light-shielding part, another opaque member includes an outside light-shielding part, and the outside light-shielding part is located outside of the light-shielding part.

In FIG. 15B, an aperture member 80 includes a first opaque member 81 and a second opaque member 84. The first opaque member 81 and the second opaque member 84 are made of a metal plate, for example. Since the first opaque member 81 is the same as the aperture member 5 of FIG. 2A, the description on the configuration is omitted.

The first opaque member 81 includes a light-shielding part 82 and a transmission part 83. The width (width in the radial direction) of the transmission part 83 is sufficiently wide. On the other hand, the second opaque member 84 includes a transmission part 85. Here, the diameter of the transmission part 85 is larger than the diameter of the light-shielding part 82, and is smaller than the diameter of the outer edge of the transmission part 83. By disposing the first opaque member 81 and the second opaque member 84 in parallel so that their centers are substantially on the same axis, transmission part 86 is formed substantially annular shape between the light-shielding part 82 and the outer edge of the transmission part 85.

The light-shielding part 82 is disposed so as to include the optical axis of the illumination optical system. On the other hand, the substantially annular-shaped region of the second opaque member 84 is an outside light-shielding part, which is located outside of the light-shielding part 82.

By the way, diameter of the pupil of the objective lens is different in each objective lens. Therefore, if type of the aperture member is one, an image of the aperture member is not projected at a desired position in the plane of the pupil of the objective lens for some objective lenses. That is, an image of the inner edge of the transmission part cannot be formed inside of the outer edge of the pupil of the objective lens, or an image of the outer edge of the transmission part cannot be formed outside of the outer edge of the pupil of the objective lens. From this, it is preferable to let an aperture member suitable for the objective lens to be used.

From this, the sample observation device of the present embodiment preferably includes a moving mechanism that moves the aperture member, and the moving mechanism includes a rotating plate and a shaft member, and the rotating plate includes a plurality of holding parts.

Figure 16A:
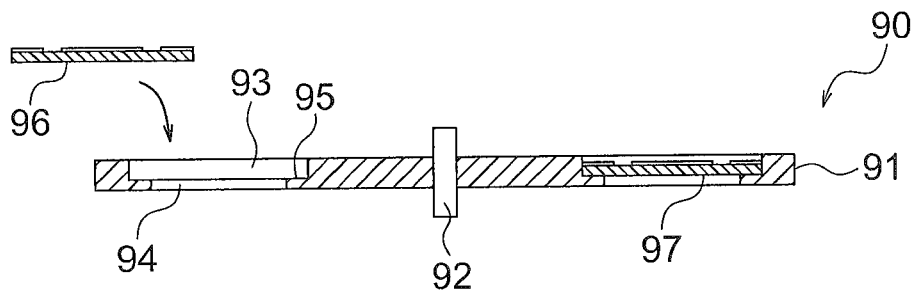
FIG. 16A, FIG. 16B and FIG. 16C are cross-sectional views showing the configuration of the moving mechanism, where
Figure 16B:
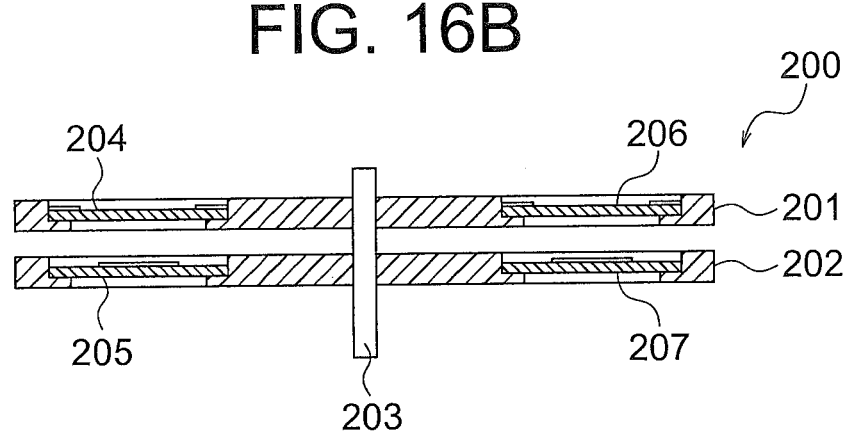
Figure 16C:
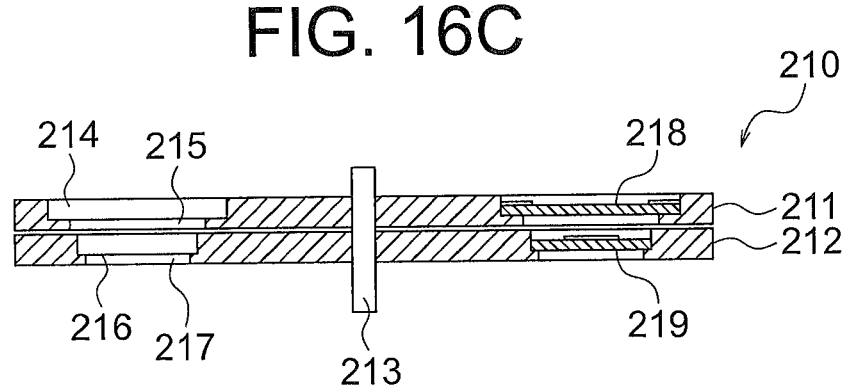

FIG. 16A, FIG. 16B and FIG. 16C are cross-sectional views showing the configuration of the moving mechanism, where FIG. 16A is a diagram showing a moving mechanism made up of one rotating plate, FIG. 16B is a diagram showing a moving mechanism made up of two rotating plates, and FIG. 16C is a diagram showing another moving mechanism made up of two rotating plates.

A moving mechanism 90 of FIG. 16A includes a rotating plate 91 and a shaft member 92. The rotating plate 91 rotates around the shaft member 92 as the axis. In the rotating plate 91, a plurality of holding parts are formed. Each holding part is made up of a concave portion 93 and a through hole 94. The concave portion 93 and the through hole 94 are both a circular shape, and the concave portion 93 is formed above the through hole 94. The diameter of the concave portion 93 is larger than the diameter of the through hole 94. Therefore, at the boundary between the concave portion 93 and the through hole 94, a reception face 95 is formed.

An aperture member 96 is a circular shape, and the diameter thereof is smaller than the diameter of the concave portion 93 and is larger than the diameter of the through hole 94. Therefore, when the aperture member 96 is inserted in the holding part, the peripheral part of the aperture member 96 comes into contact with the reception face 95. With this configuration, it is possible to hold the aperture member 96. Moreover, in another holding part, an aperture member 97 is held in a similar manner. Widths of a transmission parts is different between the aperture member 96 and the aperture member 97.

As just described, by holding two aperture members having different widths of transmission parts with the rotating plate, it is possible to dispose an aperture member suitable for the objective lens used in the illumination optical system by rotating the rotating plate. The number of the holding parts is not limited two, and three or more of the holding parts may be disposed.

In the moving mechanism 90, since the aperture members and the objective lenses correspond one-to-one, it is necessary to prepare the aperture members in number corresponding to the objective lenses. Therefore, as the number of objective lenses used increases, types of the aperture members also increase.

Then, it is preferable to make up the aperture member by two transparent members. For instance, a plurality of first transparent members 71 and second transparent members 75 shown in FIG. 15A are prepared. Then, in the first transparent members 71, diameter of the light-shielding parts 73 are made to be different variously, and in the second transparent members 75, diameter of the light-shielding parts 78 are made to be different variously. Then such first transparent members 71 and second transparent members 75 may be combined variously. With this configuration, it is possible to change the position and the width of the transmission parts 79 variously.

From this, the sample observation device of the present embodiment preferably includes a moving mechanism that moves the aperture member, and the moving mechanism includes a plurality of rotating plates and a shaft member, and each rotating plate includes a plurality of holding parts.

As shown in FIG. 16B, a moving mechanism 200 includes a first rotating plate 201, a second rotating plate 202 and a shaft member 203. Since the first rotating plate 201 and the second rotating plate 202 are the same as the rotating plate 91, the description on their configuration is omitted. The diameter of the holding parts is the same for the first rotating plate 201 and the second rotating plate 202.

In the moving mechanism 200, a transparent member is held both of the first rotating plate 201 and the second rotating plate 202. Here, transparent members 204 and 206 are held in the first rotating plate 201, and transparent members 205 and 207 are held in the rotating plate 202. The configuration of the transparent members 204 and 206 is similar to that of the transparent member 71 in FIG. 15A, and a light-shielding part is formed at a peripheral part on one face of the transparent member. The configuration of the transparent members 205 and 207 is similar to that of the transparent member 75 in FIG. 15A, and a light-shielding part is formed at a center part on one face of the transparent member.

Diameters of the light-shielding part formed at the peripheral part are different between transparent members 204 and 206. Moreover, diameters of the light-shielding part formed at the center part are different between the transparent members 205 and 207.

In the moving mechanism 200, the number of holding parts disposed at one rotating plate is two that is the same as in the moving mechanism 90. However, since four transparent members are used, four types of aperture members can be implemented through the combination of them (the transparent members 204 and 205, the transparent members 204 and 207, the transparent members 206 and 205, and the transparent members 206 and 207).

As a result, in the moving mechanism 200 also, it is possible to dispose an aperture member suitable for the objective lens used in the illumination optical system by rotating the rotating plate, and additionally it is possible to deal with various objective lenses without increasing the number of the aperture members. The number of the holding parts is not limited two, and three or more of the holding parts may be disposed.

In the moving mechanism 200, insertion/removal of a transparent member is performed from the upper-face side of the rotating plate. To this end, when insertion/removal of the transparent member is performed at the second rotating plate 202, it is necessary to separate the first rotating plate 201 and the second rotating plate 202 from each other. To this end, in the moving mechanism 200, at least one of the first rotating plate 201 and the second rotating plate 202 is configured to be movable along the axial direction of the shaft member 203. However, such movement is preferably omitted.

From this, the sample observation device of the present embodiment preferably includes a moving mechanism that moves the aperture member, and the moving mechanism includes a plurality of rotating plates and a shaft member, each rotating plate includes a plurality of holding parts, and each rotating plate includes holding parts with a different diameter.

As shown in FIG. 16C, a moving mechanism 210 includes a first rotating plate 211, a second rotating plate 212 and a shaft member 213. The configuration of the first rotating plate 211 and the second rotating plate 212 is same that of the first rotating plate 201 and the second rotating plate 202. Here, in the moving mechanism 210, the diameter of the holding parts is different between the first rotating plate 211 and the second rotating plate 212.

The holding part of the first rotating plate 211 is made up of a concave portion 214 and a through hole 215. The concave portion 214 and the through hole 215 are both a circular shape, where the concave portion 214 is formed above the through hole 215. Moreover, the diameter of the concave portion 214 is larger than the diameter of the through hole 215.

The holding part of the second rotating plate 212 is made up of a concave portion 216 and a through hole 217. The concave portion 216 and the through hole 217 are both a circular shape, and the concave portion 216 is formed above the through hole 217. The diameter of the concave portion 216 is larger than the diameter of the through hole 217, and is smaller than the diameter of the through hole 215.

Accordingly, insertion/removal of a transparent member 219 in the second rotating plate 212 can be performed from the side of the first rotating plate 211 via the through hole 215. At this time, it is possible to keep the first rotating plate 211 and the second rotating plate 212 to be close to each other. Moreover, insertion/removal of the transparent member 218 is performed after the completion of insertion/removal of the transparent member 219.

As just described, in the moving mechanism 210 also, it is possible to dispose an aperture member suitable for the objective lens used in the illumination optical system by rotating the rotating plate, and additionally it is possible to deal with various objective lenses without increasing the number of the aperture members. Further, insertion/removal of a transparent member can be easily performed without moving the rotating plate in the direction of the shaft member. The number of the holding parts is not limited two, and three or more of the holding parts may be disposed.

When an objective lens is attached or an aperture member is attached, the attachment includes a mechanical error for the position. Therefore, in the plane of the pupil of the objective lens, an image of the aperture member may not be projected at a desired position in some cases.

From this, in the sample observation device of the present embodiment, it is preferable that the moving mechanism includes three supporting members, and the three supporting members support an aperture member.

As the supporting member, one spring and two screws are available, for example. These spring and screws are disposed so that their axes in the longitudinal direction intersect at the center of the holding part. In the rotating plate, a space to store the spring and the screws is formed. The spring is brought into contact with one point of a side face of the aperture member, and the screws are brought into contact with other two points. Then, by moving the two screws back and forth, it is possible to move the aperture member in the holding part.

With this configuration, it is possible to project an image of the aperture member at a desired place in the plane of the pupil of the objective lens. That is, an image of the inner edge of the transmission part is formed inside of the outer edge of the pupil of the objective lens, and an image of the outer edge of the transmission part is formed outside of the outer edge of the pupil of the objective lens.

Adjustment of the position of the aperture member can perform through the observation of the pupil of the objective lens. To this end, it is preferable to provide a mechanism to move a lens and a mechanism to insert/remove a lens in the observation optical system so as to enable observation of the pupil of the objective lens.

When the position of the aperture member is adjusted through the observation of the pupil of the objective lens, the adjustment is performed so that the light-shielding part is located at the center of the pupil of the objective lens. Such adjustment may lead to a failure to perform precise adjustment.

From this, in the sample observation device of the present embodiment, it is preferable that the aperture member includes a mark for positioning, and the mark is disposed at least at the light-shielding part. The mark may be a small aperture provided at a light-shielding part at the center of the aperture member, for example. The aperture member is positioned so that the mark is located at the center of the pupil of the objective lens.

In the case of the aperture member 5' shown in FIG. 14B, the mark may be disposed at the light-shielding part 5'$a$1. In the case of the aperture member 5' shown in FIG. 14C as well, the mark may be disposed at the light-shielding part 5'$a$1.

Moreover, in the case of the aperture member 70 shown in FIG. 15A, the mark may be disposed at the light-shielding part 78 similarly to the case of the aperture member 5' shown in FIG. 14C. It is more preferable that a mark is provided at the transparent member 71 at a position corresponding to the position of the mark disposed at the light-shielding part 78. The mark provided at the transparent member 71 may be a minute absorbing material. Firstly, the position of the transparent member 71 and the position of the transparent member 75 are adjusted so that the mark on the transparent member 71 and the mark at the light-shielding part 78 coincide. Next, the positioning of aperture member is performed so that the marks are located at the center of the pupil of the objective lens.

In the sample observation device of the present embodiment, it is preferable that the aperture member is made of an opaque member, and the transmission part includes a plurality of apertures formed at the opaque member. Here, the apertures may be minute apertures. Diameter of the apertures or diameter of the minute apertures may be same or different. Moreover, arrangement of the apertures or arrangement of the minute apertures may be at random or regular.

Figure 17A:
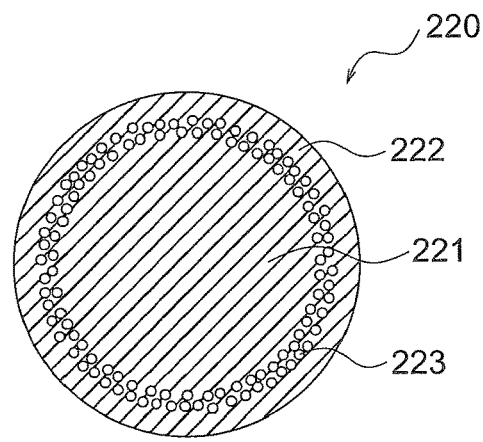
FIG. 17A, FIG. 17B and FIG. 17C are diagrams showing the configuration of the aperture member, where
Figure 17B:
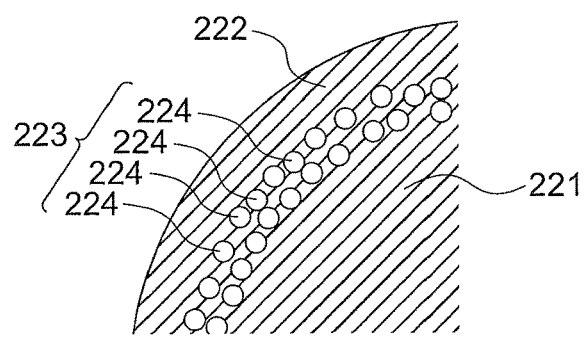
Figure 17C:
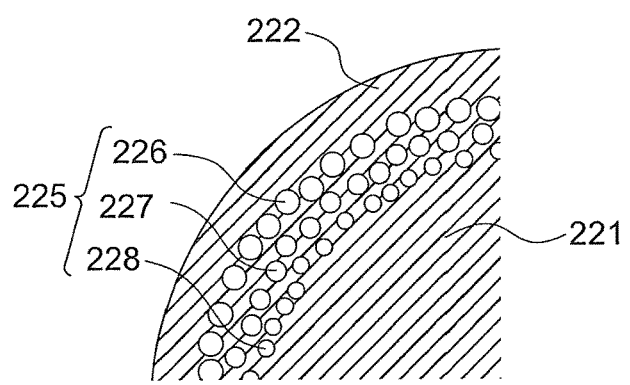

FIG. 17A, FIG. 17B and FIG. 17C are diagrams showing the configuration of the aperture member, where FIG. 17A is a top view, FIG. 17B is an enlarged view of the transmission part when the diameters of the minute apertures are made to be same, and FIG. 17C is an enlarged view of the transmission part when the diameters of the minute apertures are made to be different.

As shown in FIG. 17A, an aperture member 220 includes a light-shielding part 221, a light-shielding part 222 and a transmission part 223. The light-shielding part 221 and the light-shielding part 222 are made of an opaque member, such as a metal plate. The transmission part 223 is formed between the light-shielding part 221 and the light-shielding part 222.

As shown in FIG. 17B, the transmission part 223 is configured by a plurality of minute apertures 224. The minute apertures 224 are voids (holes) formed at a metal plate. The minute apertures 224 can be formed by applying laser to the metal plate. In FIG. 17B, all of the diameters of the minute apertures 224 are same.

With this configuration, the transmission part 223 can be formed easily. Moreover, it is possible to obtain the transmission part 223 having various transmittance by changing the diameter or the density of the minute apertures 224.

In FIG. 17B, the positions of the minute apertures are arranged at random, but the positions of the minute apertures may be arranged regularly. Alternatively, a plurality of minute apertures may be one group, and the group may be arranged repeatedly in a specific pattern. Moreover, in FIG. 17B, the minute apertures form two lines, which may form one line or three or more lines.

Moreover, diameters of the minute apertures may be different. FIG. 17C shows the case where diameters of the minute apertures are made to be different. As shown in FIG. 17C, a transmission part 225 includes a plurality of minute apertures 226, 227 and 228. Here, the diameter of the minute apertures increases from the inside to the outside.

With this configuration, it is possible to make the transmission part 223 whose transmittance changes easily. Moreover, it is possible to change the degree of change of the transmittance variously by changing the diameter or the density of the minute apertures 226, 227 and 228.

As stated above, in the sample observation device using the aperture member 5 shown in FIG. 2A and the aperture member 5' shown in FIG. 2B, it is possible to obtain a sample image with shadow even when the sample is colorless and transparent. However, there is a case where a colorless and transparent sample and a stained sample have to be observed at one time (in the same viewing field), for example.

In such a case, illumination light will attenuate at the stained sample due to the color or the shade corresponding to the staining. Therefore, in the sample observation device using the aperture member 5 and the aperture member 5', a sample image of the stained sample will be dark, and so the stained sample may not be observed clearly. Accordingly, it is preferable to enable observation of both of a colorless and transparent sample and a stained sample favorably.

From this, a sample observation device of the present embodiment includes an illumination optical system and an observation optical system, and the illumination optical system includes a light source, a condenser lens, and an aperture member, and the observation optical system includes an objective lens and an imaging lens, and the aperture member includes a darkening part and a transmission part, and the aperture member is disposed so that the darkening part includes the optical axis of the illumination optical system, and the transmission part is located outside of the outer edge of the darkening part, and an image of the inner edge of the transmission part is formed inside of the outer edge of the pupil of the objective lens, and an image of the outer edge of the transmission part is formed outside of the outer edge of the pupil of the objective lens.

Figure 18A:
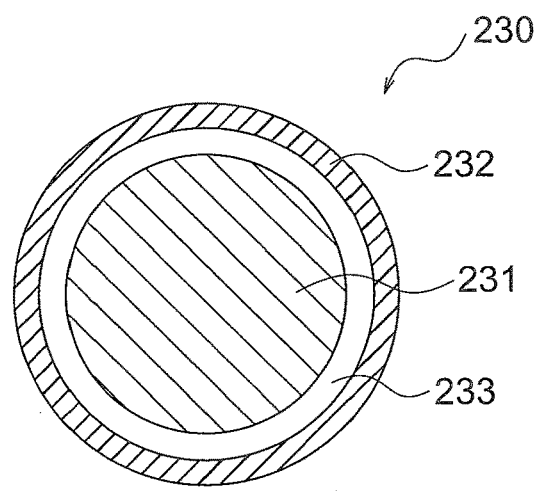
FIG. 18A, FIG. 18B and FIG. 18C are diagrams showing the configuration of the aperture member, where
Figure 18B:
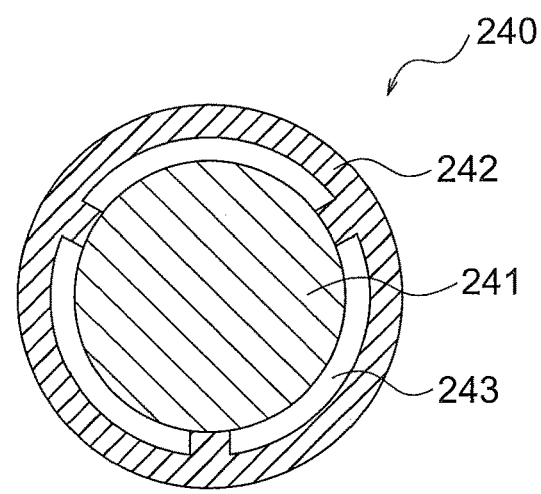
Figure 18C:
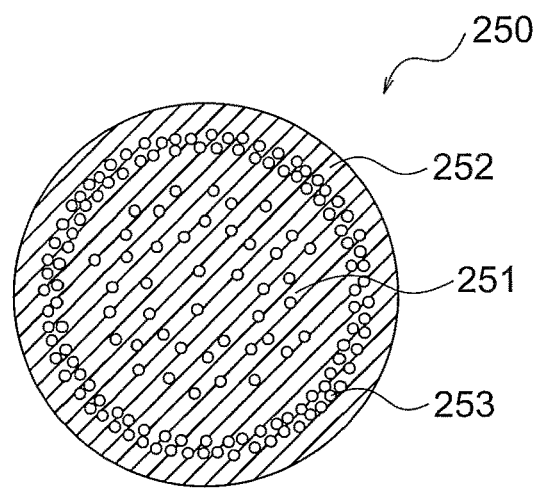

FIG. 18A, FIG. 18B and FIG. 18C are diagrams showing the configuration of aperture members, where FIG. 18A is a diagram showing an aperture member including a darkening part disposed at a transparent member, FIG. 18B is a diagram showing an aperture member in which an aperture part is provided at a darkening filter, and FIG. 18C is a diagram showing an aperture member in which minute apertures are provided at an opaque member.

As shown in FIG. 18A, an aperture member 230 includes a darkening part 231, a light-shielding part 232 and a transmission part 233. The light-shielding part 232 is not necessarily required. At the aperture member 230, the darkening part 231 is disposed so as to include the optical axis of the illumination optical system. The transmission part 233 is located outside of the outer edge of the darkening part 231.

The darkening part 231, the light-shielding part 232 and the transmission part 233 are made of a transparent member, such as a glass plate or a resin plate. At the darkening part 231, a darkening film (thin film) is formed on a glass plate, for example. Moreover, the light-shielding part 232 is formed by applying light-shielding paint on a glass plate, for example. On the other hand, nothing is applied for the transmission part 233. Therefore, the transmission part 233 is a glass plate as it is. Although the darkening part 231 and the transmission part 233 come into contact with each other at the aperture member 230, a light-shielding part may be provided between them.

Illumination light incident on the aperture member 230 is not darkened at the transmission part 233, but is darkened at the darkening part 231. From the aperture member 230, annular illumination light and circular illumination light are emitted. Here, the circular illumination light is darker than the annular illumination light. When the aperture member 230 is used, a colorless and transparent sample is irradiated with annular illumination light and circular illumination light as well as a stained sample. The circular illumination light is the same as the illumination light for bright-field observation.

At a colorless and transparent sample, a sample image with shadow (hereinafter, referred to as "shadow image" as appropriate) is formed by the annular illumination light. On the other hand, a shadow image is not formed by the circular illumination light, and so light with constant brightness reaches the image position. As a result, a sample image becomes an image that the light with constant brightness and the shadow image are overlapped. However, the circular illumination light is darker than the annular illumination light. Therefore, the contrast of the shadow image is not degraded very much even when the light with constant brightness is overlapped with the shadow image. Thus, it is possible to obtain a sample image with shadow for a colorless and transparent sample.

Meanwhile, at a stained sample, a shadow image is formed by the annular illumination light. At this time, not only shadow is generated but also color or shade corresponding to the staining is added to the shadow image. On the other hand, a shadow image is not formed by the circular illumination light, and a sample image with color or shade corresponding to the staining (hereinafter referred to as "shading image" as appropriate) is formed. As a result, a sample image is an image that the shadow image and the shading image are overlapped. However, the annular illumination light attenuates due to the color or shade corresponding to the staining. Therefore, the contrast of the shading image is not degraded very much even when the shadow image is overlapped with the shading image. Thus, it is possible to obtain a sample image with the color or shade corresponding to staining for a stained sample.

As described above, by using the aperture member 230, it is possible to observe both of a colorless and transparent sample and a stained sample favorably.

FIG. 18B is another example of the aperture member. As shown in FIG. 18B, an aperture member 240 includes a darkening part 241, a light-shielding part 242 and a transmission part 243. The darkening part 241 and the light-shielding part 242 are made of a darkening filter. Moreover, the transmission part 243 is voids (holes) formed at the darkening filter.

FIG. 18C is still another example of the aperture member. As shown in FIG. 18C, an aperture member 250 includes a darkening part 251, a light-shielding part 252 and a transmission part 253. Here, the configuration of the aperture member 250 is similar to that of the aperture member 220 in FIG. 17A, but at the aperture member 250, it differs that the light-shielding part 221 of the aperture member 220 is configured to be a darkening part 251. The darkening part 251 is a part that a plurality of minute apertures is formed at the light-shielding part 221 of the aperture member 220.

As just described, the aperture member 240 and the aperture member 250 include a darkening part similarly to the aperture member 230. Therefore, by using the aperture member 240 and the aperture member 250, it is possible to observe both of a colorless and transparent sample and a stained sample favorably.

In the sample observation device of the present embodiment, it is preferable that the following condition expression (6) is satisfied:

$$0.01 < (S_T \times T_T)/(S_{ND} \times T_{ND}) < 100 \qquad (6),$$

where
$S_{ND}$ denotes an area of the darkening part,
$T_{ND}$ denotes a transmittance (%) at the darkening part,
$S_T$ denotes an area of the region of the transmission part that passes through the pupil of the objective lens, and
$T_T$ denotes a transmittance (%) of the region of the transmission part that passes through the pupil of the objective lens.

By satisfying the condition expression (6), it is possible to observe both of a colorless and transparent sample and a stained sample favorably. The transmittance is average transmittance. When transmittance is the same at any place, the transmittance is a transmittance at any place, and when transmittance is different from place to place, the transmittance is average of transmittance at the places.

When falling below the lower limit value of the condition expression (6), since the amount of illumination light emitted from the transmission part becomes less relatively, a shadow image becomes too dark. Alternatively, since the amount of illumination light emitted from the darkening part becomes more relatively, the contrast of a shadow image deteriorates. As a result, it becomes difficult to observe a colorless and transparent sample.

When exceeding the upper limit value of the condition expression (6), since the amount of illumination light emitted from the darkening part becomes less relatively, a shading image becomes too dark. As a result, it becomes difficult to observe a stained sample.

It is preferable that the following condition expression (6') is satisfied instead of the condition expression (6):

$$0.03 < (S_T \times T_T)/(S_{ND} \times T_{ND}) < 30 \qquad (6').$$

Further, it is more preferable that the following condition expression (6") is satisfied instead of the condition expression (6):

$$0.1 < (S_T \times T_T)/(S_{ND} \times T_{ND}) < 10 \qquad (6").$$

As stated above, in the sample observation device using the aperture member 5 in FIG. 2A and the aperture member 5' in FIG. 2B, it is possible obtain a sample image with shadow even when the sample is colorless and transparent. However, there is a case where samples that are different in inclination of the surface have to be observed at one time (in the same viewing field).

In such a case, a sample image with sufficient shadow cannot be obtained with the aperture member used depending on some inclination of the sample surface. Therefore, it is preferable to be able to observe a colorless and transparent sample even when a sample is different in inclination of the surface.

Then, a sample observation device of the present embodiment includes an illumination optical system and an observation optical system, and the illumination optical system includes a light source, a condenser lens and an aperture member, and the observation optical system includes an objective lens and an imaging lens, and the aperture member includes a light-shielding part, a first transmission part and a second transmission part, and the aperture member is formed so that the first transmission part includes the optical axis of the illumination optical system, the light-shielding part is located outside of the outer edge of the first transmission part, and the second transmission part is located outside of the outer edge of the light-shielding part, and an image of the inner edge of the second transmission part is formed inside of the outer edge of the pupil of the objective lens, and an image of the outer edge of the second transmission part is formed outside of the outer edge of the pupil of the objective lens.

Figure 19:
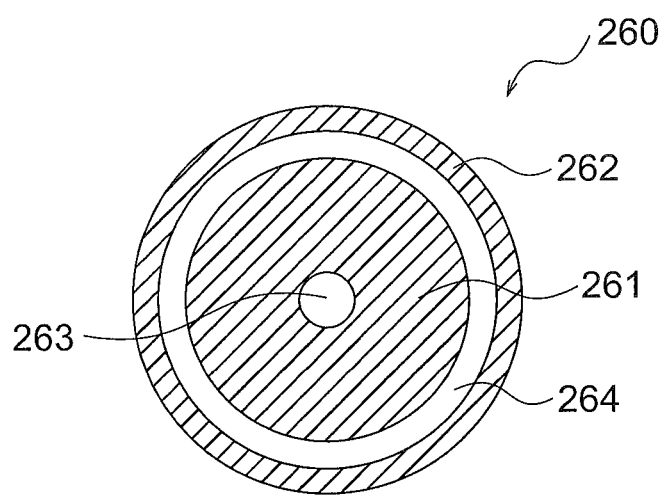
FIG. 19 is a diagram showing the configuration of an aperture member having a transmission part at the center.

FIG. 19 is a diagram showing the configuration of an aperture member including a transmission part at the center. An aperture member 260 includes a first light-shielding part 261, a second light-shielding part 262, a first transmission part 263 and a second transmission part 264. The second light-shielding part 262 is not necessarily required. At the aperture member 260, the first transmission part 263 is formed so as to include the optical axis of the illumination optical system, the first light-shielding part 261 is located outside of the outer edge of the first transmission part 263, and the second transmission part 264 is located outside of the outer edge of the first light-shielding part 261.

The first light-shielding part 261, the second light-shielding part 262, the first transmission part 263 and the second transmission part 264 are made of a transparent member, such as a glass plate or a resin plate. The first light-shielding part 261 and the second light-shielding part 262 are formed by applying light-shielding paint on a glass plate, for example. On the other hand, nothing is applied for the first transmission part 263 and the second transmission part 264. Accordingly, the first transmission part 263 and the second transmission part 264 are a glass plate as it is. The aperture member 260 corresponds to the aperture member 5' in FIG. 2B, which is provided with the first transmission part 263 at the center of the light-shielding part 5a1.

At the aperture member 260, since a shape of the illumination light passing through the first transmission part 263 is a circular shape, it has the same shape as the illumination light for bright-field observation.

By the way, in the bright-field observation, when the diameter of a light flux of the illumination light changes, the degree of coherence (coherency) of the illumination light changes. The degree of coherence of the illumination light influences the contrast of an image, the resolution and the sharpness. When the diameter of a light flux of the illumination light becomes narrower, the degree of coherence of the illumination light increases. As a result, since the contrast of the image increases, an image with contrast (hereinafter, referred to as a "coherent illumination image" as appropriate) can be obtained even when the sample is a colorless and transparent, for example. This coherent illumination image is not the same as the bright-field image, but is similar to the bright-field image.

In the coherent illumination image as stated above, not only an image obtained with coherent illumination but also an image obtained with partial coherent illumination are included. Meanwhile, a bright-field image is an image obtained by partial coherent illumination. As just described, the coherent illumination image and the bright-field image both include an image obtained by partial coherent illumination, but they are different in that the coherent illumination image is an image obtained by more coherent illumination light than the bright-field image.

At the aperture member 260, the diameter of the first transmission part 263 is smaller than the diameter of the first light-shielding part 261. In this case, the diameter of a light flux of the illumination light that passed through the first transmission part 263 is smaller than the diameter of a light flux obtained from the configuration without the first light-shielding part 261. Therefore, the illumination light that passed through the first transmission part 263 is light with high degree of coherence.

Therefore, when the aperture member 260 is used, a shadow image is formed by annular illumination light, and a coherent illumination image is formed by circular illumination light. As a result, the sample image becomes an image that the shadow image and the coherent illumination image that are overlapped. Here, when the width of the second transmission part 264 matches with the inclination of the sample surface, then the sample image, in which the shadow image and the coherent illumination image that are overlapped, is obtained. On the other hand, when the width of the second transmission part 264 does not match with the inclination of the sample surface, then a sample image with enough shadow will not be obtained, but a sample image with contrast will be obtained. Therefore, it is possible to observe a colorless and transparent sample in an observation field.

As described above, by using the aperture member 260, a sample image with shadow and a sample image with contrast can be obtained for a colorless and transparent sample. Moreover, even when a sample image with shadow cannot be observed, it is possible to observe a colorless and transparent sample in an observation field. Moreover, it is possible to observe an outline of a colorless and transparent sample by a sample image with shadow, and is possible to observe the inside of the colorless and transparent sample by a coherent illumination image.

In the sample observation device of the present embodiment, it is preferable that the following condition expression (7) is satisfied:

$$0.01 < (S_{T2} \times T_{T2})/(S_{T1} \times T_{T1}) < 100 \quad (7),$$

where $S_{T1}$ denotes an area of the first transmission part, $T_{T1}$ denotes a transmittance (%) at the first transmission part, $S_{T2}$ denotes an area of a region of the second transmission part that passes through the pupil of the objective lens, and $T_{T2}$ denotes a transmittance (%) of the region of the second transmission part that passes through the pupil of the objective lens.

By satisfying the condition expression (7), it is possible to obtain both of a sample image with shadow and a coherent illumination image for a colorless and transparent sample. The transmittance is average transmittance. When transmittance is the same at any place, the transmittance is a transmittance at any place, and when transmittance is different from place to place, the transmittance is average of transmittance at the places.

When falling below the lower limit value of the condition expression (7), since amount of illumination light emitted from the second transmission part becomes less relatively, a shadow image becomes too dark. Alternatively, since the amount of illumination light emitted from the first transmission part becomes more relatively, the contrast of a shadow image deteriorates. As a result, it becomes difficult to obtain a sample image with shadow for a colorless and transparent sample. Moreover, since the degree of coherence of the illumination light deteriorates, the contrast of the coherent illumination image deteriorates.

When exceeding the upper limit value of the condition expression (7), since the amount of illumination light emitted from the first transmission part becomes less relatively, a coherent illumination image becomes too dark. As a result, it becomes difficult to obtain a bright coherent illumination image for a colorless and transparent sample.

It is preferable that the following condition expression (7') is satisfied instead of the condition expression (7):

$$0.03 < (S_{T2} \times T_{T2})/(S_{T1} \times T_{T1}) < 30 \quad (7').$$

Further, it is more preferable that the following condition expression (7") is satisfied instead of the condition expression (7):

$$0.1 < (S_{T2} \times T_{T2})/(S_{T1} \times T_{T'}) < 10 \quad (7'').$$

Moreover, a sample observation device of the present embodiment includes an illumination optical system and an observation optical system, and the illumination optical system includes a light source, a condenser lens and an aperture member, and the observation optical system includes an objective lens and an imaging lens, and the aperture member has a first light-shielding part, a second light-shielding part, a first transmission part, and a second transmission part, and the aperture member is disposed so that the first light-shielding part includes an optical axis of the illumination optical system, and the first transmission part is located outside of an outer edge of the first light-shielding part, and the second light-shielding part is located outside of an outer edge of the first transmission part, and the second transmission part is located outside of an outer edge of the second light-shielding part, and an image of an inner edge of the second transmission part is formed inside of an outer edge of the pupil of the objective lens, and an image of an outer edge of the second transmission part is formed outside of the outer edge of the pupil of the objective lens.

Figure 20:
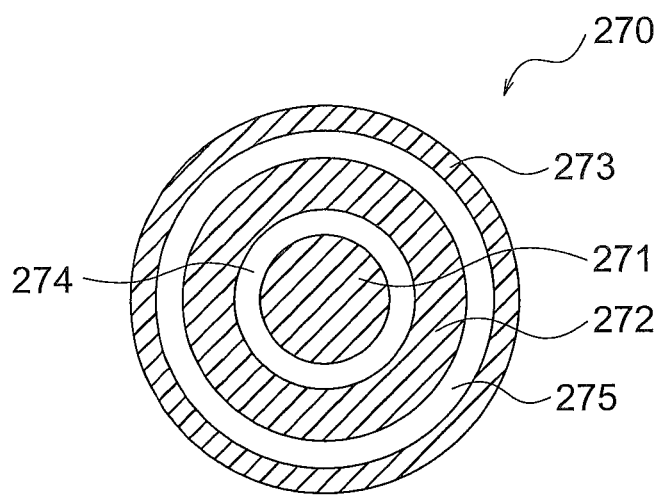
FIG. 20 is a diagram showing the configuration of an aperture member.

FIG. 20 is a diagram showing the configuration of an aperture member. An aperture member 270 includes a first light-shielding part 271, a second light-shielding part 272, a third light-shielding part 273, a first transmission part 274 and a second transmission part 275. The third light-shielding part 273 is not necessarily required. At the aperture member 270, the first light-shielding part 271 is disposed so as to include the optical axis of the illumination optical system, the first transmission part 274 is located outside of the outer edge of the first light-shielding part 271, the second light-shielding part 272 is located outside of the outer edge of the first transmission part 274, and the second transmission part 275 is located outside of the outer edge of the second light-shielding part 272.

The first light-shielding part 271, the second light-shielding part 272, the third light-shielding part 273, the first transmission part 274 and the second transmission part 275 are made of a transparent member, such as a glass plate or a resin plate. The first light-shielding part 271, the second light-shielding part 272 and the third light-shielding part 273 are formed by applying light-shielding paint on a glass plate, for example. On the other hand, nothing is applied for the first transmission part 274 and the second transmission part 275. Accordingly, the first transmission part 274 and the second transmission part 275 are a glass plate as it is. The aperture member 270 corresponds to the aperture member 5' in FIG. 2B, which is provided with the first transmission part 274 at the light-shielding part 5'a1.

At the aperture member 270, the first transmission part 274 serves as an illumination ring for phase-contrast observation. Therefore, by using the aperture member 270, observation using a phase-contrast objective lens is enabled. In this case, a phase-contrast image is formed by annular illumination light on the inside, and a shadow image is formed by annular illumination light on the outside. As a result, a sample image becomes an image in which the shadow image and the phase-contrast image are overlapped. Moreover, as stated above, when the width of the second transmission part 275 does not match with the inclination of sample surface, a sample image with enough shadow cannot be obtained, but a phase-contrast image can be obtained. Therefore, it is possible to observe a colorless and transparent sample in an observation field.

As described above, by using the aperture member 270, a sample image with shadow and a phase-contrast image can be obtained for a colorless and transparent sample. Further, even when a sample image with shadow cannot be observed, a colorless and transparent sample in an observation field can be observed.

In the sample observation device of the present embodiment, it is preferable that the following condition expression (8) is satisfied:

$$0.01 < (S_{OUT} \times T_{OUT})/(S_{IN} \times T_{IN} \times T_{1ob}) < 100 \qquad (8),$$

where $S_{IN}$ denotes an area of the first transmission part, $T_{IN}$ denotes a transmittance (%) at the first transmission part, $T_{1ob}$ denotes a transmittance (%) at a phase film of the objective lens, $S_{OUT}$ denotes an area of a region of the second transmission part that passes through the pupil of the objective lens, and $T_{T2}$ denotes a transmittance (%) of the region of the second transmission part that passes through the pupil of the objective lens.

By satisfying the condition expression (8), it is possible to obtain both of a sample image with shadow and a phase-contrast image for a colorless and transparent sample. The transmittance is average transmittance. When transmittance is the same at any place, the transmittance is a transmittance at any place, and when transmittance is different from place to place, the transmittance is average of transmittance at the places.

When falling below the lower limit value of the condition expression (8), since amount of illumination light emitted from the second transmission part becomes less relatively, a shadow image becomes too dark. Alternatively, since the amount of illumination light emitted from the first transmission part becomes more relatively, the contrast of a shadow image deteriorates. As a result, it becomes difficult to obtain a sample image with shadow for a colorless and transparent sample. Moreover, since an image of the first transmission part at the pupil position of the objective lens becomes large compared with a phase plate of the phase-contrast objective lens, the contrast of the phase-contrast image deteriorates.

When exceeding the upper limit value of the condition expression (8), since the amount of illumination light emitted from the first transmission part becomes less relatively, a phase-contrast image becomes too dark. As a result, it becomes difficult to obtain a bright phase-contrast image for a colorless and transparent sample.

It is preferable that the following condition expression (8') is satisfied instead of the condition expression (8):

$$0.03 < (S_{OUT} \times T_{OUT})/(S_{IN} \times T_{IN} \times T_{1ob}) < 30 \qquad (8').$$

Further, it is more preferable that the following condition expression (8'') is satisfied instead of the condition expression (8):

$$0.1 < (S_{OUT} \times T_{OUT})/(S_{IN} \times T_{IN} \times T_{1ob}) < 10 \qquad (8'').$$

In order to obtain a clear sample image, it is preferable to perform an illumination with less color unevenness.

Moreover, a sample observation device of the present embodiment includes an illumination optical system and an observation optical system, and the illumination optical system includes a light source, a condenser part and an aperture member, and the observation optical system includes an objective lens and an imaging lens, and the aperture member includes a light-shielding part and a transmission part, the aperture member is disposed so that the light-shielding part includes the optical axis of the illumination optical system, and the transmission part is located outside of the outer edge of the light-shielding part, and an image of an inner edge of the transmission part is formed inside of the outer edge of the pupil of the objective lens, and an image of an outer edge of the transmission part is formed outside of the outer edge of the pupil of the objective lens.

Figure 21:
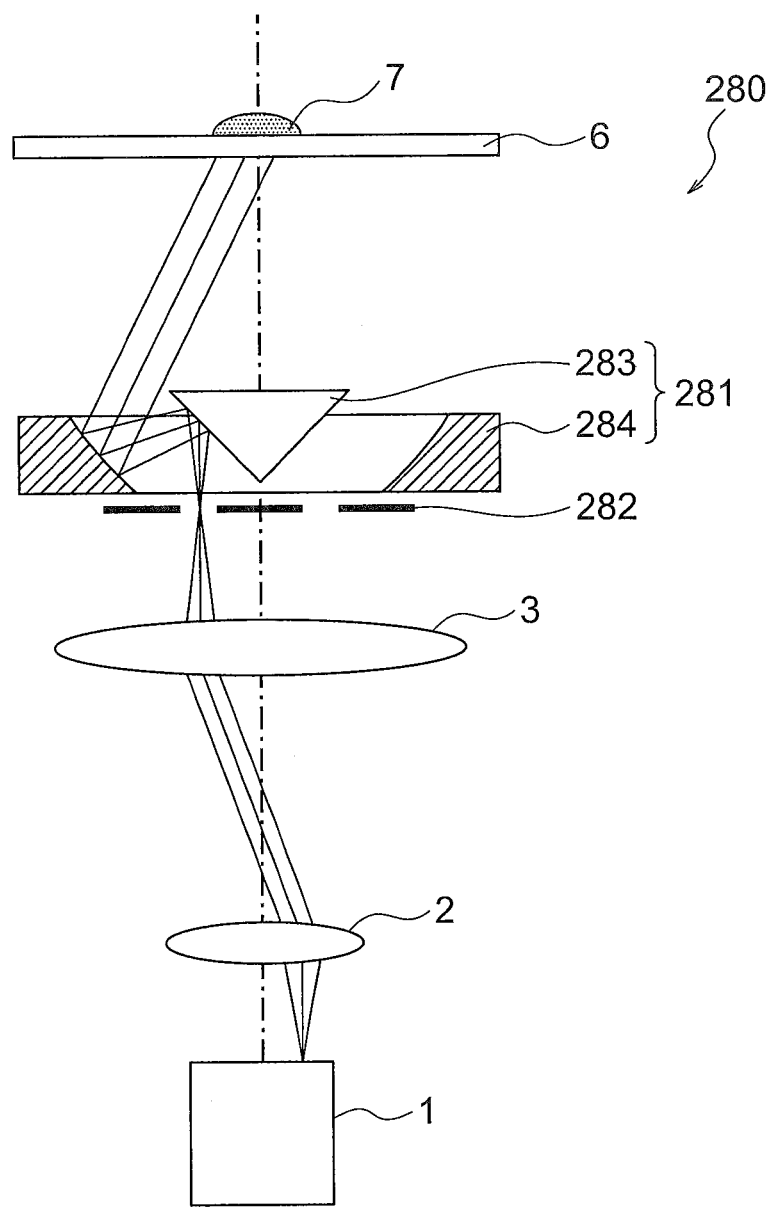
FIG. 21 is a diagram showing the configuration using a reflective optical system for the illumination optical system.

FIG. 21 is a diagram showing the configuration using a reflective optical system for the illumination optical system of the sample observation device of the present embodiment. Since the observation optical system is the same as that in FIG. 1, the illustration thereof is omitted.

An illumination optical system 280 includes a light source 1, a condenser part 281, and an aperture member 282. The condenser part 281 includes a conical mirror 283 and a concave mirror 284. The illumination optical system 280 may include a lens 2 and a lens 3 as needed.

Light emitted from the light source 1 passes through the lens 2 and the lens 3 and enters the condenser part 281. Here, the position of the aperture member 282 coincides with the focal position of the condenser part 281 (or the pupil position of the condenser part 281). Therefore, the illumination light incident on the conical mirror 283 is reflected by the conical mirror 283 and the concave mirror 284, and is emitted from the condenser part 281 as parallel light.

Moreover, since a shape of the transmission part of the aperture member 282 is an annular shape, a shape of the illumination light also is an annular shape. Therefore, the illumination light emitted from the condenser part 281 is emitted so as to intersect with the optical axis of the observation optical system (the optical axis of the illumination optical system). The illumination light emitted from the condenser part 281 reaches the sample 7.

As just described, in the sample observation device of the present embodiment, since a reflective optical system is used for illumination light, it is possible to suppress generation of chromatic aberration in the illumination optical system. As a result, illumination with less color unevenness can be performed.

Figure 22:
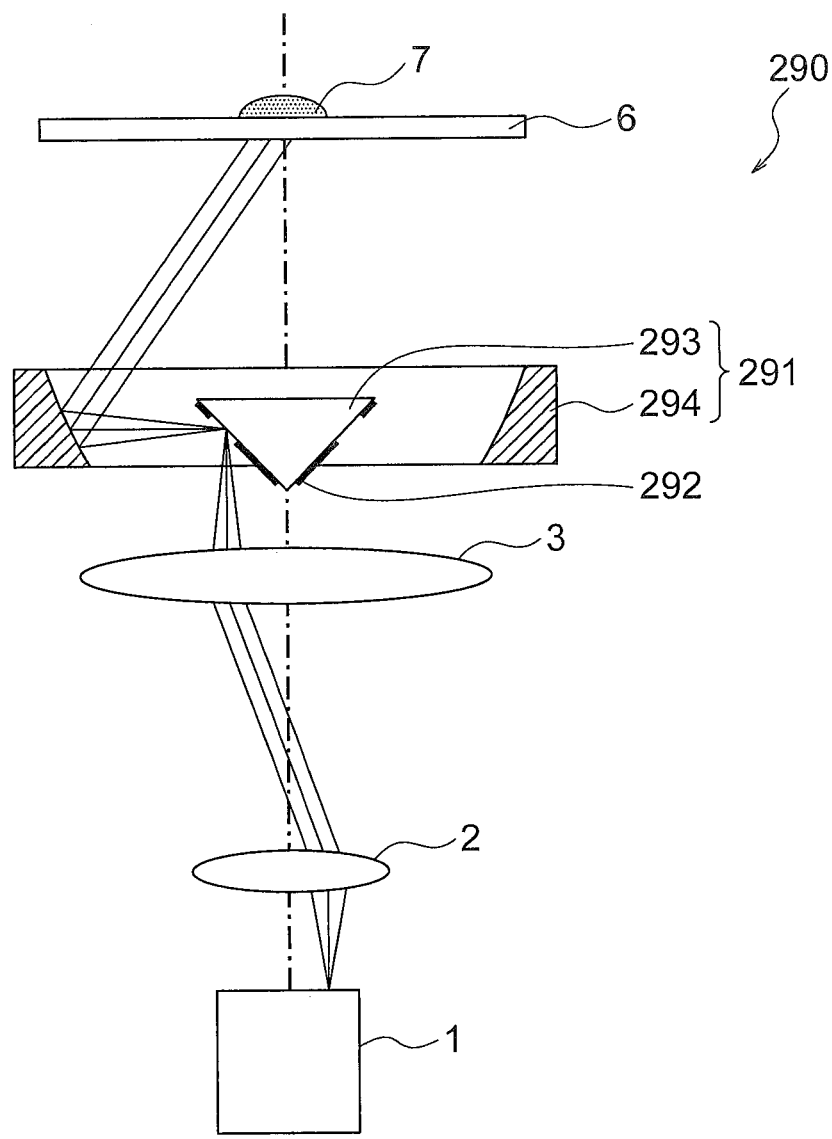
FIG. 22 is a diagram showing the configuration using another reflective optical system for the illumination optical system.

FIG. 22 is a diagram showing the configuration using another reflective optical system for the illumination optical system of the sample observation device of the present embodiment. Since the observation optical system is the same as that in FIG. 1, the illustration thereof is omitted.

An illumination optical system 290 includes a light source 1 and a condenser part 291. The condenser part 291 includes an aperture member 292, a conical mirror 293 and a concave mirror 294. The illumination optical system 290 may include a lens 2 and a lens 3 as needed.

In the illumination optical system 290, the aperture member 292 is provided at a reflective face of the conical mirror 293. Since the technical significance of the illumination optical system 290 is the same as the technical significance of the illumination optical system 280, the detailed descriptions are omitted.

The condenser part 281 and the condenser part 291 may be configured to be replaced with a condenser lens. With this configuration, it is possible to support various observation methods.

Moreover, the sample observation device of the present embodiment preferably includes an image processing device, and a synthetic image is generated from a plurality of images.

Figure 23A:
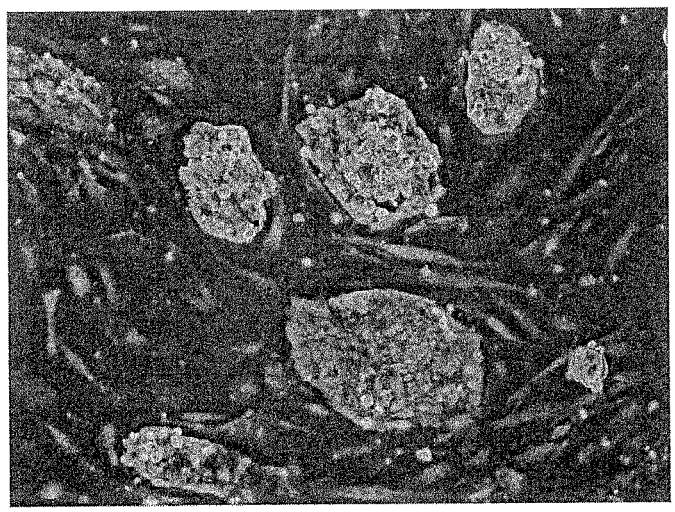
FIG. 23A, FIG. 23B and FIG. 23C are electronic images as one example of image processing, where
Figure 23B:
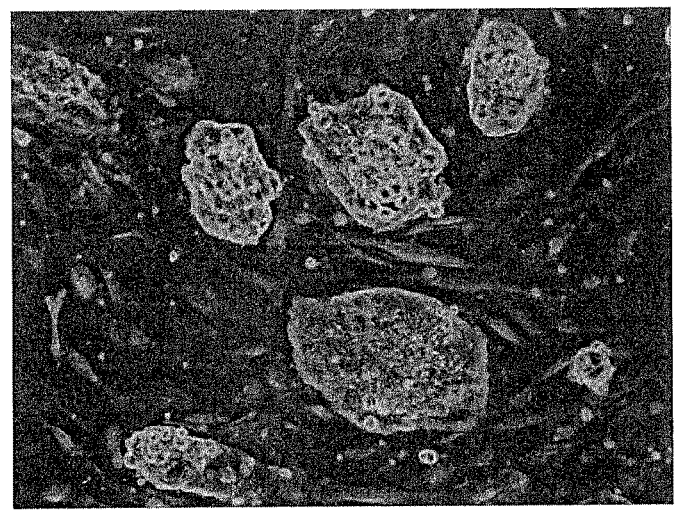
Figure 23C:
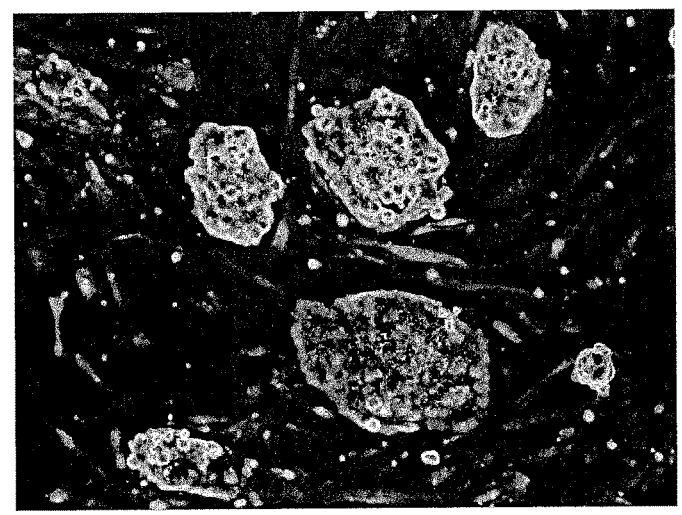

FIG. 23A, FIG. 23B and FIG. 23C are electronic images as one example of image processing, where FIG. 23A is an electronic image of a sample at a first position, FIG. 23B is an electronic image of the sample at a second position, and FIG. 23C is an image obtained by adding the two electronic images. The two electronic images are both electronic images obtained by the sample observation method of the present embodiment.

Since a cell has a thickness, an electronic image that is focused on various positions can be obtained by changing a relative distance from the objective lens. FIG. 23A is an electronic image of a sample at a first position, which is an electronic image at a time of focusing on a cell located above the center. In this electronic image, the colony inside of the cell located above the center is clear.

FIG. 23B is an electronic image of the sample at a second position, which is an electronic image when the sample is moved away from the objective lens by 20 μm from the first position. This electronic image is an electronic image at a time of focusing on a cell located below the center. In this electronic image, the colony inside of the cell located below the center is clear.

In FIG. 23A, while the colony inside of the cell located above the center is clear, the colony inside of the cell located below the center is not clear. On the other hand, in FIG. 23B, while the colony inside of the cell located above the center is not clear, the colony inside of the cell located below the center is clear. Then, the electronic image of FIG. 23A and the electronic image of FIG. 23B are added. With this configuration, as shown in FIG. 23C, the colony inside of the cell located above the center as well as the colony inside of the cell located below the center become clear. That is, it is possible to obtain an electronic image having large focal depth. When the electronic image of FIG. 23A and the electronic image of FIG. 23B are added, by subtracting offset components in each electronic image, an electronic image with appropriate brightness is obtained. Moreover, contrast may be adjusted as needed.

Moreover, while keeping relative distance from the objective lens constant, electronic images at different wavelengths may be obtained. Electronic images having different relative distances from the objective lens can be obtained by chromatic aberration.

Figure 24A:
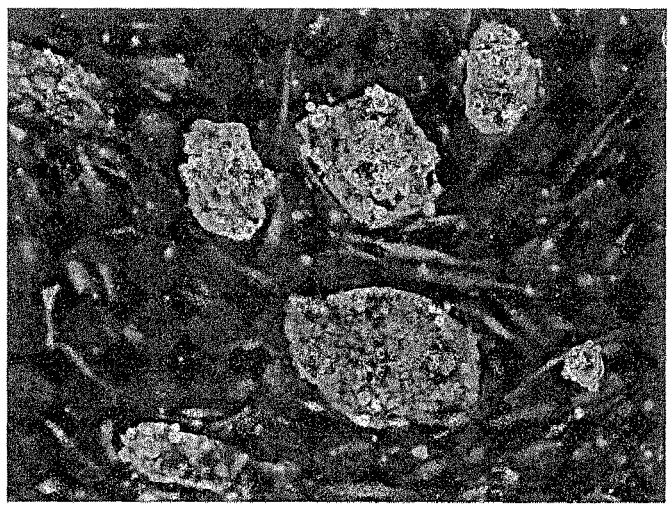
FIG. 24A, FIG. 24B and FIG. 24C are electronic images as one example of image processing, where
Figure 24B:
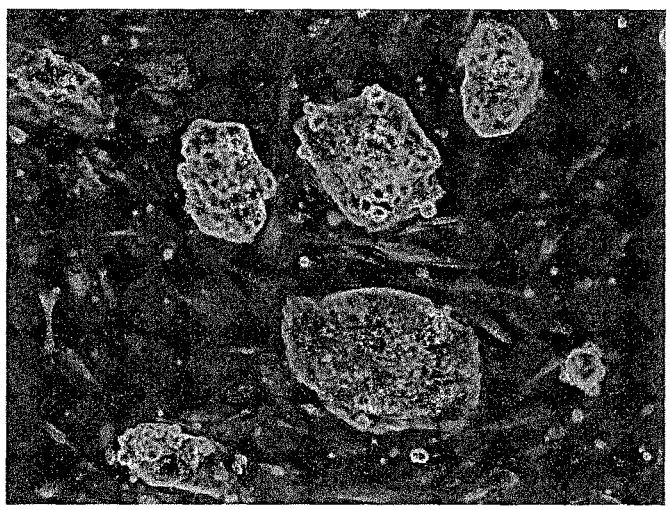
Figure 24C:

Moreover, instead of addition of electronic images, subtraction of electronic images may be performed. FIG. 24A, FIG. 24B and FIG. 24C are electronic images as one example of image processing, where FIG. 24A is an electronic image of a sample at a first position, FIG. 24B is an electronic image of the sample at a second position, and FIG. 24C is an image obtained by subtracting the two electronic images. The two electronic images are both electronic images obtained by the sample observation method of the present embodiment.

When the electronic image of FIG. 24B is subtracted from the electronic image of FIG. 24A, by adding offset components to each image, an electronic image with appropriate brightness is obtained. Moreover, contrast may be adjusted as needed.

Figure 25A:
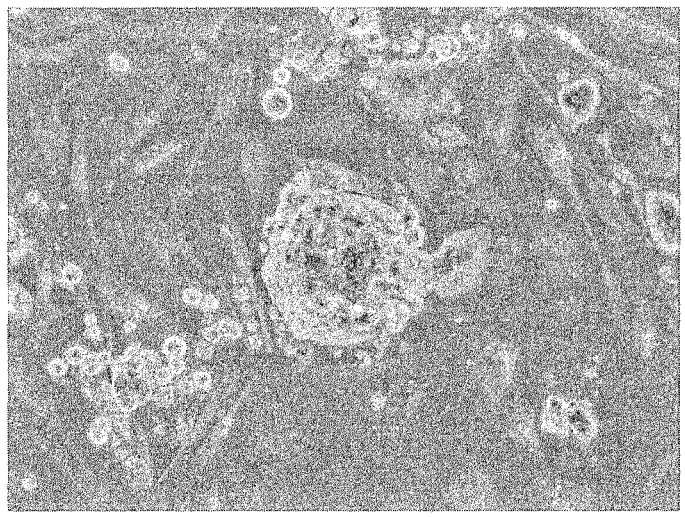
FIG. 25A, FIG. 25B and FIG. 25C are electronic images as one example of image processing, where
Figure 25B:
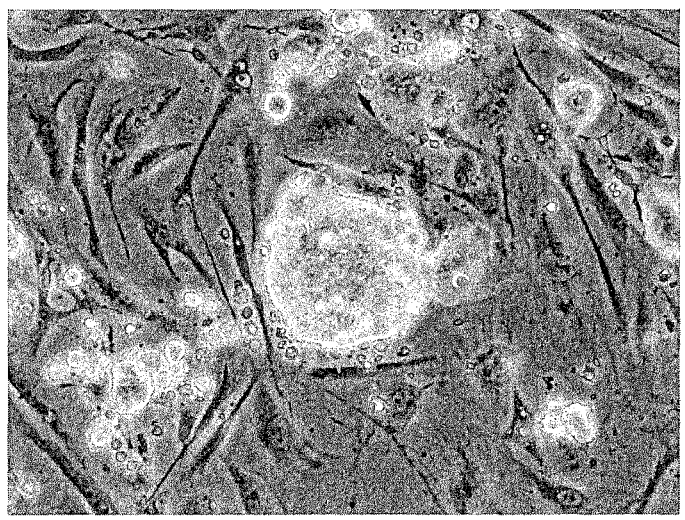
Figure 25C:
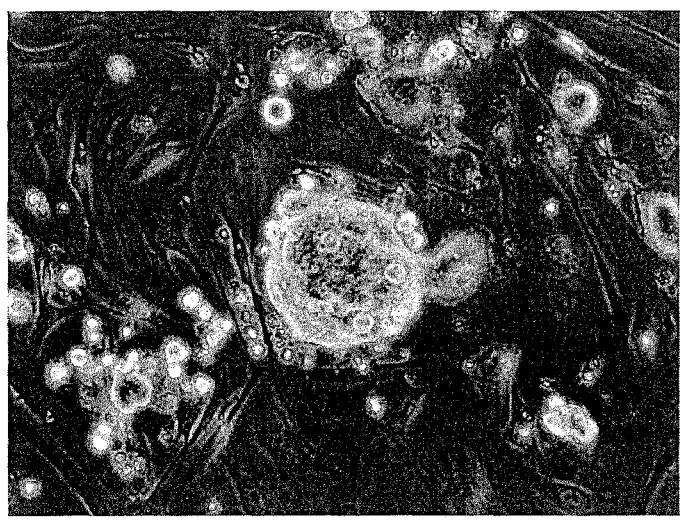

Moreover, Electronic images obtained by two different sample observation methods may be added. FIG. 25A, FIG. 25B and FIG. 25C are electronic images as one example of image processing, where FIG. 25A is an electronic image of a sample obtained by a sample observation method of the present embodiment, FIG. 25B is an electronic image of a sample obtained by a phase-contrast observation method, and FIG. 25C is an image obtained by adding the two electronic images.

When the sample observation method of the present embodiment and a phase-contrast observation method are used, a sample image with shadow (FIG. 25A) and a phase-contrast image (FIG. 25B) are obtained for a colorless and transparent sample. Here, when the width of the transmission part 5b in FIG. 2A does not match with the inclination of the sample surface, then a sample image with enough shadow will not be obtained, but a phase-contrast image can be obtained. Therefore, it is possible to observe a colorless and transparent sample in an observation field. As stated above, when the electronic image of FIG. 25A and the electronic image of FIG. 25B are added, by subtracting offset components in each electronic, an electronic image with appropriate brightness is obtained. Moreover, contrast may be adjusted as needed.

In the descriptions on the aperture member 5 and the aperture member 5', the light-shielding part 5a2 and the connecting parts 5a3 of the aperture member 5 and the light-shielding part 5'a2 of the aperture member 5' are not necessarily required. At the aperture member 5, when the light-shielding part 5a2 and the connecting parts 5a3 are not provided, the outer edge of the transmission part 5b will not exist physically.

Moreover, when the light-shielding part 5'a2 is not provided at the aperture member 5', the outer edge of the transparent member exists physically as the outer edge of the transmission part 5'b. However, the transmission part 5'b and the outside of the outer edge of the transparent member are substantially the same optically. Therefore, it is difficult to say that the outer edge of the transmission part 5'b exists physically. Moreover, when the light-shielding part 5'a1 only is formed on a transparent member, the outer edge of the transmission part 5'b will not exist physically similarly to the aperture member 5.

As just described, when the light-shielding part 5a2 and the connecting parts 5a3 are not provided and when the light-shielding part 5'a2 are not provided, it becomes difficult to specify an image of the outer edge of the transmission part at the position of the pupil 9 of the objective lens.

Here, the transmission part is a region where light passes through. Then, since the diameter of a light flux incident on the aperture member 5 and the aperture member 5' is finite, a light beam located on the outermost side of the light flux serves as a substitute for the outer edge of the transmission part in the light flux after passing through the aperture member 5 and the aperture member 5'. Then, the diameter of the light flux may be set so that a light beam located on the outermost side of the light flux passes through the outer edge of the transmission part 5b or the outer edge of the transmission part 5'b. That is, a light beam located on the outermost side of the light flux may be located outside of the outer edge of the pupil 9 of the objective lens at the position of the pupil 9 of the objective lens.

Moreover, for the following light-shielding parts (I) to (III), they may be the darkening part 231 as in FIG. 18A:

(I) the first light-shielding part 261 (FIG. 19);

(II) the first light-shielding part 271 and the second light-shielding part 272 (FIG. 20); and (III) the light-shielding parts at the aperture member 282 and the aperture member 292 (FIG. 21 and FIG. 22).

Moreover, the condenser part 281 in FIG. 21 is configured to include the reflective face.

Moreover, since the aperture member is disposed in the illumination optical system, it can be said that each of $R_0$ and $R_1$ in condition expressions (1) to (4) is a distance measured from the optical axis of the illumination optical system.

Moreover, in the sample observation device of the present embodiment, as stated above, it is possible to dispose the first aperture member and the second aperture member in the illumination optical system. Here, the first aperture member includes the first light-shielding part or the darkening part, and the first transmission part. The second aperture member includes the second light-shielding part or the darkening part, and the second transmission part.

In such a sample observation device, it is possible to use various types of objective lenses as the objective lens. A phase-contrast objective lens having a phase film at the pupil position is available as the objective lens, for example. When the phase-contrast objective lens is used, the second aperture member preferably includes a transmission part at the position that is conjugate to the phase film of the phase-contrast objective lens.

Moreover, the first aperture member is configured so that an image of the inner edge of the transmission part is formed inside of the outer edge of the pupil of the phase-contrast objective lens and an image of the outer edge of the transmission part is formed outside of the outer edge of the pupil of the phase-contrast objective lens.

With this configuration, a shadow image can be obtained using the first aperture member, and a phase-contrast image can be obtained using the second aperture member.

Moreover, when the sample observation device includes the first aperture member and the second aperture member, and a phase-contrast objective lens is used as the first objective lens, in the sample observation device of the present embodiment, it is preferable that the following condition expression (9) is satisfied:

$$0.01 < (S_1 \times T_1)/(S_2 \times T_2 \times T_{ob}) < 100 \qquad (9),$$

where $S_1$ denotes an area of the region of the first transmission part that passes through the pupil of the objective lens, $T_1$ denotes a transmittance (%) of the region of the first transmission part that passes through the pupil of the objective lens, $S_2$ denotes an area of the second transmission part, $T_2$ denotes a transmittance at the second transmission part, and $T_{ob}$ denotes a transmittance (%) at the phase film of the first objective lens.

As stated above, a shadow image can be obtained using the first aperture member, and a phase-contrast image can be obtained using the second aperture member. Here, by satisfying the condition expression (9), brightness of the shadow image and brightness of the phase-contrast image becomes substantially same. Therefore, for visual observation, an image that is easy to view can be obtained even when an observation method is changed by changing the aperture member. Moreover, for image pickup by an image pick-up device, since brightness is substantially same between two images, the image pickup can be performed easily.

The expression of "the region of the transmission part that passes through the pupil of the objective lens" in condition expressions (6) to (9) specifically refers to "among the light that passed through the transmission part, the region that the light pass through the pupil of the objective lens".

Moreover, a sample observation device of the present embodiment includes an illumination optical system and an observation optical system, and the illumination optical system includes a light source and a condenser lens, and the observation optical system includes an objective lens, an aperture member and an imaging lens, and the aperture member includes a light-shielding part or a darkening part, and a transmission part, and the aperture member is disposed so that the light-shielding part or the darkening part includes an optical axis of the observation optical system, and the transmission part is located outside of an outer edge of the light-shielding part or the darkening part, and an image of an outer edge of a pupil of the condenser lens is formed between an inner edge of the transmission part and an outer edge of the transmission part.

Figure 26:
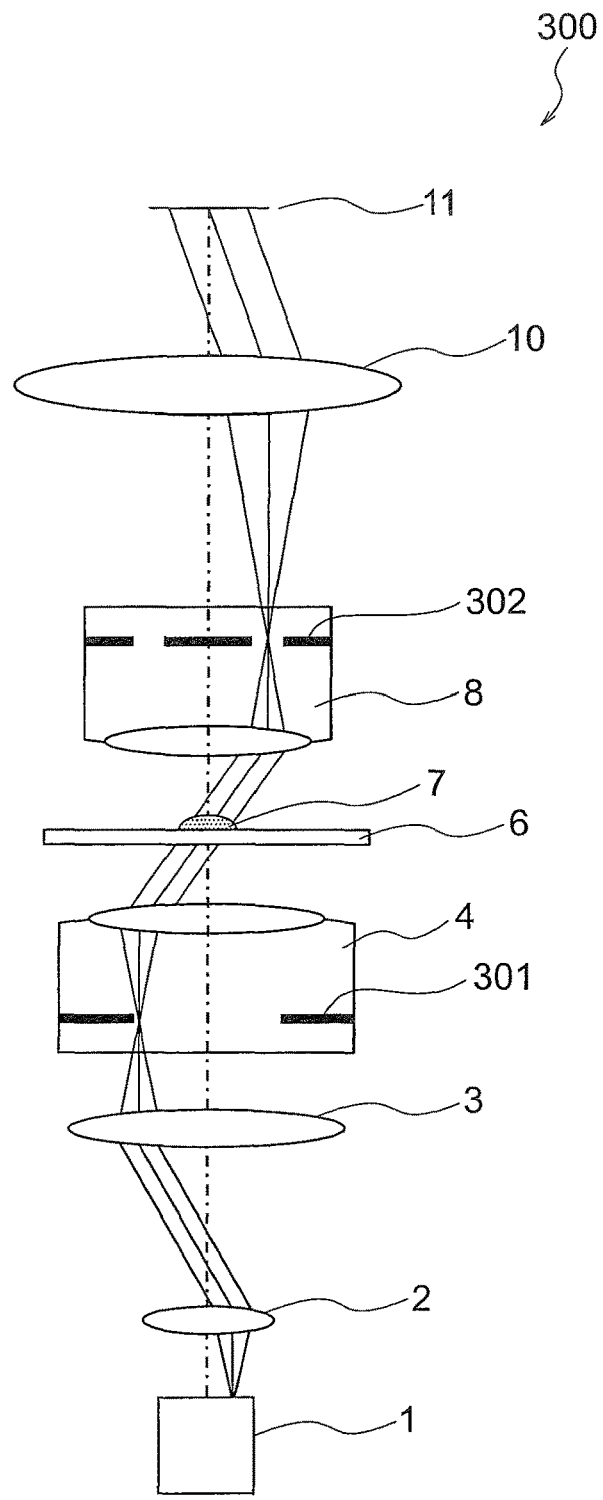
FIG. 26 is a diagram showing the configuration of another sample observation device of the present embodiment.

FIG. 26 is a diagram showing the configuration of another sample observation device of the present embodiment. A sample observation device 300 is an upright microscope, for example, and includes an illumination optical system and an observation optical system. The illumination optical system includes a light source 1 and a condenser lens 4. The illumination optical system includes a lens 2, a lens 3 and an aperture member 301 as needed. The observation optical system includes an objective lens 8, an aperture member 302 and an imaging lens 10.

Light emitted from the light source 1 passes through the lens 2 and the lens 3, and reaches the condenser lens 4. Light incident on the condenser lens 4 becomes a circular light flux, and is emitted from the condenser lens 4.

The aperture member 301 may be disposed in the illumination optical system. With this configuration, it is possible to change the diameter of a light flux. The configuration where the aperture member 301 is disposed in the illumination optical system is described below. In the configuration shown in FIG. 26, the aperture member 301 and the condenser lens 4 are integrally configured. However, the aperture member 301 and the condenser lens 4 may be configured as separate bodies.

The aperture member 301 is conjugate to the light source 1. Therefore, illumination light emitted from the light source 1 is collected at the position of the aperture member 301. That is, an image of the light source 1 is formed at the position of the aperture member 301.

Illumination light emitted from the aperture member 301 enters the condenser lens 4. Here, the position of the aperture member 301 coincides with the focal position of the condenser lens 4 (or the pupil position of the condenser lens 4). Therefore, the illumination light emitted from one point of the condenser lens 4 becomes parallel light. Moreover, since a shape of the transmission part of the aperture member 301 is a circular shape, a shape of the illumination light also is a circular shape.

The illumination light emitted from the condenser lens 4 reaches a sample 7. The sample 7 is placed on a holding member 6. The sample 7 is a cell, for example, which is colorless and transparent.

The light passing through the sample 7, i.e., imaging light enters an objective lens 8. This objective lens 8 includes the aperture member 302. The aperture member 302 is disposed at the pupil position of the objective lens. At the aperture member, a shape of the transmission part is annular shape.

The imaging light emitted from the objective lens 8 enters the imaging lens 10. Then an image of the sample 7 is formed at an image position 11 by the imaging light emitted from the imaging lens 10.

As shown in FIG. 26, parallel light passing through the sample 7 is collected at the pupil position of the objective lens. At the pupil position of the objective lens 8, the aperture member 302 is disposed. Therefore, the aperture member 301 is conjugate to the aperture member 302. Since the position of the aperture member 301 corresponds to the pupil position of the condenser lens 4 as well, then the pupil of the condenser lens 4 is conjugate to the aperture member 302. As a result, at the position of the aperture member 302, an image of the pupil of the condenser lens 4 is formed.

Figure 27A:
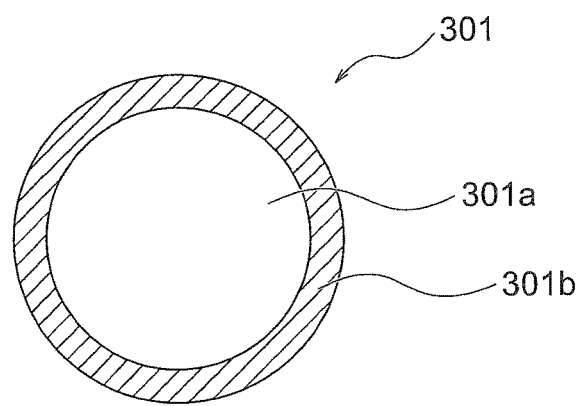
FIG. 27A and FIG. 27B are diagrams showing the configurations of aperture members, where
Figure 27B:
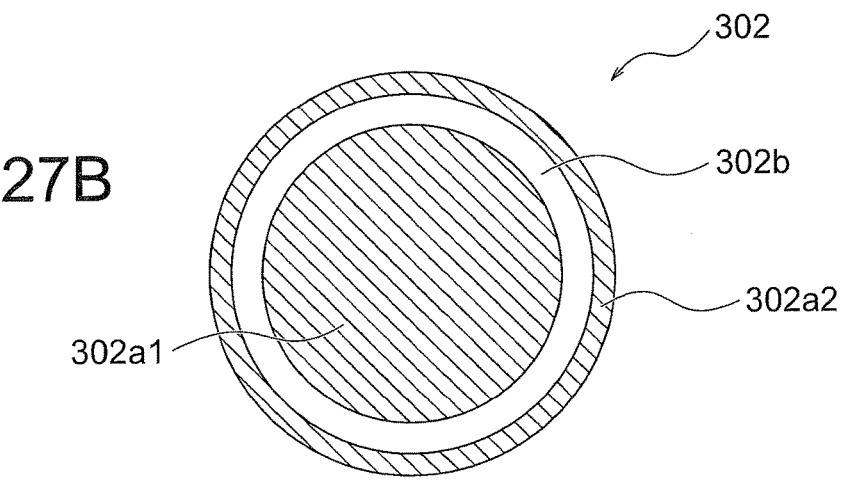

FIG. 27A and FIG. 27B are diagrams showing the configuration of aperture members, where FIG. 27A is a diagram showing an aperture member disposed in the illumination optical system, and FIG. 27B is a diagram showing an aperture member disposed in the observation optical system.

The aperture member 301 disposed in the illumination optical system is disposed at the pupil position of the condenser lens 4. As shown in FIG. 27A, the aperture member 301 includes a transmission part 301a and a light-shielding part 301b. The transmission part 301a is circular shape. The light-shielding part 301b is located outside of the transmission part 301a.

Meanwhile, the aperture member 302 disposed in the observation optical system is disposed at the pupil position of the objective lens 8. As shown in FIG. 27B, the aperture member 302 includes a light-shielding part 302a1, a light-shielding part 302a2 and a transmission part 302b. Here, since the configuration of the aperture member 302 is the same as the configuration of the aperture member 5' in FIG. 2B, the description on the configuration of the aperture member 302 is omitted. The light-shielding part 302a1 may be configured a darkening member.

Here, an image of the outer edge of the transmission part 301a of the aperture member 301, i.e., an image of the outer edge of the pupil of the condenser lens 4 (hereinafter, referred to as an "outer edge image" as appropriate) is formed at the position of the aperture member 302 as shown in FIG. 26. FIG. 28A and FIG. 28B, and FIG. 29A and FIG. 29B show this state.

Figure 28A:
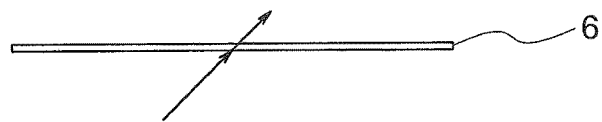
FIG. 28A and FIG. 28B are diagrams showing the relationship between an image of the pupil of the condenser lens and the aperture member when no sample is present, where
Figure 28B:
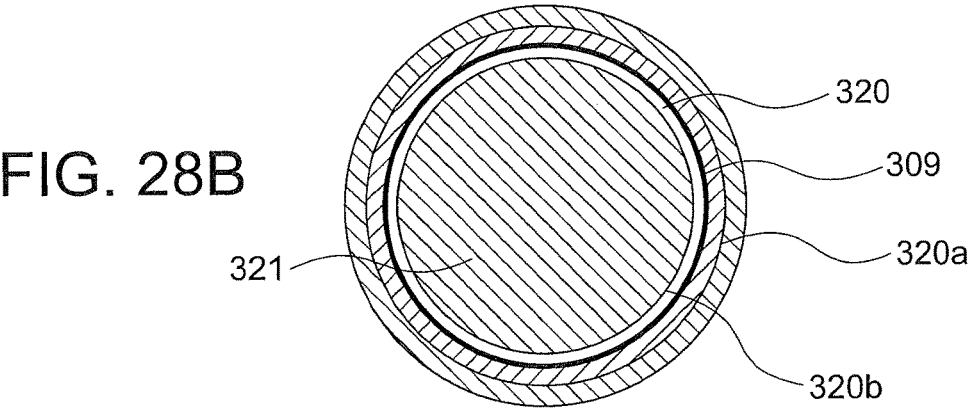

FIG. 28A and FIG. 28B are diagrams showing the relationship between an image of the pupil of the condenser lens and the aperture member in the case where no sample is present. FIG. 28A is a diagram showing the state of refraction of light at the sample position, and FIG. 28B is a diagram showing the relationship between an image of the pupil of the condenser lens and the aperture member. The case where a sample is present but its surface is flat, is included in the case where no sample is present.

Figure 29A:
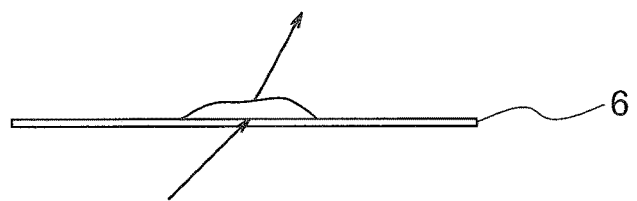
FIG. 29A and FIG. 29B are diagrams showing the relationship between an image of the pupil of the condenser lens and the aperture member when a sample is present, where
Figure 29B:
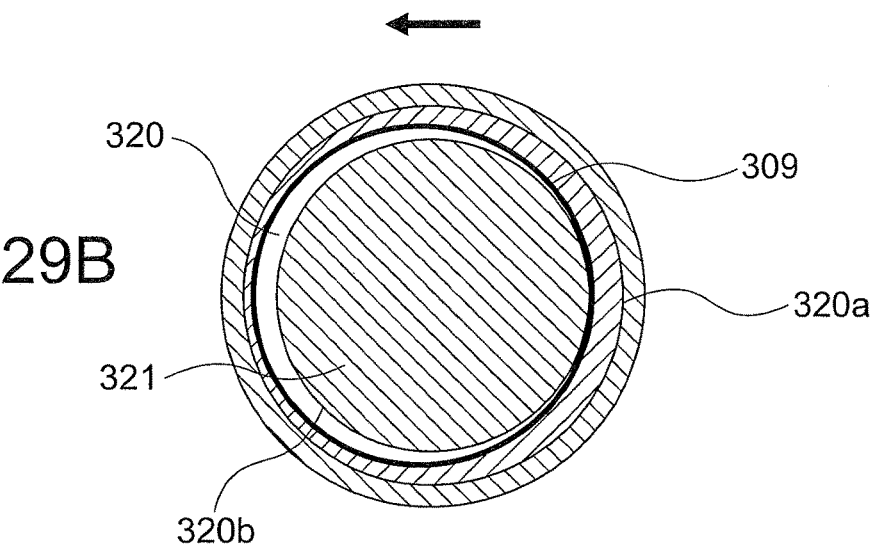

FIG. 29A and FIG. 29B are diagrams showing the relationship between an image of the pupil of the condenser lens and the aperture member in the case where a sample is present. FIG. 29A is a diagram showing the state of refraction of light at the sample position, and FIG. 29B is a diagram showing the relationship between an image of the pupil of the condenser lens and the aperture member. The case where a sample is present refers to the case where the surface of the sample is inclined (not-flat). Therefore, the case where a sample is present but its surface is flat, is not included in the case where a sample is present.

In the case where no sample is present, as shown in FIG. 28A, the direction of the light becomes same between light incident on the holding member 6 and light emitted from the holding member 6. As a result, an image of the pupil of the condenser lens formed at the pupil position of the objective lens, i.e., at the position of the aperture member 302 becomes as shown in FIG. 28B. The circle (circumference) indicated with numeral 309 is the outer edge image, and the inside of the circle (circumference) is the image of the pupil of the condenser lens.

As shown in FIG. 28B, a shape of the transmission part 320 is an annulus, a shape of the light-shielding part 321 is a circle, and a shape of the outer edge image 309 is a circle. Then, the transmission part 320, the light-shielding part 321 and the outer edge image 309 are concentric. Further, the center of the transmission part 320, the center of the light-shielding part 321 and the center of the outer edge image 309 coincide with each other.

Here, the center of the transmission part 320 refers to the center of a circle defining an outer edge 320a of the transmission part (since the transmission part 320 is an annulus, the center of the transmission part 320 is the center of the circle defining an inner edge 320b of the transmission part as well).

The outer edge image 309 is located outside (the direction moving away the optical axis) of the inner edge 320b of the transmission part, and is located inside (the direction approaching the optical axis) of the outer edge 320a of the transmission part. As just described, in the sample observation device of the present embodiment, the image 309 of the outer edge of the pupil of the condenser lens is formed between the inner edge 320b of the transmission part and the outer edge 320a of the transmission part.

Here, light outside of the outer edge image 309 does not pass through the transmission part 320 (is not emitted from the objective lens 8) because it is shielded by the light-shielding part 301b of the aperture member 301. Therefore, the region of a light flux passing through the transmission part 320 is the region between the inner edge 320b of the transmission part and the outer edge image 309. Then, the area of this region as a whole corresponds to the brightness of the sample image.

In the case where a sample is present, as shown in FIG. 29A, the direction of the light becomes different between light incident on the holding member 6 and light emitted from the sample. As a result, an image of the pupil of the condenser lens formed at the position of the aperture member 302 becomes as shown in FIG. 29B. In FIG. 29B also, the circle (circumference) indicated with numeral 309 is the outer edge image, and the inside of the circle (circumference) is the image of the pupil of the condenser lens.

As shown in FIG. 29B, a shape of the transmission part 320 is an annulus, a shape of the light-shielding part 321 is a circle, and a shape of the outer edge image 309 is a circle. However, the transmission part 320 and the light-shielding part 321, and the outer edge image 309 are not concentric. Moreover, the center of the transmission part 320 and the center of the light-shielding part 321, and the center of the outer edge image 309 do not coincide with each other. That is, the center of the outer edge image 309 shifts to the left on the sheet with reference to the center of the transmission part 320 and the center of the light-shielding part 321.

In FIG. 29B as well, light outside of the outer edge image 309 does not pass through the transmission part 320 (is not emitted from the objective lens 8) because it is shielded by the light-shielding part 301b of the aperture member 301. Therefore, the region of a light flux passing through the transmission part 320 is the region between the inner edge 320b of the transmission part and the outer edge image 309. Then, the area of this region as a whole corresponds to the brightness of the sample image.

Here, the outer edge image 309 is located outside of the inner edge 320b of the transmission part. In other words, in FIG. 29B, the light-shielding part 321 is located inside of the outer edge image 309. This is because the inclination of the surface of the sample is small. On the other hand, in the case where no sample is present as well, the light-shielding part 321 is located inside of the outer edge image 309. Therefore, even in the case where a sample is present, if the inclination of the surface of the sample is small, brightness of the sample image will be the same as in the case where no sample is present.

However, when the inclination of the sample surface is becomes larger, displacement of the center of the transmission part 320 with reference to the center of the outer edge image 309 becomes larger. In this case, a part of the outer edge image 309 will be located inside of the inner edge 320b of the transmission part. Moreover, a part of the outer edge image 309 will be located outside of the outer edge 320a of the transmission part. In other words, a part of the outer edge image 309 is located inside of the light-shielding part 321. As a result, the region of a light flux passing through the transmission part 320 changes greatly. That is, the brightness of the sample image is different from that in the case where no sample is present.

By the way, in the sample observation device 100, the image 20 of the transmission part of the aperture member is displaced with reference to the pupil 9 of the objective lens. On the other hand, in the sample observation device 300, the outer edge image 309 is displaced with reference to the transmission part 320. Here, the transmission part 320 is conjugate to the pupil of the condenser lens. Therefore, when the pupil position of the condenser lens is considered as a reference, the image of the transmission part 320 is displaced with reference to the pupil of the condenser lens in the sample observation device 300 as well.

As just described, the phenomenon of the displacement in the sample observation device 300 and the phenomenon of the displacement in the sample observation device 100 are the same in that the image of the transmission part is displaced with reference to the pupil of the optical system. Therefore, in the sample observation device 300 as well, the amount of light passing through the objective lens increases in accordance with the amount of decentering, i.e., the amount of displacement A as shown in FIG. 7A.

As described above, in the sample observation device of the present embodiment, a change in shape at the sample (change in inclination) is converted into a change in displacement of the image of the pupil of the condenser lens. Then, by the change in displacement of the image of the pupil of the condenser lens, a change in the amount of light flux passing through the transmission part provided in the observation optical system is generated. That is, the change in shape at the sample can be detected as a change in brightness of the imaging light. As a result, even when the sample is colorless and transparent, it is possible to obtain a sample image with shadow.

Moreover, although the generated direction of shadow depends on the direction of displacement of the outer edge image 309 with reference to the transmission part 320, the direction of displacement of the outer edge image 309 is not limited. Therefore, in the sample observation device of the present embodiment, the generated direction of shadow is not limited.

Moreover, in the sample observation device of the present embodiment, it is preferable that an aperture member having a predetermined transmission part is disposed in the illumination optical system, and the transmittance of the predetermined transmission part changes gradually from the center to the periphery. Further, it is preferable that the transmittance decreases gradually from the center to the periphery.

Figure 30:
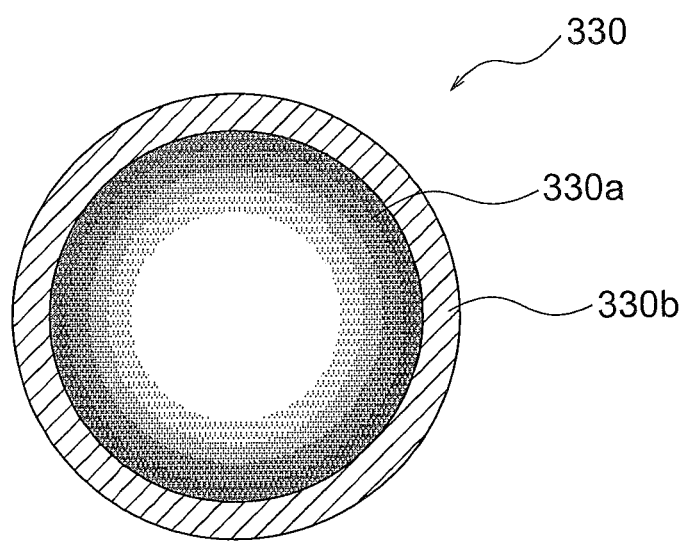
FIG. 30 is a diagram showing the aperture member having a predetermined transmission part.

At the aperture member 301 shown in FIG. 27A, the transmittance is the same at every place of the transmission part 301a. Therefore, the amount of a light flux emitted from the objective lens 8 does not change from A to B as shown in FIG. 7B. From this, it is preferable that the aperture member having a predetermined transmission part is disposed in the illumination optical system. FIG. 30 is a diagram showing an aperture member having a predetermined transmission part.

As shown in FIG. 30, an aperture member 330 includes a transmission part 330a and a light-shielding part 330b. Here, at the transmittance of the transmission part 330a, transmittance changes gradually from the center to the periphery. The transmittance preferably decreases gradually from the center to the periphery.

With this configuration, in the sample observation device of the present embodiment, a change in shape at the sample (change in inclination) is converted into a change in displacement of the image of the pupil of the condenser lens. Then, by the change in displacement of the image of the pupil of the condenser lens, a change in the amount of a light flux passing through the transmission part provided in the observation optical system is generated. Further, even small displacement in the image of the pupil of the condenser lens, a change in the amount of a light flux passing through the transmission part provided in the observation optical system is generated. That is, the change in shape at the sample can be detected as a change in brightness of the imaging light. As a result, even when the sample is colorless and transparent, it is possible to obtain a sample image with shadow.

Moreover, the configuration of the aperture member 302 is not limited to the configuration shown in FIG. 27B. For instance, the aperture member 302 may have the following configuration of the aperture members (I) to (V):

(I) aperture member 5 (FIG. 2A);
(II) aperture member (FIG. 8A);
(III) aperture members 50, 51 (FIG. 10A and FIG. 10B);
(IV) aperture members 230, 240 and 250 (FIG. 18A, FIG. 18B and FIG. 18C); and
(V) aperture member 260 (FIG. 19).

By imparting the configuration of the aperture member of (II) or (III) to the aperture member 302, a change in shape at the sample (change in inclination) is converted into a change in displacement of the image of the pupil of the condenser lens. Then, by the change in displacement of the image of the pupil of the condenser lens, a change in the amount of a light flux passing through the transmission part provided in the observation optical system is generated. Further, even small displacement in the image of the pupil of the condenser lens, a change in the amount of a light flux passing through the transmission part provided in the observation optical system is generated. That is, the change in shape at the sample can be detected as a change in brightness of the imaging light. As a result, even when the sample is colorless and transparent, it is possible to obtain a sample image with shadow.

Moreover, by imparting the configuration of the aperture member of (IV) to the aperture member 302, it is possible to observe both of a colorless and transparent sample and a stained sample favorably.

Moreover, by imparting the configuration of the aperture member of (V) to the aperture member 302, a shadow image and a sample image with contrast can be obtained for a colorless and transparent sample. Moreover, even when a shadow image cannot be observed, it is possible to observe a colorless and transparent sample in an observation field. Moreover, it is possible to observe an outline of a colorless and transparent sample by a shadow image, and is possible to observe the inside of the colorless and transparent sample by a coherent illumination image.

Moreover, in the sample observation device of the present embodiment, it is preferable that an area of the light-shielding part or the darkening part is 50% or more of an area of an image of the pupil of the condenser lens.

With this configuration, it is possible to detect a change in shape at the sample as a change in brightness. As a result, even when the sample is colorless and transparent, it is possible to obtain a sample image with shadow.

If the 50% range of the image of the pupil of the condenser lens cannot be shielded, the interval from the inner edge 320b of the transmission part to the outer edge of the image of the pupil of the condenser lens becomes too wide. In this case, it becomes difficult to make a difference in the amount of a light flux passing through the transmission part 320 between the case where displacement of the transmission part 320 is present and the case where it is not present. Therefore, it becomes difficult to detect a change in shape at the sample as a change in brightness. As a result, it becomes difficult to obtain a sample image with shadow. Alternatively, the contrast of a sample image deteriorates.

It is preferable that the area of the light-shielding part 321 is 70% or more of the area of the image of the pupil of the condenser lens. Further, it is more preferable that the area of the light-shielding part 321 is 85% or more of the area of the image of the pupil of the condenser lens.

Moreover, in the sample observation device of the present embodiment, it is preferable that the following condition expression (10) is satisfied:

$$R'_0 < R_{oc} \times \beta < R'_1 \qquad (10),$$

where $R'_0$ denotes a length from the optical axis of the observation optical system to the inner edge of the transmission part, $R'_1$ denotes a length from the optical axis of the observation optical system to the outer edge of the transmission part, $R_{oc}$ denotes a radius of the pupil of the condenser lens, and $\beta$ denotes a value obtained by dividing a focal length of the objective lens by a focal length of the condenser lens.

By satisfying the condition expression (10), it is possible to detect a change in shape at the sample as a change in brightness. As a result, even when the sample is colorless and transparent, it is possible to obtain a sample image with shadow.

Moreover, in the sample observation device of the present embodiment, at a position of the transmission part, a center of an image of the pupil of the condenser lens preferably coincides with a center of the transmission part.

With this configuration, the generated direction of shadow is not limited.

Moreover, in the sample observation device of the present embodiment, it is preferable that the following condition expression (11) is satisfied:

$$(R_{oc} \times \beta - R'_0)/(R'_1 - R_{oc} \times \beta) < 1 \qquad (11),$$

where $R'_0$ denotes the length from the optical axis of the observation optical system to the inner edge of the transmission part, $R'_1$ denotes the length from the optical axis of the observation optical system to the outer edge of the transmission part, $R_{oc}$ denotes the radius of the pupil of the condenser lens, and $\beta$ denotes the value obtained by dividing a focal length of the objective lens by a focal length of the condenser lens.

By satisfying the condition expression (11), it is possible to detect a change in shape at the sample as a change in brightness. As a result, even when the sample is colorless and transparent, it is possible to obtain a sample image with shadow.

If $(R_{oc} \times \beta - R'_0)$ is too large, the condition expression (11) is not satisfied. In this case, the size of the light-shielding part becomes too small. Therefore, the interval between arrow A and arrow B in FIG. 7A becomes long. In this case, it becomes difficult to detect a fine change in shape at the sample (change in inclination) as a change in brightness.

Moreover, if $(R'_1 - R_{oc} \times \beta)$ is too small, the condition expression (11) is not satisfied. In this case, the interval from the outer edge of the transmission part to the outer edge image is too narrow. When the displacement amount Δ' becomes larger, then the annular light-shielding part (the light-shielding part 302a2 shown in FIG. 27B, for example) is located inside of the outer edge image. Therefore, the light flux passing through the pupil of the objective lens becomes less. As a result, the sample image becomes dark. The displacement amount Δ' is a difference between a center of an image of the pupil of the condenser lens and a center of the aperture member.

Moreover, in the sample observation device of the present embodiment, it is preferable that the following condition expressions (12), (13) are satisfied:

$$0.7 \le R'_0/(R_{oc} \times \beta) < 1 \qquad (12), \text{ and}$$

$$1 < R'_1/(R_{oc} \times \beta) \le 2 \qquad (13)$$

where $R'_0$ denotes the length from the optical axis of the observation optical system to the inner edge of the transmission part, $R'_1$ denotes the length from the optical axis of the observation optical system to the outer edge of the transmission part, $R_{oc}$ denotes the radius of the pupil of the condenser lens, and $\beta$ denotes the value obtained by dividing a focal length of the objective lens by a focal length of the condenser lens.

When falling below the lower limit value of the condition expression (12), the interval from the inner edge of the transmission part to the outer edge image becomes too wide. In this case, it becomes difficult to make a difference in the amount of a light flux passing through the pupil of the objective lens between the case where the displacement amount Δ' is 0 and the case where it is not 0. Therefore, it becomes difficult to detect a change in shape at the sample as a change in brightness. As a result, it becomes difficult to obtain a sample image with shadow. Alternatively, the contrast of a sample image deteriorates.

When exceeding the upper limit value of the condition expression (12), the transmission part will be always located outside of the image of the pupil of the condenser lens. Accordingly, it is not possible to detect a change in shape at the sample as a change in brightness. Therefore, exceeding the upper limit value of the condition expression (12) does not occur.

When falling below the lower limit value of the condition expression (13), the transmission part will be located inside of the image of the pupil of the condenser lens. Accordingly, it becomes difficult to detect a change in shape at the sample as a change in brightness. Therefore, falling below the lower limit value of the condition expression (13) does not occur.

By making so as not to exceed the upper limit value of the condition expression (13), a light flux passing through a part outside of the transmission part can be decreased. Therefore, the generation of flare and the generation of ghost can be prevented.

It is preferable that the following condition expression (12') is satisfied instead of condition expression (12):

$$0.8 \leq R'_0/(R_{oc} \times \beta) < 1 \quad (12').$$

Further, it is more preferable that the following condition expression (12") is satisfied instead of condition expression (12):

$$0.9 \leq R'_0/(R_{oc} \times \beta) < 1 \quad (12").$$

It is preferable that the following condition expression (13') is satisfied instead of condition expression (13):

$$1 < R'_1/(R_{oc} \times \beta) \leq 1.5 \quad (13').$$

Further, it is more preferable that the following condition expression (13") is satisfied instead of condition expression (13):

$$1 < R'_1/(R_{oc} \times \beta) \leq 1.3 \quad (13").$$

Moreover, in the sample observation device of the present embodiment, it is preferable that transmittance at the transmission part varies from place to place.

As stated above, when the transmittance is the same at the transmission part as a whole, the state where the amount I of a light flux does not change even when the displacement amount $\Delta'$ changes (between arrow A and arrow B shown in FIG. 7A) occurs. Then, it is preferable that the transmittance at the transmission part varies from place to place. With this configuration, it is possible to decrease the state where the amount I of a light flux does not change with a change in the displacement amount $\Delta'$.

The configuration of the aperture member whose transmittance at the transmission part changes from place to place is shown in FIG. 8A and FIG. 10A and FIG. 10B. The configuration of the aperture members in these drawings may be imparted to the aperture member 302.

Moreover, in the sample observation device of the present embodiment, it is preferable that the following condition expression (14) is satisfied:

$$T'_{in} < T'_{out} \quad (14)$$

where $T'_{in}$ denotes a transmittance in a vicinity of the inner edge of the transmission part, and $T'_{out}$ denotes a transmittance in a vicinity of the outside of the transmission part.

By satisfying the condition expression (14), it is possible to decrease the state where the amount I of a light flux does not change with a change in the displacement amount $\Delta'$. As a result, it is possible to detect a finer change in shape at the sample (change in inclination) as a change in brightness.

Moreover, in the sample observation device of the present embodiment, it is preferable that the aperture member is made of an opaque member, and the transmission part includes a plurality of apertures formed at the opaque member.

At the aperture member 220 shown in FIG. 17A, the transmission part has a plurality of apertures formed at an opaque member. The configuration of this aperture member 220 may be imparted to the aperture member 302. Since the technical significance of the aperture member 302 in this case is the same as the technical significance of the aperture member 220, the detailed descriptions are omitted.

As just described, according to the sample observation device of the present embodiment, it is possible to form the transmission part 223 easily. Moreover, by changing the diameter or the density of the minute apertures 224, it is possible to obtain the transmission part 223 having various transmittance. Moreover, it is possible to change the degree of change of transmittance variously.

Moreover, in the sample observation device of the present embodiment, it is preferable that the following condition expression (15) is satisfied:

$$0.01 < (S'_T \times T'_T)/(S'_{ND} \times T'_{ND}) < 100 \quad (15),$$

where $S'_{ND}$ denotes an area of the darkening part, $T'_{T1}$ denotes a transmittance (%) at the darkening part, $S'_T$ denotes an area of a region of the light passing through the transmission part among light that passed through the pupil of the condenser lens, and $T'_{T2}$ denotes a transmittance (%) of the region of the light passing through the transmission part among the light that passed through the pupil of the condenser lens.

By satisfying the condition expression (15), it is possible to observe both of a colorless and transparent sample and a stained sample favorably. The transmittance is average transmittance. When transmittance is the same at any place, the transmittance is a transmittance at any place, and when transmittance is different from place to place, the transmittance is average of transmittance at the places.

When falling below the lower limit value of the condition expression (15), since the amount of illumination light emitted from the transmission part becomes less relatively, a shadow image becomes too dark. Alternatively, since the amount of illumination light emitted from the darkening part becomes more relatively, the contrast of a shadow image deteriorates. As a result, it becomes difficult to observe a colorless and transparent sample.

When exceeding the upper limit value of the condition expression (15), since the amount of illumination light emitted from the darkening part becomes less relatively, a shading image becomes too dark. As a result, it becomes difficult to observe a stained sample.

It is preferable that the following condition expression (15') is satisfied instead of the condition expression (15):

$$0.03 < (S'_T \times T'_T)/(S'_{ND} \times T'_{ND}) < 30 \quad (15').$$

Further, it is more preferable that the following condition expression (15") is satisfied instead of the condition expression (15):

$$0.1 < (S'_T \times T'_T)/(S'_{ND} \times T'_{ND}) < 10 \quad (15").$$

Moreover, the sample observation device of the present embodiment includes an illumination optical system and an observation optical system, and the illumination optical system includes a light source and a condenser lens, and the observation optical system includes an objective lens, an aperture member and an imaging lens, and the aperture member includes a light-shielding part or a darkening part, a first transmission part and a second transmission part, and the aperture member is formed so that the first transmission part includes an optical axis of the observation optical system, and the light-shielding part or the darkening part is located outside of the outer edge of the first transmission part, and the second transmission part is located outside of the outer edge of the light-shielding part or the darkening part, and an image of an outer edge of a pupil of the condenser lens is formed between an inner edge of the second transmission part and an outer edge of the second transmission part.

In an aperture member 260 shown in FIG. 19, the first transmission part is formed so as to include the optical axis of the illumination optical system. The configuration of this aperture member 260 may be imparted to the aperture member 302. Since the technical significance of the aperture member 302 in this case is the same as the technical significance of the aperture member 260, the detailed descriptions are omitted.

As just described, according to the sample observation device of the present embodiment, a sample image with shadow and a sample image with contrast can be obtained for a colorless and transparent sample. Moreover, even when a sample image with shadow cannot be observed, it is possible to observe a colorless and transparent sample in an observation field. Moreover, it is possible to observe an outline of a colorless and transparent sample by a sample image with shadow, and it is possible to observe the inside of the colorless and transparent sample by a coherent illumination image.

Moreover, in the sample observation device of the present embodiment, it is preferable that the following condition expression (16) is satisfied:

$$0.01<(S'_{T2} \times T'_{T2})/(S'_{T1} \times T'_{T1})<100 \quad (16),$$

where $S'_{T1}$ denotes an area of the first transmission part, $T'_{T1}$ denotes a transmittance (%) at the first transmission part, $S'_{T2}$ denotes an area of a region of the light passing through the second transmission part among light that passed through the pupil of the condenser lens, and $T'_{T2}$ denotes a transmittance (%) of the region of the light passing through the second transmission part among the light that passed through the pupil of the condenser lens.

By satisfying the condition expression (16), it is possible to obtain both of a sample image with shadow and a coherent illumination image for a colorless and transparent sample. The transmittance is average transmittance. When transmittance is the same at any place, the transmittance is a transmittance at any place, and when transmittance is different from place to place, the transmittance is average of transmittance at the places.

When falling below the lower limit value of the condition expression (16), since amount of illumination light emitted from the second transmission part becomes less relatively, a shadow image becomes too dark. Alternatively, since the amount of illumination light emitted from the first transmission part becomes more relatively, the contrast of a shadow image deteriorates. As a result, it becomes difficult to obtain a sample image with shadow for a colorless and transparent sample. Moreover, since the degree of coherence of the illumination light deteriorates, the contrast of the coherent illumination image deteriorates.

When exceeding the upper limit value of the condition expression (16), since the amount of illumination light emitted from the first transmission part becomes less relatively, a coherent illumination image becomes too dark. As a result, it becomes difficult to obtain a bright coherent illumination image for a colorless and transparent sample.

It is preferable that the following condition expression (16') is satisfied instead of the condition expression (16):

$$0.03<(S'_{T2} \times T'_{T2})/(S'_{T1} \times T'_{T1})<30 \quad (16').$$

Further, it is more preferable that the following condition expression (16") is satisfied instead of the condition expression (16):

$$0.1<(S'_{T2} \times T'_{T2})/(S'_{T1} \times T'_{T1})<10 \quad (16").$$

Moreover, a sample observation device of the present embodiment includes an illumination optical system and an observation optical system, and the illumination optical system includes a light source, a condenser lens, and an illumination-side aperture member, and the observation optical system includes an objective lens, an observation-side aperture member, and an imaging lens, and the illumination-side aperture member includes a plurality of band-shaped transmission parts, and the observation-side aperture member includes transmission parts in number corresponding to the number of the band-shaped transmission parts, and an outer shape of the transmission parts and an outer shape of the band-shaped transmission parts are similar, and the band-shaped transmission parts and the transmission parts are disposed so that centers of each band-shaped transmission part and the transmission part, which a pair, are made to be a conjugate relation, and an image of the inner edge of the band-shaped transmission part is formed inside of the outer edge of the transmission part, and an image of the outer edge of the band-shaped transmission part is formed outside of the outer edge of the transmission part.

In the sample observation device 100 shown in FIG. 1, the aperture member having one transmission part is disposed in the illumination optical system. On the other hand, no aperture member is disposed in the observation optical system, but the pupil of the objective lens serves as the transmission part of the aperture member. Therefore, it can be said that an aperture member having one transmission part is also disposed in the observation optical system. As just described, in the sample observation device 100, the illumination optical system and the observation optical system each include one transmission part.

Figure 31A:
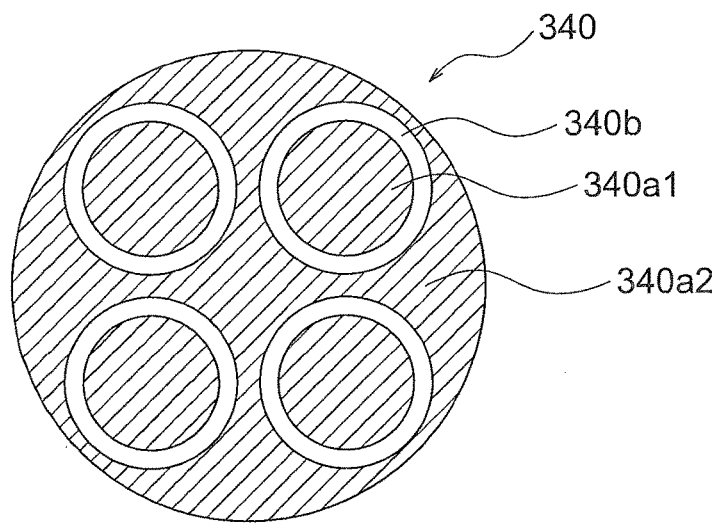
FIG. 31A and FIG. 31B are diagrams showing the aperture members having a plurality of transmission parts, where
Figure 31B:
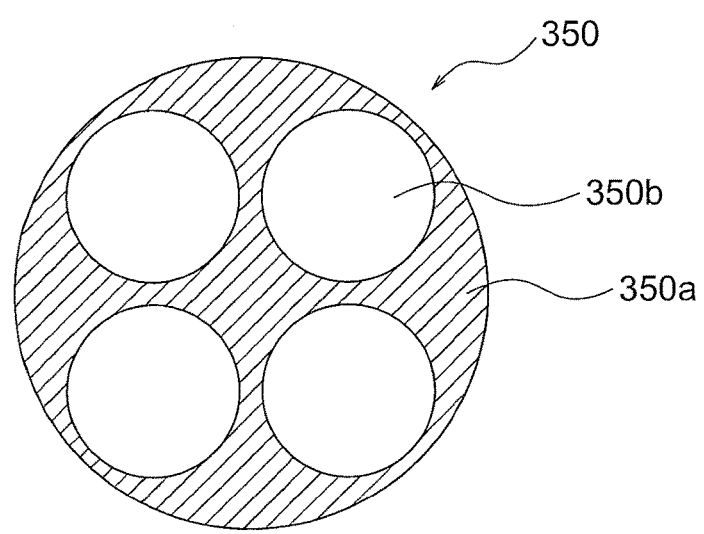

On the other hand, in the sample observation device of the present embodiment, an aperture member is disposed both of the illumination optical system and the observation optical system. Here, in the illumination optical system, the illumination-side aperture member is disposed, and in the observation optical system, the observation-side aperture member is disposed. Then, the illumination-side aperture member and the observation-side aperture member each have a plurality of transmission parts. FIG. 31A and FIG. 31B are diagrams showing the aperture members having a plurality of transmission parts, where FIG. 31A is a diagram showing the illumination-side aperture member and FIG. 31B is a diagram showing the observation-side aperture member.

As shown in FIG. 31A, the illumination-side aperture member 340 includes a light-shielding part 340a1 and a transmission part 340b. Further, the aperture member 340 includes a light-shielding part 340a2. The light-shielding parts 340a1, 340a2 and the transmission part 340b are made of a transparent member, such as a glass plate or a resin plate. The light-shielding parts 340a1 and 340a2 are formed by applying light-shielding paint on a glass plate, for example. On the other hand, nothing is applied to the transmission part 340b. That is, the transmission part 340b is a glass plate as it is.

A shape of the light-shielding part 340a1 is a circle. Meanwhile, a shape of the transmission part 340b is band-shaped, specifically is an annulus.

In the illumination-side aperture member 340, a plurality of the light-shielding parts 340a1 are formed. Therefore, a plurality of the transmission parts 340b are also formed. Specifically, four transmission parts 340b are formed. Then, the four transmission parts 340b are disposed two-dimensionally. The illumination-side aperture member 340 is disposed at the position of the aperture member 5 in the sample observation device 100 (FIG. 1).

Meanwhile, as shown in FIG. 31B, the observation-side aperture member 350 includes a light-shielding part 350a and a transmission part 350b. The light-shielding part 350a and the transmission part 350b are made of a transparent member, such as a glass plate or a resin plate. The light-shielding parts 350a is formed by applying light-shielding paint on a glass plate, for example. On the other hand, nothing is applied to the transmission part 350b. That is, the transmission part 350b is a glass plate as it is.

Here, an outer shape of the transmission part 350b and an outer shape of the transmission part 340b are similar. Specifically, since the outer shape of the transmission part 340b is a circle, the outer shape of the transmission part 350b also is a circle.

In the observation-side aperture member 350, a plurality of the transmission parts 350b are formed. Specifically, four transmission parts 350b are formed. Then, the four transmission parts 350b are disposed two-dimensionally. The observation-side aperture member 350 is disposed at the position of the pupil 9 of the objective lens in the sample observation device 100 (FIG. 1).

Moreover, one transmission part 340b is paired with one transmission part 350b. Then, the transmission part 340b and the transmission part 350b are disposed so that their centers are made to be conjugate relation. For instance, the right upper transmission part 340b of the illumination-side aperture member 340 is paired with the left lower transmission part 350b of the observation-side aperture member 350. Moreover, when an image of the right upper transmission part 340b is formed at the position of the left lower transmission part 350b, the center of the left lower transmission part 350b and the image of the right upper transmission part 340b coincide with each other.

Moreover, the image of the inner edge of the transmission part 340b is formed inside of the outer edge of the transmission part 350b, and the image of the outer edge of the transmission part 340b is formed outside of the outer edge of the transmission part 350b. Therefore, in the case of using the transmission part 340b and the transmission part 350b as a pair, the advantageous effects described referring to FIG. 3 to FIG. 7A can be also obtained.

As a result, in the sample observation device of the present embodiment, a change in shape at the sample (change in inclination) is converted into a change in displacement of the image of the transmission part. Then, the change in displacement of the image of the transmission part causes a change in the amount of a light flux passing through the pupil of the objective lens. That is, the change in shape at the sample can be detected as a change in brightness. As a result, even when the sample is colorless and transparent, it is possible to obtain a sample image with shadow.

Further, in the sample observation device of the present embodiment, not only light passing through the periphery of the pupil of the objective lens but also light passing through the center of the pupil of the objective lens can contribute to imaging. Therefore, it is possible to obtain a brighter shadow image.

For instance, in FIG. 31A, $r_a$ denotes the radius of the light-shielding part 340a1, $\Delta_b$ denotes the width of the transmission region, and $S_M$ denotes the area of the transmission region. Meanwhile, in FIG. 28B, $3 \times r_a$ denotes the radius of the light-shielding part 321, $\Delta_b$ denotes the width of the transmission region and $S_S$ denotes the area of the transmission region. The transmission region is the region of a light flux passing through the transmission part, which is the region from the inner edge 320b of the transmission part to the outer edge image 309 in FIG. 28B.

In this case, since the area $S_M$ and the area $S_S$ are as follows, $S_M > S_S$ holds:

$$S_M = 4 \times \pi \times \{(ra+\Delta_b)^2 - r_a^2\} = 8\pi r_a \Delta_b - 4\pi \Delta_b,$$

$$S_S = \pi\{(3 \times ra+\Delta_b)^2 - (3 \times r_a)^2\} = 6\pi r_a \Delta_b - \pi \Delta_b.$$

As just described, by providing a plurality of transmission parts at the aperture member, it is possible to make the amount of imaging light passing through the transmission parts larger than in the case that number of the transmission part is one. Therefore, it is possible to obtain a brighter shadow image.

Moreover, a sample observation device of the present embodiment includes an illumination optical system and an observation optical system, and the illumination optical system includes a light source, a condenser lens, and an aperture member, and the observation optical system includes an objective lens and an imaging lens, and the aperture member includes a light-shielding part and a transmission part, and the aperture member is disposed so that the light-shielding part includes the optical axis of the illumination optical system, and the light-shielding part has a property to shield light of a predetermined wavelength band, and the transmission part is located outside of the outer edge of the light-shielding part, and an image of the inner edge of the transmission part is formed inside of the outer edge of the pupil of the objective lens, and an image of the outer edge of the transmission part is formed outside of the outer edge of the pupil of the objective lens.

At the aperture member 5 or 5' shown in FIG. 2A and FIG. 2B, light emitted from the light source is shielded by the light-shielding part 5a1 or the light-shielding part 5'a1. Here, the light-shielding part 5a1 or the light-shielding part 5'a1 shields the light of all wavelengths. Therefore, when the aperture member 5, 5' is used, a shadow image only is obtained.

Figure 32:
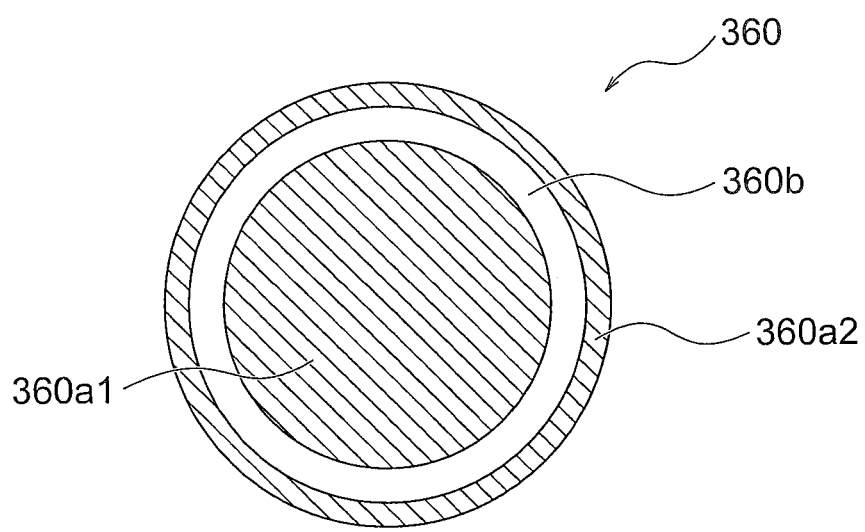
FIG. 32 is a diagram showing the aperture member having a property to shield light of a predetermined wavelength band.

On the other hand, in the sample observation device of the present embodiment, the light-shielding part of the aperture member disposed in the illumination optical system has a property to shield light of a predetermined wavelength band. FIG. 32 is a diagram showing the aperture member having a property to shield light of a predetermined wavelength band.

As shown in FIG. 32, an aperture member 360 includes a light-shielding part 360a1 and a transmission part 360b. Further, the aperture member 360 includes a light-shielding part 360a2. The light-shielding parts 360a1 and 360a2, and the transmission part 360b are made of a transparent member, such as a glass plate or a resin plate. The light-shielding part 360a2 is formed by applying light-shielding paint on a glass plate, for example. On the other hand, nothing is applied to the transmission part 360b. That is, the transmission part 360b is a glass plate as it is. The aperture member 360 is disposed so that the light-shielding part 360a1 includes the optical axis of the illumination optical system.

Meanwhile, the light-shielding part 360a1 has a property to shield light of a predetermined wavelength band. To this end, in the light-shielding part 360a1, an optical multilayer film is formed, for example. This optical multilayer film transmits light of a green wavelength band and reflects light of other wavelengths, for example.

This aperture member 360 is disposed at the position of the aperture member 5 of the sample observation device 100 (FIG. 1). Then light of a red wavelength band, for example, is allowed to enter the aperture member 360 as illumination light. In this case, red light passes through the transmission part 360b, but is reflected by the light-shielding part 360a1. As a result, the red light with an annular shape is emitted from the condenser lens 4.

The red light emitted from the condenser lens 4 reaches the pupil 9 of the objective lens, and forms an image of the transmission part 360b there. Here, the image of the inner edge of the transmission part 360b is formed inside of the outer edge of the pupil 9 of the objective lens, and an image of the outer edge of the transmission part 360b is formed outside of the outer edge of the pupil 9 of the objective lens. Therefore, in the case of using the aperture member 360, the advantageous effects described referring to FIG. 3 to FIG. 7A can be also obtained.

As a result, in the sample observation device of the present embodiment, a change in shape at the sample (change in inclination) is converted into a change in displacement of the image of the transmission part. Then, the change in displacement of the image of the transmission part causes a change in the amount of a light flux passing through the pupil of the objective lens. That is, the change in shape at the sample can be detected as a change in brightness. As a result, even when the sample is colorless and transparent, it is possible to obtain a sample image with shadow.

Meanwhile, light of a green wavelength band, for example, is allowed to enter the aperture member 360 as illumination light. In this case, green light passes through both of the transmission part 360b and the light-shielding part 360a1. As a result, green light with a circular shape is emitted from the condenser lens 4. The green light emitted from the condenser lens 4 has the same shape as the illumination light during bright-field observation. Therefore, when light of a green wavelength band is used, bright-field observation can be performed.

In order to obtain light of a predetermined wavelength band as the illumination light, an optical filter transmitting light of the predetermined wavelength band may be disposed between a white light source and the condenser lens. Alternatively, a plurality of LEDs having different wavelength bands may be disposed so that one of these LEDs emits light of the predetermined wavelength band.

As just described, according to the sample observation device of the present embodiment, observation with a shadow image and observation with a bright-field image can be performed by changing the wavelength of the illumination light.

A sample observation device of the present embodiment includes a light source, an optical system, and a holding member to hold an object, and the optical system includes a first optical system and a second optical system, and the first optical system and the second optical system face each other across the holding member, and the first optical system includes an aperture member, the optical system is configured so that an image of the transmission part of the aperture member is formed at the pupil position of the second optical system, and an image of the transmission part is eccentric to the pupil of the second optical system due to refraction generated at the object, and amount of light passing through the pupil of the second optical system increases due to the eccentricity.

In the case that the first optical system is the illumination optical system and the second optical system is the observation optical system, the configuration of the sample observation device of the present embodiment corresponds to the configuration of the sample observation device 100 shown in FIG. 1. On the other hand, in the case that the first optical system is the observation optical system and the second optical system is the illumination optical system, the configuration of the sample observation device of the present embodiment corresponds to the configuration of the sample observation device 300 shown in FIG. 26.

As shown in FIG. 4B, in the sample observation device 100, an image of the transmission part 20 of the aperture member is formed at the position of the pupil 9 of the objective lens. Then, the image of the transmission part 20 is eccentric to the pupil 9 of the objective lens because of refraction generated at the sample. As a result, as shown in FIG. 7A, the amount of light passing through the objective lens increases with the amount of eccentricity, i.e., the displacement amount Δ.

Next, as shown in FIG. 29B, in the sample observation device 300, an image of the pupil of the condenser lens is formed at the position of the transmission part 320 of the aperture member. Then, the image of the pupil of the condenser lens is eccentric to the transmission part 320 because of refraction generated at the sample.

Here, as stated above, the transmission part 320 and the pupil of the condenser lens are made to be an optically conjugate relation. Therefore, it can be said that the image of the transmission part 320 is eccentric to the pupil of the condenser lens. As a result, as shown in FIG. 7A, the amount of light passing through the objective lens increases with the amount of eccentricity, i.e., the displacement amount Δ.

As described above, in the sample observation device of the present embodiment, a change in shape at the sample (change in inclination) is converted into a change in displacement of the image of the transmission part. Then, the change in displacement of the image of the transmission part causes a change in the amount of a light flux passing through the pupil of the objective lens. That is, the change in shape at the sample can be detected as a change in brightness. As a result, even when the sample is colorless and transparent, it is possible to obtain a sample image with shadow.

Moreover, although the generated direction of shadow depends on the direction of the displacement between the image of the transmission part and the pupil of the optical system, the direction of displacement of the image of the transmission part is not limited. Therefore, in the sample observation device of the present embodiment, the generated direction of shadow is not limited.

In the sample observation device of the present embodiment, it is preferable that an image of the transmission part and the pupil of the second optical system are mutually rotationally symmetric shapes.

With this configuration, it is possible to make the acceptable amount of the displacement between the pupil of the second optical system and the position of the aperture member larger. It becomes easy to perform the positioning of the aperture member with reference to the pupil of the second optical system. The axis of rotational symmetry is the optical axis of the illumination optical system or the optical axis of the observation optical system, for example.

Figure 33:
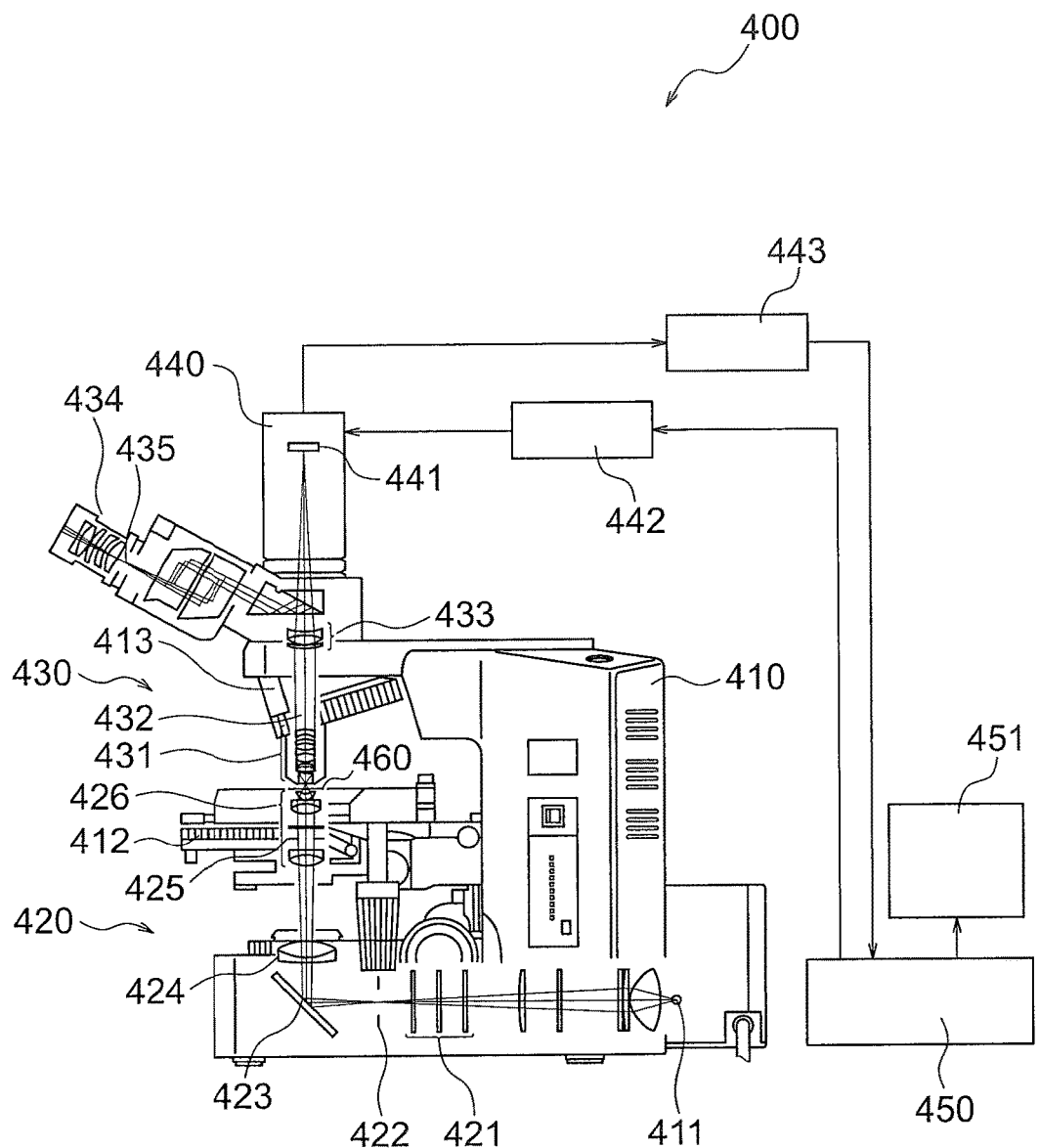
FIG. 33 is a diagram showing the configuration of a sample observation device including an image processing device.

As stated above, the sample observation device of the present embodiment preferably includes an image processing device. FIG. 33 is a diagram showing the configuration of a sample observation device including an image processing device.

A sample observation device 400 includes a main body part 410, an illumination optical system 420, an observation optical system 430, an image pickup device 440, and an image processing device 450.

The main body part 410 includes a light source 411, a stage 412 and a revolver 413. The illumination optical system 420 includes various types of optical filters 421, a field stop 422, a mirror 423, a lens 424, an aperture member 425, and a condenser lens 426. The observation optical system 430 includes an objective lens 431, an imaging lens 433, and an eyepiece 434. In the vicinity of the objective lens 431, a pupil 432 of the objective lens is located.

To the main body part 410, the light source 411 is connected. Illumination light emitted from the light source 411 enters the illumination optical system 420, and reaches the condenser lens 426. Here, the aperture member 425 is disposed at the pupil position of the condenser lens 426. Moreover, as the aperture member 425, the aperture member 5 shown in FIG. 2A is used.

Above the condenser lens 426, the stage 412 is disposed. Moreover, a sample 460 is placed on the stage 412. Further, above the stage 412, the revolver 413 is located, and the objective lens 431 is held at the revolver 413.

The sample 460 is irradiated with illuminating light emitted from the condenser lens 426. Light from the sample 460 enters the objective lens 431. Here, the pupil 432 of the objective lens is conjugate to the aperture member 425. Therefore, the image of the aperture member 425 is formed at the position of the pupil 432 of the objective lens.

Here, in the sample observation device 400, an image of the inner edge of the transmission part of the aperture member 425 is formed inside of the outer edge of the pupil of the objective lens 431, and an image of the outer edge of the transmission part of the aperture member 425 is formed outside of the outer edge of the pupil of the objective lens 431.

Therefore, the amount of imaging light emitted from the objective lens 431 changes with a change in shape at the sample 460 (change in inclination). Thereby, it is possible to detect a change in shape at the sample as a change in brightness. As a result, it is possible to obtain a sample image with shadow, even when the sample is colorless and transparent.

The imaging light emitted from the objective lens 431 is collected by the imaging lens 433, and an image of the sample 460 is formed at the light-collecting position. In the sample observation device 400, a prism is disposed, following the imaging lens 433. A part of the imaging light is reflected to the side of the eyepiece 434 by this prism. As a result, an optical image 435 of the sample is formed in the vicinity of the eyepiece 434. When observation using the eyepiece 434 is not performed, the prism may be moved to the outside of the optical path.

Meanwhile, the imaging light that passed through the prism enters the image pickup device 440. The image pickup device 440 includes an image-pickup element 441. An optical image of the sample 460 is formed on the image-pickup element 441 by imaging lens 433, whereby the optical image of the sample 460 is picked up. In this way, a sample image with shadow can be obtained. The optical system may be disposed between the imaging lens 433 and the image-pickup element 441. In this case, an optical image of the sample 460 is formed on the image-pickup element 441 by the imaging lens 433 and this optical system.

Moreover, to the image pickup device 440, a camera controller 442 and a video board 443 are connected. Moreover, the camera controller 442 and the video board 443 are both connected to the image processing device 450.

Control of image pickup is performed by the camera controller 442. Moreover, control of the camera controller 442 is performed by the image processing device 450. The control of the camera controller 442 may be performed by other devices, such as a computer. Moreover, an image signal output from the image pickup device 440 is input to the image processing device 450 via the video board 443. In the image processing device 450, various electrical processing is performed. The result of the processing is displayed on the display device 451.

By including the image processing device, it is possible to perform various image processing. Examples of the image processing are described below.

Moreover, the sample observation device of the present embodiment preferably includes an image pickup device disposed on the observation optical system side, and the image processing device includes a region separation part and an analysis part, the region separation part separates the entire region of an image obtained by the image pickup device into a specific region that matches with a predetermined condition and a non-specific region other than the specific region, and the analysis part analyzes an image of the specific region and obtains information on the specific region.

The sample observation device of the present embodiment includes a region separation part, and the region separation part separates the entire region of an image obtained by the image pickup device into a specific region that matches with a predetermined condition and a non-specific region other than the specific region. The case where the predetermined condition is the presence or not of a colony, is described below.

In this case, the specific region is the region where the colony exists (hereinafter referred to as a "colony region" as appropriate), and the non-specific region is the region other than the colony region (hereinafter referred to as a "background region" as appropriate). Therefore, the region separation part separates the entire region of an image obtained into a colony region and a background region.

Various methods are available as a method to separate a colony region. A simplest separation method is described below. In the entire region of an image obtained by the image pickup device, a colony region and a background region are present. In general, the structure having various shapes is present in a colony region as compared with a background region. Therefore, the period of a change in shape is short in the colony region, and is long in the background region. Moreover, the amount of change in shape is large in the colony region, and is small in the background region.

Therefore, in an image obtained by detecting a change in shape at the sample as a change in brightness, a period of shading or a period of contrasting (hereinafter referred to as the "period of brightness change" as appropriate) is short in the colony region and is long in the background region. That is, many of the regions having short period of brightness change exist in the colony region, and many of the regions having long period of brightness change exists in the background region. Meanwhile, the magnitude of brightness change is different among detection methods.

Figure 34A:
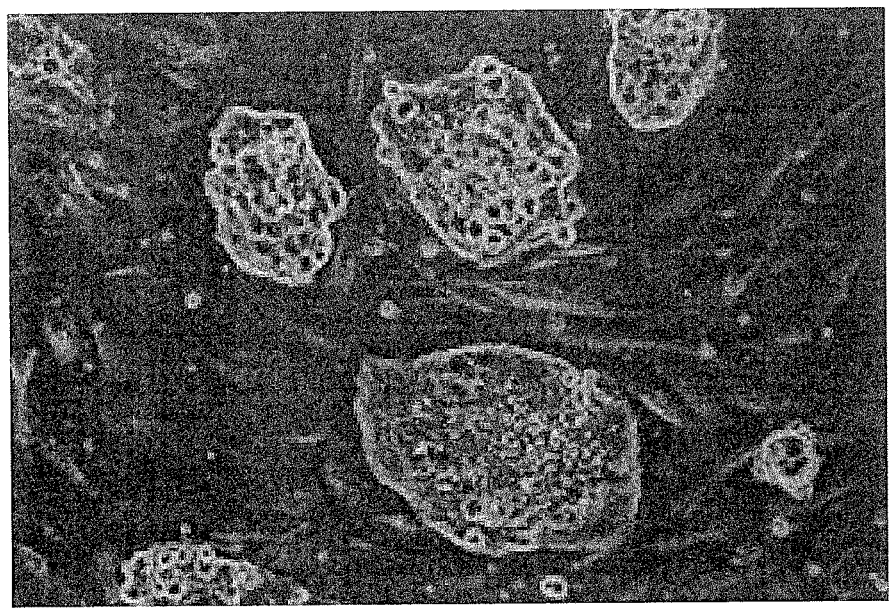
FIG. 34A and FIG. 34B are electronic images of a sample obtained by the sample observation device of the present embodiment, where
Figure 34B:
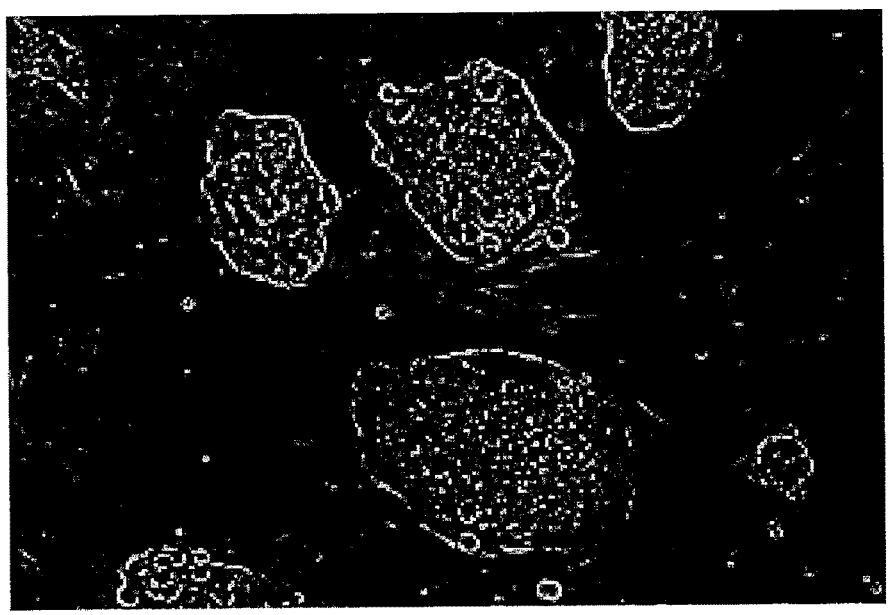
Figure 35A:
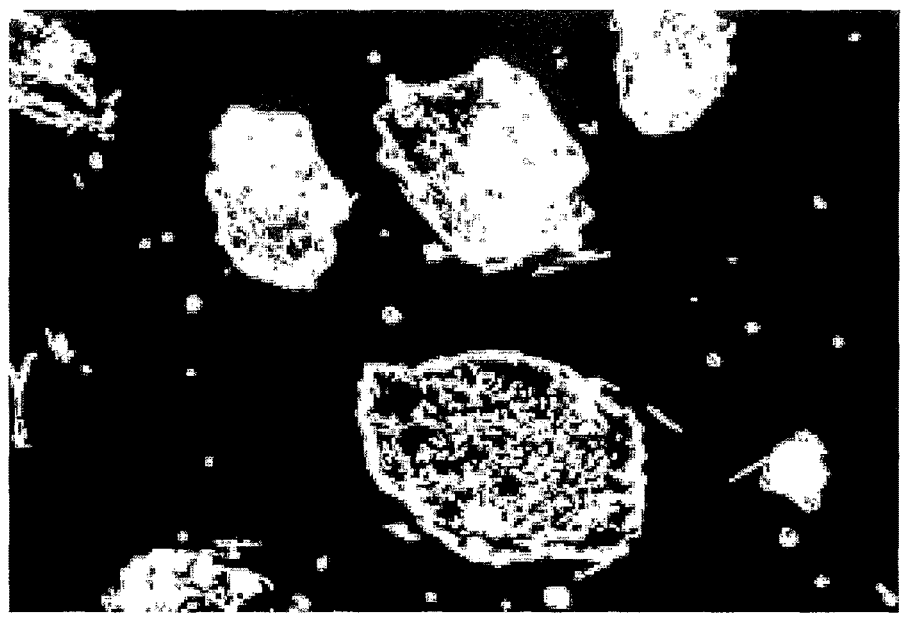
FIG. 35A and FIG. 35B are electronic images of a sample obtained by the sample observation device of the present embodiment, where
Figure 35B:
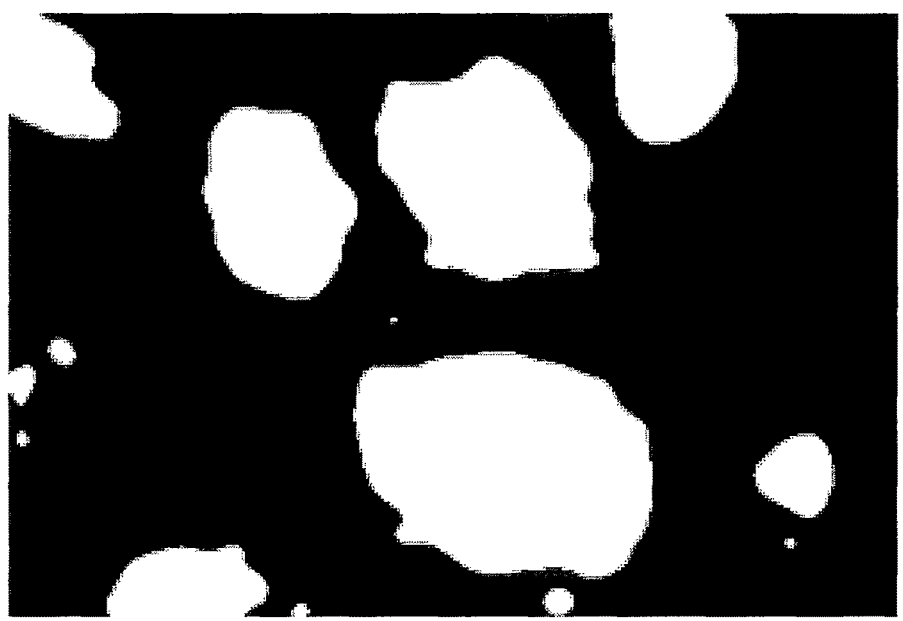

Then focusing on the magnitude of brightness change or a difference in period, it is possible to detect a colony region by the following procedures 1 to 3. FIG. 34A and FIG. 34B are electronic images of a sample obtained by the sample observation device of the present embodiment, where FIG. 34A is an original image, and FIG. 34B is an image after applying an edge detection filter. FIG. 35A and FIG. 35B are electronic images of a sample obtained by the sample observation device of the present embodiment, where FIG. 35A is an image after performing a binarization processing, and FIG. 35B is an image after performing a morphology processing.

Here, the original image is an image obtained by the image pickup device, which is an image not performed image processing or the like. In the original image shown in FIG. 34A, a relatively large three colonies exist at the center of the image, and four colonies exist around them.

In the procedure 1, an edge detection filter is applied to the original image. Only pixels where a brightness change larger than a predetermined threshold happens are extracted by the edge detection filter. As a result, the original image in FIG. 34A becomes an image where the edge is enhanced (hereinafter referred to as an "edge detected image" as appropriate) as shown in FIG. 34B.

In the edge detected image shown in FIG. 34B, it is found that colonies existing at the center are surrounded with white lines. Moreover, it is found that the four colonies existing around the three regions also are surrounded with white lines.

The edge strength is the gradient of the brightness value, which represents the magnitude of a difference in brightness value between two neighboring pixels. A larger difference in brightness value means larger variation in brightness. Then, by providing a threshold for the variation in brightness, it is possible to distinguish a region where the variation in brightness is large from a region where the variation in brightness is small. Distinguishing of the magnitude of the edge strength can be performed using a well-known edge detection filter. Sobel filter, Prewitt filter and Laplacian filter are available as examples of the well-known edge detection filter.

In the procedure 2, binarization processing is performed to the edge detected image. In the binarization processing as well, a threshold is set. In the binarization processing, a value of maximum brightness is set for a pixel having brightness larger than the threshold. Typically a pixel for which the value of maximum brightness is set is displayed in white on the image. On the other hand, a value of minimum brightness is set for a pixel having brightness smaller than the threshold. A pixel for which the value of minimum brightness is set is displayed in black on the image. As a result, the edge detected image shown in FIG. 34B becomes an image displayed in white and black (hereinafter referred to as a "binarized image") as shown in FIG. 35A.

In the binarized image shown in FIG. 35A, at the inside of the region surrounded with the white lines, an area which is wider than in the edge detected image is displayed in white as well for all of the seven colonies. Therefore, as compared with the edge detected image, the colony regions can be found more clearly in the binarized image.

In the image after performing the binarization processing, it is preferable that one of the specific region and the non-specific region is displayed in white and the other is displayed in black. However, in the binarized image shown in FIG. 35A, a black region exists in the colony regions which is essentially displayed in white. Moreover, a white region exists in the background regions which is essentially displayed in black.

The black region in the colony regions is the region where a change in brightness is locally gentle in the colony regions, for example. Moreover, the white region in the background regions is the region where variation in brightness becomes large due to small dust, for example.

Then in the procedure 3, morphology processing is performed to the binarized image. In the morphology processing, dilation processing of the region, erosion processing, and processing including the combination of dilation and erosion (opening, closing processing) are performed a plurality of times. In the dilation processing, the diagram in the binarized black and white image is expanded by one pixel. In the erosion processing, the diagram in the binarized black and white image is contracted by one pixel.

By performing this processing to the binarized image, it is possible to fill a black region in the colony region, or to remove a white region in the background region. As a result, the binarized image in FIG. 35A becomes an image where the colony region and the background region are clearly separated (hereinafter referred to as a "region separated image" as appropriate) as shown in FIG. 35B.

In the region separated image shown in FIG. 35B, the entire colony region is displayed in white for all of the seven colonies. A small colony region other than the seven colony regions also is displayed in white as a whole. Moreover, the background region is displayed in black. Therefore, as compared with the binarized image, the shape of the colony regions can be made more correct, and the colony region and the background region can be separated clearly.

When the processing by the region separation part finishes, processing by the analysis part is performed using the result of the processing. In the analysis part, analysis of the image of the specific region and acquisition of information on the specific region are performed. The number of colony regions, and the occupancy of the colony region in the enter region of the image, e.g., area occupancy are available as the information on the specific region.

In the sample observation device of the present embodiment, it is possible to detect a change in shape at the sample as a change in brightness. As a result, even when the sample is colorless and transparent, it is possible to obtain a shadow image. However, a shadow image can be obtained also from the phase-contrast observation.

Figure 36A:
FIG. 36A and FIG. 36B are electronic images of a sample obtained by the phase-contrast observation, where
Figure 36B:
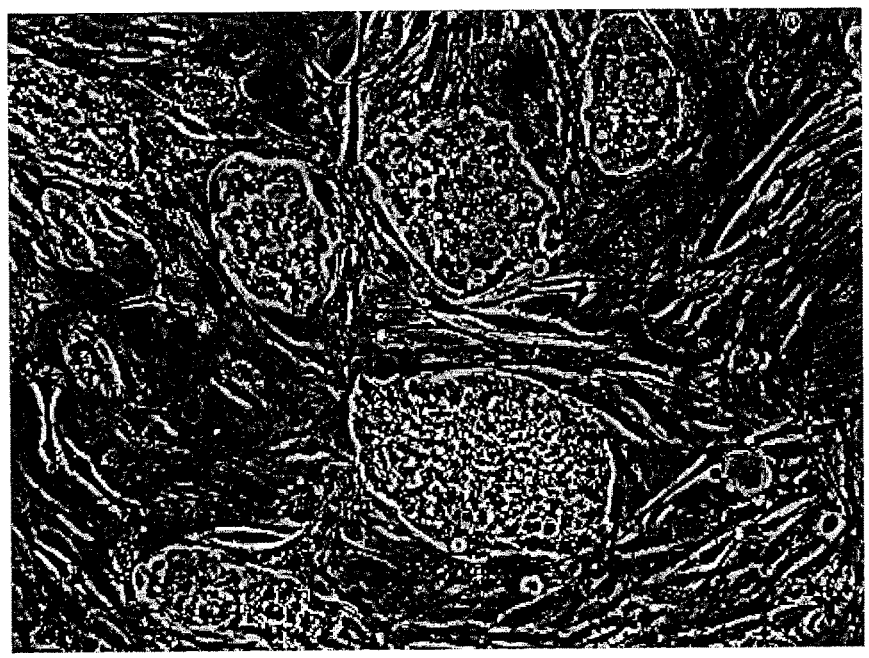

FIG. 36A and FIG. 36B is electronic images of a sample obtained by the phase-contrast observation, where FIG. 36A is an original image, and FIG. 36B is an image after applying edge detection filter. The sample image in FIG. 36A and the sample image in FIG. 34A are images at the same place.

In both of the shadow image of FIG. 34A and the phase-contrast image of FIG. 36A, long and thin tissues are present between colonies. Here, in a comparison of the contrast of the long and thin tissues and the background between the shadow image and the phase-contrast image, the contrast of the long and thin tissues and the background is larger in the phase-contrast image than in the shadow image.

Therefore, in a comparison of the edge detected images, the number of white lines in the background region is overwhelmingly larger in the phase-contrast image than in the shadow image as shown in FIG. 34B and FIG. 36B. As just described, since the number of white lines in the background region is many in the phase-contrast image, it often becomes difficult to specify the background region as compared with a shadow image. As a result, an increase in the processing times or complication of the processing is expected for the phase-contrast image in the binarization processing and the morphology processing.

As just described, an electronic image of a sample obtained by the sample observation device of the present embodiment has a feature that the contrast change in the background is smaller than in an electronic image of a sample obtained by phase-contrast observation. Therefore, it is possible to separate a specific region and a non-specific region easily.

Moreover, in the sample observation device of the present embodiment, it is preferable that an image is obtained at predetermined time intervals, and change over time of the information on a specific region is obtained from a plurality of images.

For instance, an image is obtained at regular time intervals. The images obtained such manner are called time-lapse images. By analyzing the time-lapse images, it is possible to obtain change over time of the information concerning colonies, for example.

The aperture member of the present embodiment is an aperture member that can be disposed in the illumination optical system of the sample observation device including the objective lens, which includes a darkening part and a transmission part, the transmission part is located outside of the outer edge of the darkening part, and the transmission part is formed so that an image of the inner edge of the transmission part is formed inside of the outer edge of the pupil of the objective lens, and an image of the outer edge of the transmission part is formed outside of the outer edge of the pupil of the objective lens.

By using such an aperture member, it is possible to observe both of a colorless and transparent sample and a stained sample favorably.

Moreover, in an aperture member of the present embodiment, it is preferable that the aperture member can be disposed in the illumination optical system of the sample observation device including the objective lens, and a transmission part, which is formed so as to include an optical axis of the illumination optical system, is formed at the aperture member, and including a light-shielding part located outside of an outer edge of the transmission part, and the light-shielding part has an outer edge, and the outer edge of the light-shielding part is formed so that an image of the outer edge of the light-shielding part is formed inside of an outer edge of a pupil of the objective lens.

Moreover, a sample observation device of the present embodiment includes a light source, an optical system, and a holding member to hold an object, and the optical system includes a first optical system and a second optical system, and the first optical system and the second optical system face each other across the holding member, and the first optical system includes an optical member, the optical member forms predetermined illumination light, and the optical system is configured so that an image of the predetermined illumination light is formed at the pupil position of the second optical system, and an image of the predetermined illumination light is eccentric to the pupil of the second optical system due to refraction generated at the object, and amount of light passing through the pupil of the second optical system increases due to eccentricity.

As stated above, when the aperture member 5, 5' is disposed in the optical path of the illumination optical system, annular illumination light is emitted from the aperture member 5, 5'. At this time, the illumination light emitted is in the state where a part of the region of the illumination light is shielded. The predetermined illumination light is the illumination light in this state. Therefore, the predetermined illumination light is in the state where a part of the region of the illumination light is shielded. The predetermined illumination light may be obtained as follows.

Figure 37A:
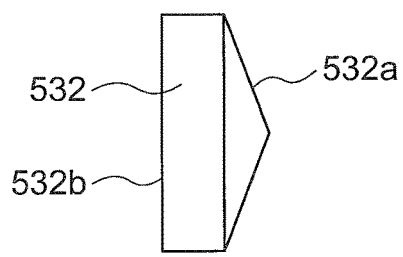
FIG. 37A, FIG. 37B and FIG. 37C are diagrams to describe the state where a part of the region of the illumination light is shielded, where
Figure 37B:
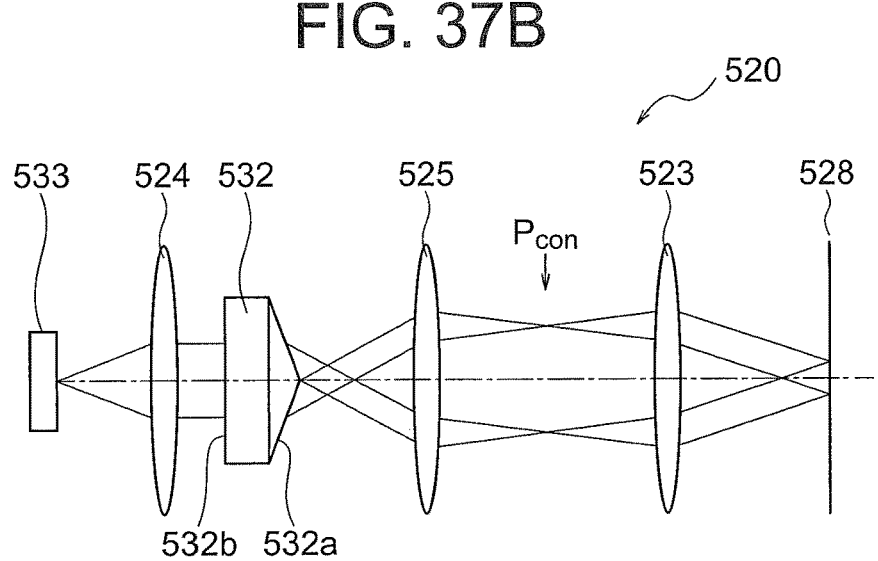
Figure 37C:
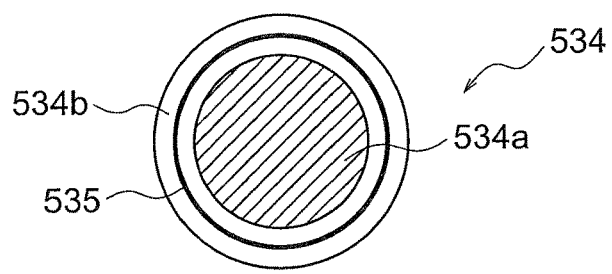

FIG. 37A, FIG. 37B and FIG. 37C are diagrams to describe the state where a part of the region of the illumination light is shielded, where FIG. 37A is a diagram of an axicon prism, FIG. 37B is a diagram showing an example of the arrangement of the axicon prism, and FIG. 37C is a diagram showing the light-collecting state of the illumination light.

An axicon prism 532 is an optical member, which has two optical surfaces as shown in FIG. 37A. One of the optical surfaces is a conical surface 532a, and the other is a flat surface 532b. The flat surface 532b is opposed to the conical surface 532a. Moreover, the flat surface 532b is disposed so that its optical surface is perpendicular to the center axis of the circular cone.

As shown in FIG. 37B, the axicon prism 532 is disposed in the optical path of an illumination optical system 520. Specifically, the axicon prism 532 is disposed between a lens 524 and a lens 525. Illumination light emitted from a light source 533 is converted into parallel light by the lens 524, and enters the axicon prism 532. The parallel light entering the flat surface 532b perpendicularly is refracted at the conical surface 532a in the optical-axis direction.

The illumination light emitted from the conical surface 532a intersects with the optical axis at a position away from the axicon prism 532 to some extent. After intersecting with the optical axis, the illumination light travels so as to move away from the optical axis. As a result, annular illumination light enters the lens 525. The annular illumination light is collected by the lens 525 at the pupil position $P_{con}$, for example.

The illumination light collected at the pupil position $P_{con}$ enters a condenser lens 23. Here, the pupil position $P_{con}$ coincides with the focal position of the condenser lens 23. Therefore, the illumination light becomes parallel light, and is emitted from the condenser lens 23. As a sample positioned at the focal position 528 of the objective lens is illuminated by this parallel light.

As shown in FIG. 37B, at the pupil position $P_{con}$, the annular illumination light is collected at a position away from the optical axis and is not collected in the vicinity of the optical axis. In this case, as shown in FIG. 37C, a region 534 of the entire illumination light is divided into a region 534a and a region 534b in the plane orthogonal to the optical axis of the observation optical system. Then, the region 534a is formed inside of the outer edge 535 of the pupil of the condenser lens. In the region 534a, the illumination light is not collected. Therefore, the region 534a is a light-shielding region. As just described, by using the axicon prism 532, a part of the region of the illumination light is shielded. Meanwhile, the annular illumination light is collected at the inside and the outside of the outer edge 535 of the pupil of the condenser lens. The region 534b is a region transmitting the illumination light.

When the axicon prism 532 is used, since light emitted from the light source as a whole is refracted, the illumination light is not shielded physically. However, considering the state where the illumination light pass through the pupil as a whole of the condenser lens as a standard, the region 534a where the illumination light does not exist is formed at the center part of the pupil of the condenser lens as shown in FIG. 37C. Therefore, it can be said that, when the axicon prism 532 is used as well, a part of the region of the illumination light is shielded.

The present invention can include various modification examples without departing from the scope of the invention. For instance, the sample observation device of the present invention is described using an upright microscope in FIG. 1, FIG. 12, FIG. 21, FIG. 22, FIG. 26 and FIG. 33. However, the sample observation device of the present invention may be an inverted microscope. That is, the present invention is applicable to an inverted microscope as well.

According to the present invention, it is possible to provide a sample observation device and a sample observation method, in which the generated direction of shadow is not limited. Moreover, it is possible to provide a sample observation device and a sample observation method, in which the positioning of an aperture member is simple.

As described above, the present invention is suitable for a sample observation device and a sample observation method, in which the generated direction of shadow is not limited. Further the present invention is suitable for a sample observation device and a sample observation method, in which the positioning of an aperture member is simple.

What is claimed is:

1. A sample observation device, comprising:
an illumination optical system and an observation optical system, wherein
the illumination optical system and the observation optical system are disposed to be opposed,
the illumination optical system includes a light source, a condenser lens and an aperture member,
the observation optical system includes an objective lens and an imaging lens,
the aperture member has a light-shielding part or a darkening part, and a transmission part,
the aperture member is disposed so that the light-shielding part or the darkening part includes an optical axis of the illumination optical system,
the transmission part is located outside of an outer edge of the light-shielding part or the darkening part,
an image of the transmission part is formed at a pupil position of the objective lens,
an image of an inner edge of the transmission part is formed inside of an outer edge of the pupil of the objective lens,
an image of an outer edge of the transmission part is formed outside of the outer edge of the pupil of the objective lens, and
the following condition expression is satisfied:

$$(R_{ob}-R_0 \times \beta)/(R_1 \times \beta - R_{ob}) < 1,$$

where
$R_0$ denotes the length from the optical axis of the observation optical system to the inner edge of the transmission part,
$R_1$ denotes the length from the optical axis of the observation optical system to the outer edge of the transmission part,
$R_{ob}$ denotes the radius of the pupil of the objective lens, and
$\beta$ denotes the value obtained by dividing a focal length of the objective lens by a focal length of the condenser lens.

2. The sample observation device according to claim 1, wherein an area of an image of the light-shielding part or the darkening part at the pupil position of the objective lens is 50% or more of an area of the pupil of the objective lens.

3. The sample observation device according to claim 1, wherein the following condition expression is satisfied:

$$R_0 \times \beta < R_{ob} < R_1 \times \beta,$$

where
$R_0$ denotes a length from the optical axis of the observation optical system to the inner edge of the transmission part,
$R_1$ denotes a length from the optical axis of the observation optical system to the outer edge of the transmission part,
$R_{ob}$ denotes a radius of the pupil of the objective lens, and
$\beta$ denotes a value obtained by dividing a focal length of the objective lens by a focal length of the condenser lens.

4. The sample observation device according claim 1, wherein at the pupil position of the objective lens, a center of the image of the transmission part coincides with a center of the pupil of the objective lens.

5. The sample observation device according to claim 1, wherein the following condition expressions are satisfied:

$$0.7 \leq (R_0 \times \beta)/R_{ob} < 1, \text{ and}$$

$$1 < (R_1 \times \beta)/R_{ob} \leq 2$$

where
$R_0$ denotes the length from the optical axis of the observation optical system to the inner edge of the transmission part,
$R_1$ denotes the length from the optical axis of the observation optical system to the outer edge of the transmission part,
$R_{ob}$ denotes the radius of the pupil of the objective lens, and
$\beta$ denotes the value obtained by dividing a focal length of the objective lens by a focal length of the condenser lens.

6. The sample observation device according to claim 1, wherein the transmittance at the transmission part varies from place to place.

7. The sample observation device according to claim 1, wherein the following condition expression is satisfied:

$$T_{in} < T_{out},$$

where
$T_{in}$ denotes a transmittance in a vicinity of the inner edge of the transmission part, and
$T_{out}$ denotes a transmittance in a vicinity of the outside of the transmission part.

8. The sample observation device according to claim 1, comprising a plurality of the light sources, wherein the plurality of light sources are disposed at the transmission part.

9. The sample observation device according to claim 1, comprising another aperture member that is different from the aperture member, and a moving mechanism to move the aperture member and the other aperture member.

10. The sample observation device according to claim 9, wherein
the aperture member is a first aperture member,
the other aperture member is a second aperture member,
the first aperture member and the second aperture member are different apertures,
a transmission part of the first aperture member is formed so that an image of an inner edge of the transmission part of the first aperture member is formed inside of an outer edge of a pupil of a first objective lens, and an image of an outer edge of the transmission part of the first aperture member is formed outside of the outer edge of the pupil of the first objective lens.

11. The sample observation device according to claim 10, wherein
the second aperture member includes a transmission part corresponding to a second objective lens having different magnification from that of the first objective lens, and the transmission part of the second aperture member is formed so that an image of an inner edge of the transmission part of the second aperture member is formed inside of an outer edge of a pupil of the second objective lens, and an image of an outer edge of the transmission part of the second aperture member is formed outside of the outer edge of the pupil of the second objective lens.

12. The sample observation device according to claim 10, wherein
the first objective lens is a phase-contrast objective lens having a phase film at the pupil position, and
the second aperture member has the transmission part at a position that is conjugate with the phase film of the first objective lens.

13. The sample observation device according to claim 12, wherein the following condition expression is satisfied:

$$0.01 < (S_1 \times T_1)/(S_2 \times T_2 \times T_{ob}) < 100,$$

where
$S_1$ denotes an area of a region of the first transmission part that passes through the pupil of the objective lens,
$T_1$ denotes a transmittance (%) of the region of the first transmission part that passes through the pupil of the objective lens,
$S_2$ denotes an area of the second transmission part,
$T_2$ denotes a transmittance (%) at the second transmission part, and
$T_{ob}$ denotes a transmittance (%) at the phase film of the first objective lens.

14. The sample observation device according to claim 1, wherein the observation optical system includes an aperture member, and the aperture member is disposed at the pupil position of the objective lens, or at a position that is conjugate with the pupil position of the objective lens.

15. The sample observation device according to claim 1, wherein the light source is a monochromatic light source or the illumination optical system includes wavelength selection means.

16. The sample observation device according to claim 1, comprising an image processing device.

17. The sample observation device according to claim 16, wherein a synthetic image is generated from a plurality of images.

18. The sample observation device according to claim 17 wherein the plurality of images are obtained by changing an interval between the objective lens and a target.

19. The sample observation device according to claim 17, wherein the plurality of images are obtained by two different sample observation methods.

20. The sample observation device according to claim 16, further comprising an image pickup device disposed on the observation optical system side, wherein
the image processing device includes a region separation part and an analysis part,
the region separation part separates an entire region of an image obtained by the image pickup device into a specific region that matches with a predetermined condition and a non-specific region other than the specific region, and
the analysis part analyzes an image of the specific region and obtains information on the specific region.

21. The sample observation device according to claim 20, wherein
the image is obtained at predetermined time intervals, and change over time of information on the specific region is obtained from a plurality of images.

22. The sample observation device according to claim 1, wherein
the aperture member is made of an opaque member,
the transmission part includes a plurality of apertures formed at the opaque member.

23. The sample observation device according to claim 1, wherein
an image of the transmission part is eccentric to the pupil of the objective lens due to refraction generated at the object,
the aperture member and the objective lens are arranged so that an amount of light passing through the pupil of the objective lens increases due to eccentricity, independently of a direction of the eccentricity, and
in the state where the image of the outer edge of the transmission part and the outer edge of the pupil of the objective lens contact with each other, the image of the outer edge of the transmission part is located apart from the outer edge of the pupil of the objective lens.

24. A sample observation device, comprising:
an illumination optical system and an observation optical system, wherein
the illumination optical system and the observation optical system are disposed to be opposed,
the illumination optical system includes a light source, a condenser lens and an aperture member,
the observation optical system includes an objective lens and an imaging lens,
the aperture member has a light-shielding part or a darkening part, and a transmission part,
the aperture member is disposed so that the light-shielding part or the darkening part includes an optical axis of the illumination optical system,
the transmission part is located outside of an outer edge of the light-shielding part or the darkening part,
an image of the transmission part is formed at a pupil position of the objective lens,
an image of an inner edge of the transmission part is formed inside of an outer edge of the pupil of the objective lens,
an image of an outer edge of the transmission part is formed outside of the outer edge of the pupil of the objective lens,
further including another aperture member that is different from the aperture member, and a moving mechanism to move the aperture member and the other aperture member,
the aperture member is a first aperture member,
the other aperture member is a second aperture member,
the first aperture member and the second aperture member are different apertures,
a transmission part of the first aperture member is formed so that an image of an inner edge of the transmission part of the first aperture member is formed inside of an outer edge of a pupil of a first objective lens, and an image of an outer edge of the transmission part of the first aperture member is formed outside of the outer edge of the pupil of the first objective lens,
the second aperture member includes a transmission part corresponding to a second objective lens having different magnification from that of the first objective lens, and the transmission part of the second aperture member is formed so that an image of an inner edge of the transmission part of the second aperture member is formed inside of an outer edge of a pupil of the second objective lens, and an image of an outer edge of the transmission part of the second aperture member is formed outside of the outer edge of the pupil of the second objective lens.

25. A sample observation device, comprising:
an illumination optical system and an observation optical system, wherein
the illumination optical system and the observation optical system are disposed to be opposed,
the illumination optical system includes a light source, a condenser lens and an aperture member,
the observation optical system includes an objective lens and an imaging lens,
the aperture member includes a light-shielding part or a darkening part, a first transmission part and a second transmission part,
an image of the transmission part is formed at a pupil position of the objective lens,
the aperture member is formed so that the first transmission part includes the optical axis of the illumination optical system,
the light-shielding part or the darkening part is located outside of the outer edge of the first transmission part,
the second transmission part is located outside of the outer edge of the light-shielding part or the darkening part,
an image of the inner edge of the second transmission part is formed inside of the outer edge of the pupil of the objective lens, and
an image of the outer edge of the second transmission part is formed outside of the outer edge of the pupil of the objective lens.

26. The sample observation device according to claim 25, wherein the following condition expression is satisfied:

$$0.01<(S_{T2} \times T_{T2})/(S_{T1} \times T_{T1})<100,$$

where
$S_{T1}$ denotes an area of the first transmission part,
$T_{T1}$ denotes a transmittance (%) at the first transmission part,
$S_{T2}$ denotes an area of a region of the second transmission part that passes through the pupil of the objective lens, and
$T_{T2}$ denotes a transmittance (%) of the region of the second transmission part that passes through the pupil of the objective lens.

27. A sample observation device, comprising:
an illumination optical system and an observation optical system, wherein
the illumination optical system and the observation optical system are disposed to be opposed,
the illumination optical system includes a light source, a condenser lens and an aperture member,
the observation optical system includes an objective lens and an imaging lens,
the aperture member has a first light-shielding part or a darkening part, a second light-shielding part or a darkening part, a first transmission part, and a second transmission part,
an image of the transmission part is formed at a pupil position of the objective lens,
the aperture member is disposed so that the first light-shielding part or the darkening part includes an optical axis of the illumination optical system,
the first transmission part is located outside of an outer edge of the first light-shielding part or the darkening part,
the second light-shielding part or the darkening part is located outside of an outer edge of the first transmission part,
the second transmission part is located outside of an outer edge of the second light-shielding part or the darkening part,
an image of an inner edge of the second transmission part is formed inside of an outer edge of the pupil of the objective lens, and
an image of an outer edge of the second transmission part is formed outside of the outer edge of the pupil of the objective lens.

28. The sample observation device according to claim 27, wherein
the objective lens is a phase-contrast objective lens, and
the first transmission part is an illumination ring for phase-contrast observation.

29. The sample observation device according to claim 28, wherein the following condition expression is satisfied:

$$0.01<(S_{out} \times T_{out})/(S_{IN} \times T_{IN} \times T_{1ob})<100,$$

where
$S_{IN}$ denotes an area of the first transmission part,
$T_{IN}$ denotes a transmittance (%) at the first transmission part, and
$T_{1ob}$ denotes a transmittance (%) at a phase film of the objective lens,
$S_{out}$ denotes an area of a region of the second transmission part that passes through the pupil of the objective lens,
$T_{out}$ denotes a transmittance (%) of the region of the second transmission part that passes through the pupil of the objective lens.

30. A sample observation device, comprising:
an illumination optical system and an observation optical system, wherein
the illumination optical system and the observation optical system are disposed to be opposed,
the illumination optical system includes a light source, a condenser part having a curved reflective face and an aperture member,
the observation optical system includes an objective lens and an imaging lens,
the aperture member includes a light-shielding part or a darkening part, and a transmission part,
the aperture member is disposed so that the light-shielding part or the darkening part includes an optical axis of the illumination optical system,
the transmission part is located outside of an outer edge of the light-shielding part or the darkening part,
an image of the transmission part is formed at a pupil position of the objective lens,
an image of an inner edge of the transmission part is formed inside of an outer edge of a pupil of the objective lens, and
an image of an outer edge of the transmission part is formed outside of the outer edge of the pupil of the objective lens.

31. A sample observation device, comprising:
an illumination optical system and an observation optical system, wherein
the illumination optical system and the observation optical system are disposed to be opposed,
the illumination optical system includes a light source and a condenser lens, the observation optical system includes an objective lens, an aperture member and an imaging lens, the aperture member includes a light-shielding part or a darkening part, and a transmission part, the aperture member is disposed so that the light-shielding part or the darkening part includes an optical axis of the observation optical system, the transmission part is located outside of an outer edge of the light-shielding part or the darkening part, and an image of an outer edge of a pupil of the condenser lens is formed between an inner edge of the transmission part and an outer edge of the transmission part, wherein the following expression is satisfied:

$$(R_{oc} \times \beta - R'_0)/(R'_1 - R_{oc} \times \beta) < 1,$$

where $R'_0$ denotes the length from the optical axis of the observation optical system to the inner edge of the transmission part, $R'_1$ denotes the length from the optical axis of the observation optical system to the outer edge of the transmission part, $R_{oc}$ denotes the radius of the pupil of the condenser lens, and $\beta$ denotes the value obtained by dividing a focal length of the objective lens by a focal length of the condenser lens.

32. The sample observation device according to claim 31, wherein an area of the light-shielding part or the darkening part is 50% or more of an area of an image of the pupil of the condenser lens.

33. The sample observation device according to claim 31, wherein the following condition expression is satisfied:

$$R'_0 < R_{oc} \times \beta < R'_1,$$

where $R'_0$ denotes a length from the optical axis of the observation optical system to the inner edge of the transmission part, $R'_1$ denotes a length from the optical axis of the observation optical system to the outer edge of the transmission part, $R_{oc}$ denotes a radius of the pupil of the condenser lens, and $\beta$ denotes a value obtained by dividing a focal length of the objective lens by a focal length of the condenser lens.

34. The sample observation device according to claim 31, wherein at a position of the transmission part, a center of an image of the condenser lens coincides with a center of the transmission part.

35. The sample observation device according to claim 31, wherein the following condition expressions are satisfied:

$$0.7 \leq R'_0/(R_{oc} \times \beta) < 1, \text{ and}$$

$$1 < R'_1/(R_{oc} \times \beta) \leq 2$$

where $R'_0$ denotes the length from the optical axis of the observation optical system to the inner edge of the transmission part, $R'_1$ denotes the length from the optical axis of the observation optical system to the outer edge of the transmission part, $R_{oc}$ denotes the radius of the pupil of the condenser lens, and $\beta$ denotes the value obtained by dividing a focal length of the objective lens by a focal length of the condenser lens.

36. The sample observation device according to claim 31, wherein transmittance at the transmission part varies from place to place.

37. The sample observation device according to claim 31, wherein the following condition expression is satisfied:

$$T'_{in} < T'_{out},$$

where $T'_{in}$ denotes a transmittance in a vicinity of the inner edge of the transmission part, and $T_{out}$ denotes a transmittance in a vicinity of the outside of the transmission part.

38. The sample observation device according to claim 31, wherein the aperture member is made of an opaque member, the transmission part includes a plurality of apertures formed at the opaque member.

39. The sample observation device according to claim 31, wherein the following condition expression is satisfied:

$$0.01 < (S'_T \times T'_T)/(S'_{ND} \times T'_{ND}) < 100,$$

where $S'_{ND}$ denotes an area of the darkening part, $T'_{T1}$ denotes a transmittance (%) at the darkening part, $S'_T$ denotes an area of a region of the light passing through the transmission part among light that passed through the pupil of the condenser lens, and $T'_{T2}$ denotes a transmittance (%) of the region of the light passing through the transmission part among the light that passed through the pupil of the condenser lens.

40. A sample observation device, comprising:

an illumination optical system and an observation optical system, wherein the illumination optical system includes a light source and a condenser lens, the observation optical system includes an objective lens, an aperture member and an imaging lens, the aperture member includes a light-shielding part or a darkening part, a first transmission part and a second transmission part, the aperture member is formed so that the first transmission part includes an optical axis of the observation optical system, the light-shielding part or the darkening part is located outside of the outer edge of the first transmission part, the second transmission part is located outside of the outer edge of the light-shielding part or the darkening part, an image of an outer edge of a pupil of the condenser lens is formed between an inner edge of the second transmission part and an outer edge of the second transmission part.

41. The sample observation device according to claim 40, wherein the following condition expression is satisfied:

$$0.01 < (S'_{T2} \times T'_{T2})/(S'_{T1} \times T'_{T1}) < 100,$$

where $S'_{T1}$ denotes an area of the first transmission part, $T'_{T1}$ denotes a transmittance (%) at the first transmission part, $S'_{T2}$ denotes an area of a region of the light passing through the second transmission part among light that passed through the pupil of the condenser lens, and $T'_{T2}$ denotes a transmittance (%) of the region of the light passing through the second transmission part among the light that passed through the pupil of the condenser lens.

42. A sample observation device, comprising:
an illumination optical system and an observation optical system, wherein
the illumination optical system and the observation optical system are disposed to be opposed,
the illumination optical system includes a light source, a condenser lens, and an illumination-side aperture member,
the observation optical system includes an objective lens, an observation-side aperture member, and an imaging lens,
the illumination-side aperture member includes two band-shaped transmission parts are arranged side by side,
the observation-side aperture member includes transmission parts in number corresponding to the number of the band-shaped transmission parts,
an outer shape of the transmission parts is the same as an outer shape of the band-shaped transmission parts,
the band-shaped transmission parts and the transmission parts are disposed so that centers of each band-shaped transmission part and a transmission part, which form a pair, are made to be a conjugate relation,
an image of an inner edge of the strip-shaped transmission part is formed inside of an outer edge of the transmission part, and
an image of an outer edge of the strip-shaped transmission part is formed outside of the outer edge of the transmission part.

43. A sample observation device, comprising:
an illumination optical system and an observation optical system, wherein
the illumination optical system and the observation optical system are disposed to be opposed,
the illumination optical system includes a light source, a condenser lens, and an aperture member,
the observation optical system includes an objective lens and an imaging lens,
the aperture member includes a light-shielding part and a transmission part,
the aperture member is disposed so that the light-shielding part includes an optical axis of the illumination optical system,
the light-shielding part has a property to shield light of a predetermined wavelength band,
the transmission part is located outside of an outer edge of the light-shielding part,
an image of the transmission part is formed at a pupil position of the objective lens,
an image of an inner edge of the transmission part is formed inside of an outer edge of the pupil of the objective lens, and
an image of an outer edge of the transmission part is formed outside of the outer edge of the pupil of the objective lens.

44. A sample observation device, comprising:
a light source, an optical system, and a holding member to hold an object, wherein
the optical system includes a first optical system and a second optical system,
the first optical system and the second optical system face each other across the holding member,
the first optical system includes an aperture member,
the optical system is configured so that an image of the transmission part of the aperture member is formed at a pupil position of the second optical system,
an image of the transmission part is eccentric to the pupil of the second optical system due to refraction generated at the object, and
amount of light passing through the pupil of the second optical system increases due to the eccentricity, independently of a direction of the eccentricity.

45. The sample observation device according to claim 44, wherein an image of the transmission part and the pupil of the second optical system are mutually rotationally symmetric shapes.

46. The sample observation device according to claim 44, comprising an image processing device.

47. The sample observation device according to claim 44, wherein
the aperture member and the second optical system are arranged so that an amount of light passing through the pupil of the second optical system increases due to eccentricity,
the aperture member has a light-shielding part, and
a part of an image of the light-shielding part moves outside the pupil of the second optical system in conjunction with the eccentricity.

48. A sample observation device, comprising:
a light source, an optical system, and a holding member to hold an object, wherein
the optical system includes a first optical system and a second optical system,
the first optical system and the second optical system face each other across the holding member,
the first optical system includes an optical member,
the optical member forms predetermined illumination light,
the optical system is configured so that an image of the predetermined illumination light is formed at a pupil position of the second optical system,
an image of the predetermined illumination light is eccentric to the pupil of the second optical system due to refraction generated at the object, and
an amount of light passing through the pupil of the second optical system increases due to eccentricity, independently of a direction of the eccentricity.

49. The sample observation device according to claim 48, wherein
the aperture member and the second optical system are arranged so that an amount of light passing through the pupil of the second optical system increases due to eccentricity, and
the optical system is configured so that a part of the illumination light formed by optical member becomes illumination light which moves inside the pupil of the second optical system in conjunction with the eccentricity.

* * * * *